(12) United States Patent
Sasaki

(10) Patent No.: US 6,742,241 B1
(45) Date of Patent: Jun. 1, 2004

(54) METHOD OF MANUFACTURING THIN FILM MAGNETIC HEAD AND THIN FILM MAGNETIC HEAD

(75) Inventor: Yoshitaka Sasaki, Tokyo (JP)

(73) Assignee: TDK Corporation, Tokyo (JP)

(*) Notice: Subject to any disclaimer, the term of this patent is extended or adjusted under 35 U.S.C. 154(b) by 231 days.

(21) Appl. No.: 09/610,440

(22) Filed: Jul. 3, 2000

(30) Foreign Application Priority Data

Sep. 7, 1999 (JP) .......................................... 11-196461

(51) Int. Cl.[7] ........................... G11B 5/127; G11B 5/187
(52) U.S. Cl. ............................... 29/603.07; 29/603.14; 29/603.15; 29/603.18; 360/122; 360/126
(58) Field of Search ....................... 29/603.07, 603.14, 29/603.1, 603.15, 603.18; 430/320, 323, 324; 360/122, 126, 324.1, 324.12

(56) References Cited

U.S. PATENT DOCUMENTS

| 4,564,585 A | * | 1/1986 | Blaske et al. ................ 430/313 |
| 4,970,615 A | * | 11/1990 | Gau ............................ 360/122 |
| 5,084,957 A | * | 2/1992 | Amin et al. ............. 29/603.14 |
| 5,126,232 A | * | 6/1992 | Gau ............................ 430/320 |
| 5,438,747 A | * | 8/1995 | Krounbi et al. .......... 29/603.16 |
| 5,503,963 A | * | 4/1996 | Bifano ....................... 430/321 |
| 5,600,519 A | | 2/1997 | Heim et al. |

FOREIGN PATENT DOCUMENTS

| JP | A 07-262519 | 10/1995 |
| JP | A 08-249614 | 9/1996 |
| JP | 2000-276704 A | 10/2000 |

* cited by examiner

*Primary Examiner*—Carl J. Arbes
*Assistant Examiner*—Tai Nguyen
(74) *Attorney, Agent, or Firm*—Oliff & Berridge, PLC

(57) ABSTRACT

To provide a method of manufacturing a thin film magnetic head capable of realizing an accurate control of a pole width and a sufficient overwrite characteristic even when the pole width is narrowed. In a connecting portion of an intermediate portion and a tip portion in a top pole, a step face in a width direction of almost the right angle is provided. The step face has a first corner at an intersection portion between the step face and a side face in the tip portion. A positive photoresist is used for a photolithography process to form the top pole. A photomask used at the time of exposure includes a projection in a shape having an acute angle portion in a portion corresponding to the first corner in the top pole. Consequently, a wedge-shaped recess is formed in the first corner in the top pole. Thus, even when the throat height is changed, the recording track width is not changed and the recording track width can be prevented from being widened. The stable overwrite characteristic such that a magnetic flux saturation does not occur can be obtained.

15 Claims, 35 Drawing Sheets

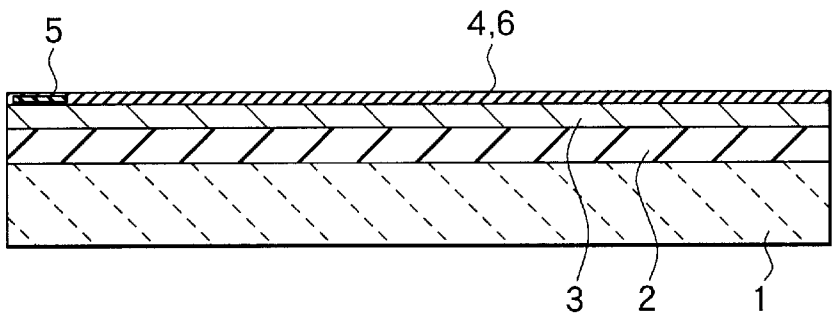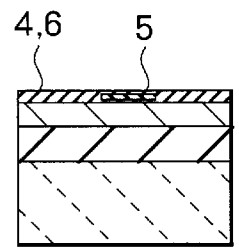
FIG.1A   FIG.1B
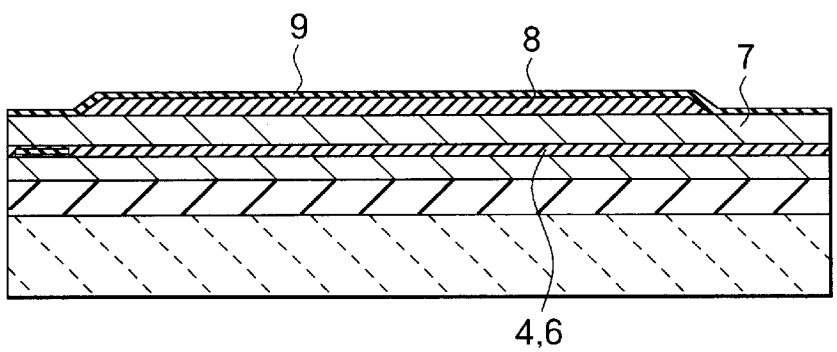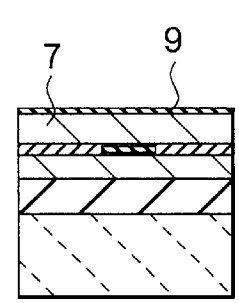
FIG.2A   FIG.2B
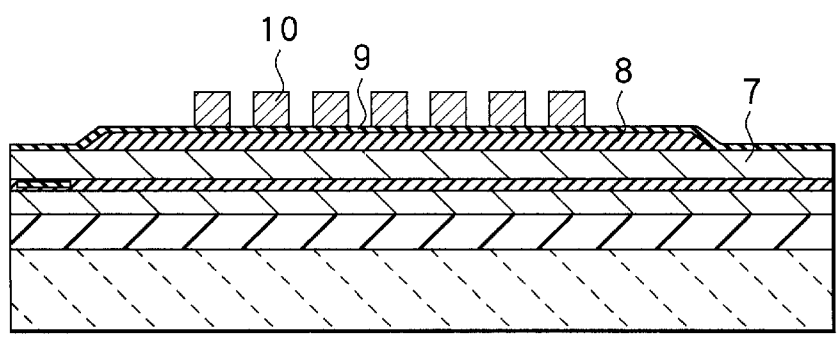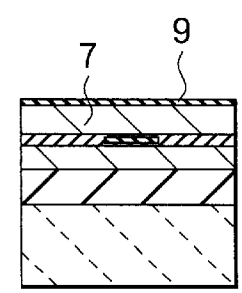
FIG.3A   FIG.3B

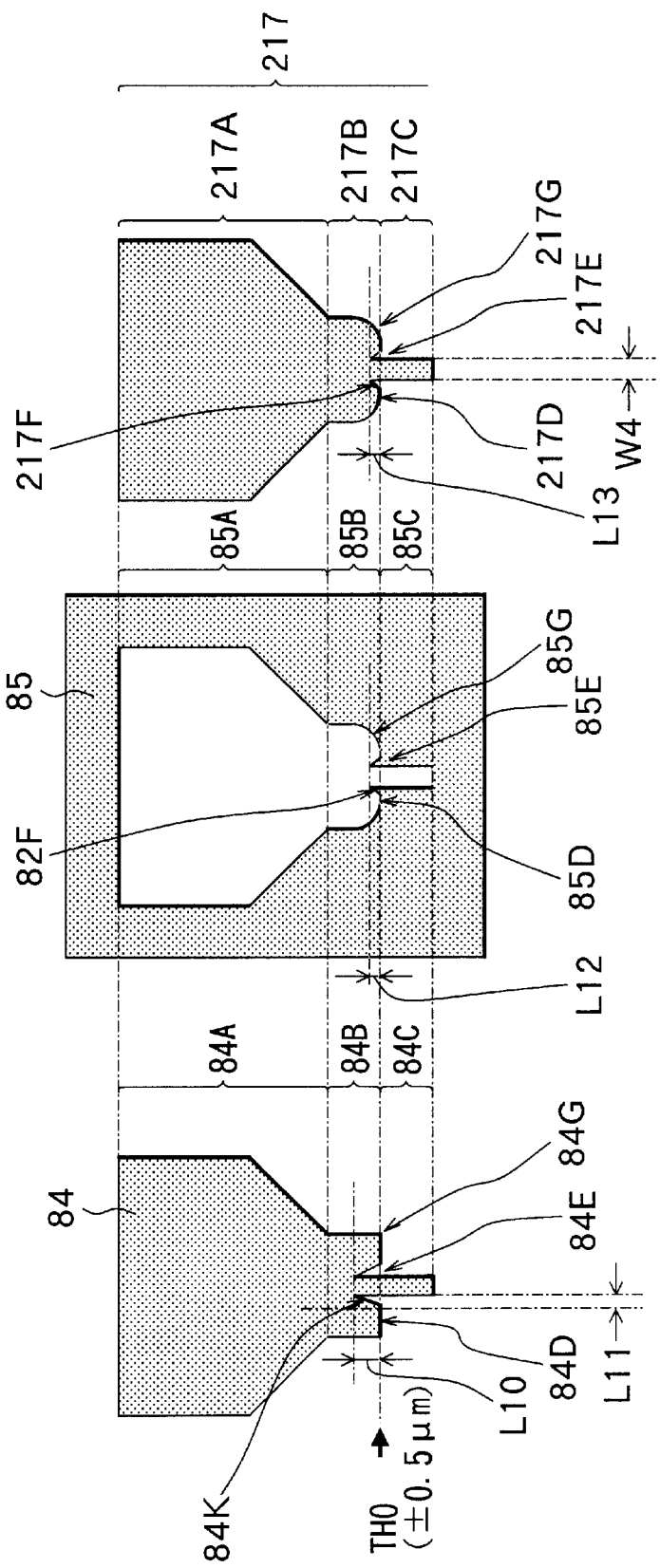

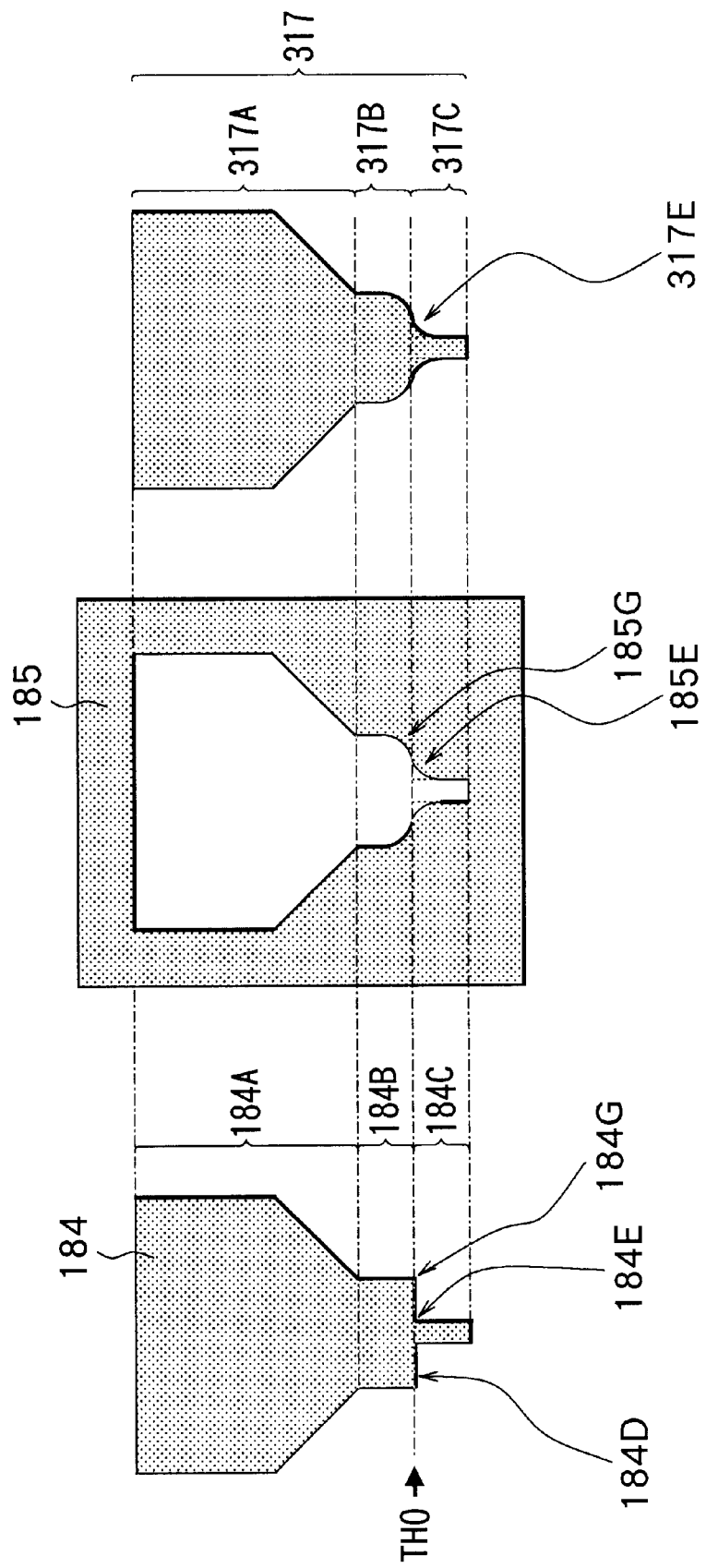

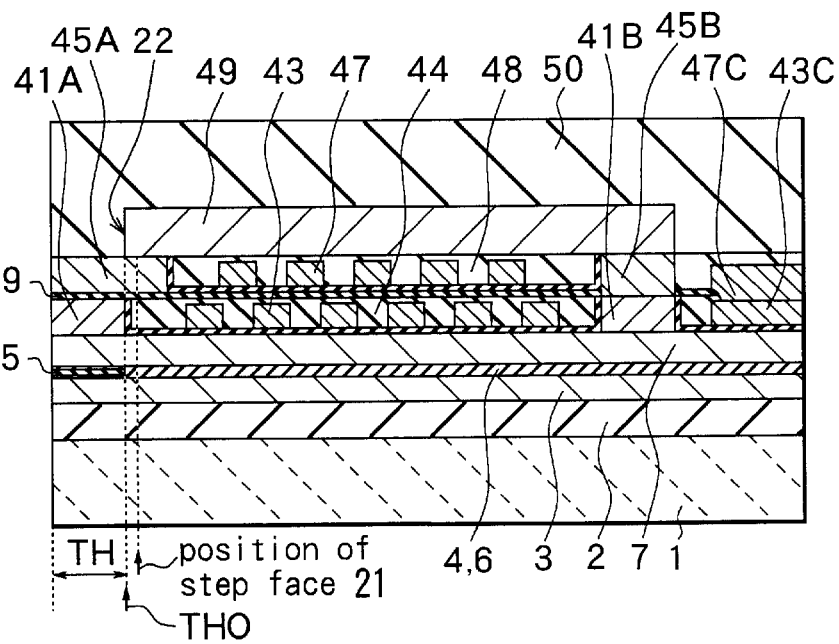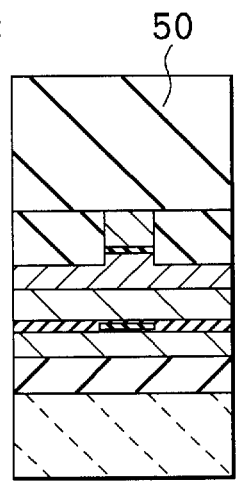
FIG.39A  FIG.39B
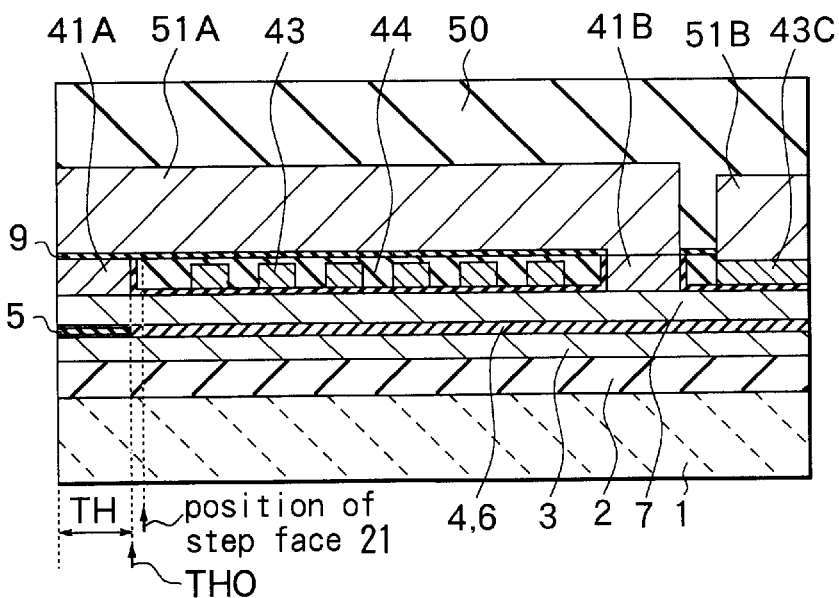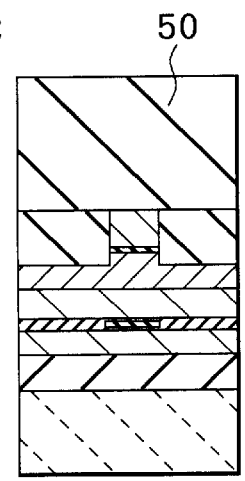
FIG.40A  FIG.40B

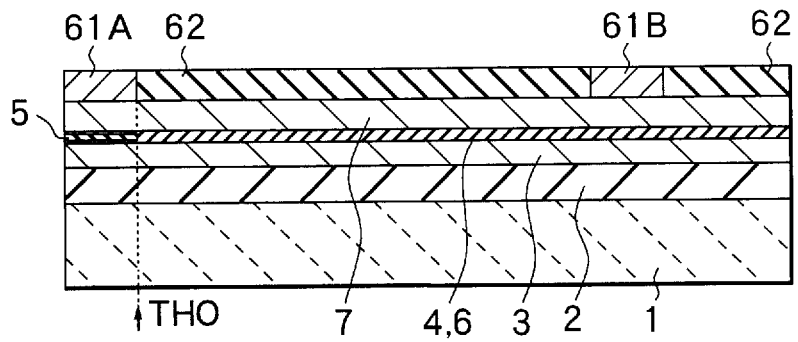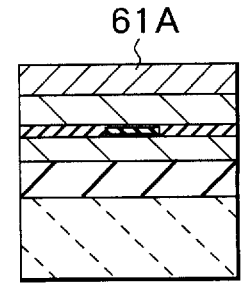
FIG.41A        FIG.41B
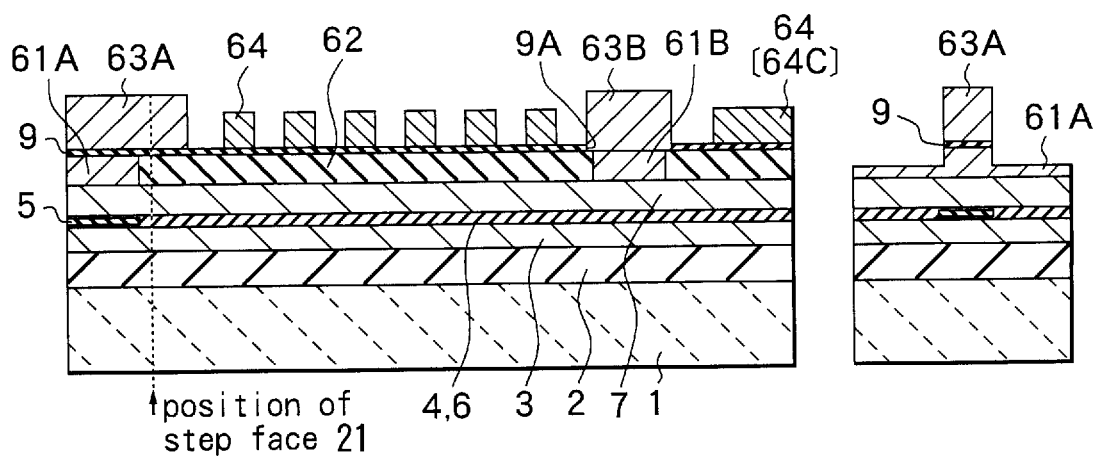
FIG.42A        FIG.42B and pole width P2W and pole
METHOD OF MANUFACTURING THIN FILM MAGNETIC HEAD AND THIN FILM MAGNETIC HEAD

BACKGROUND OF THE INVENTION

1. Field of the Invention

The present invention relates to a method of manufacturing a thin film magnetic head having at least an inductive magnetic transducer.

2. Description of the Related Art

In recent years, improvement in performances of a thin film magnetic head is demanded in association with improvement in surface recording density of a hard disk device. As a thin film magnetic head, a composite thin film magnetic head in which a recording head having an inductive magnetic transducer for writing and a reproduction head having a magneto resistive (hereinbelow, referred to as MR) device for reading are stacked is widely used.

One of factors which determine the performances of the recording head is throat height (TH). The throat height is a length (height) from the air bearing surface to the edge of an insulating layer for electrically isolating a thin film coil for generating a magnetic flux. The air bearing surface is a surface of a thin film magnetic head, which faces a magnetic recording medium and is also called a track surface. In order to improve the performances of the recording head, reduction in throat height is desired. The throat height is controlled by a polishing amount at the time of processing the air bearing surface.

In order to improve the recording density in the performances of the recording head, it is necessary to increase the track density of a magnetic recording medium. For this purpose, it is necessary to realize a recording head of a narrow track structure in which the width on the air bearing surface, of each of a bottom pole and a top pole formed while sandwiching a write gap is reduced to the order of a few microns to submicrons. In order to achieve it, semiconductor processing techniques are used.

Referring to FIGS. 45 to 47, as an example of a method of manufacturing a conventional thin film magnetic head, a method of manufacturing a composite thin film magnetic head will be described. Each of FIGS. 45 to 47 is a cross section orthogonal to the air bearing surface.

According to the manufacturing method, first, as shown in FIG. 45, an insulating layer 102 made of, for example, alumina ($Al_2O_3$) is deposited in thickness of about 5 to 10 $\mu m$ on a substrate 101 made of, for example, altic ($Al_2O_3$·TiC). Subsequently, a lower shield layer 103 for a reproduction head is formed on the insulating layer 102. For example, alumina is then deposited in thickness of 100 to 200 nm on the lower shield layer 103 to thereby form a shield gap film 104. An MR film 105 for constructing an MR device for reproduction is deposited in thickness of tens nm on the shield gap film 104 and is patterned in a desired shape by high-precision photolithography. Then a lead layer (not shown) as a lead electrode layer which is electrically connected to the MR film 105 is formed on both sides of the MR film 105. After that, a shield gap film 106 is formed on the lead layer, shield gap film 104, and MR film 105 to bury the MR film 105 between the shield gap films 104 and 106. An upper shield-cum-bottom pole (hereinbelow, referred to as bottom pole) 107 made of a magnetic material used for both of the reproduction head and the recording head such as Permalloy (NiFe) is formed on the shield gap film 106.

As shown in FIG. 46, on the bottom pole 107, a write gap layer 108 made of an insulating film such as alumina is formed. Further, a photoresist layer 109 is formed in a predetermined pattern on the write gap layer 108 by high-precision photolithography. On the photoresist layer 109, a first thin film coil 110 for an inductive recording head made of, for example, copper (Cu) is formed by plating or the like. A photoresist layer 111 is formed in a predetermined pattern by high-precision photolithography so as to cover the photoresist layer 109 and the coil 110. In order to flatten the coil 110 and insulate turns of the thin film coil 110 from each other, a heat treatment is performed at, for example, 250° C. A second thin film coil 112 made of, for example, copper is formed on the photoresist layer 111 by plating or the like. A photoresist layer 113 is formed in a predetermined pattern by high-precision photolithography on the photoresist layer 111 and the coil 112. In order to flatten the coil 112 and insulate turns of the thin film coil 112 from each other, a heat treatment is performed at, for example, 250° C.

As shown in FIG. 47, in a position rearward of the coils 110 and 112 (right side in FIG. 47), an opening 108A is formed by partially etching the write gap layer 108 in order to form a magnetic path. A top yoke-cum-top pole (hereinbelow, called top pole) 114 made of a magnetic material for recording head such as Permalloy is selectively formed on the write gap layer 108 and the photoresist films 109, 111 and 113. The top pole 114 is in contact with and magnetically coupled to the bottom pole 107 in the opening 108A. The top pole 114 is used as a mask and the write gap layer 108 and the bottom pole 107 are etched about 0.5 $\mu m$ by ion milling. After that, an overcoat layer 115 made of, for example, alumina is formed on the top pole 114. Finally, a slider is machined to thereby form a track surface (air bearing surface) 120 of the recording head and the reproduction head. In such a manner, a thin film magnetic head is completed.

FIGS. 48 to 50 show the structure of the thin film magnetic head in a completed state. FIG. 48 is a cross section of the thin film magnetic head perpendicular to the air bearing surface 120. FIG. 49 is an enlarged cross section parallel to the air bearing surface 120 of the pole portion. FIG. 50 is a plan view. Each of FIGS. 45 to 48 is a cross section taken along line A-AA of FIG. 50. In FIGS. 48 to 50, the overcoat layer 115 is not shown.

In order to improve the performances of the thin film magnetic head, it is important to form the head with accurate throat height TH, apex angle θ, pole width P2W and pole length P2L shown in FIGS. 48 and 49. The apex angle θ is an angle formed between a straight line connecting corners of side faces on the track face side of the photoresist layers 109, 111 and 113 and the top face of the top pole 114. The pole width P2W defines the width of a recording track on a recording medium. The pole length P2L indicates the length of the pole. In FIGS. 48 and 50, "TH0 position" denotes the edge on the track face side of the photoresist layer 109 as an insulating layer which electrically isolates the thin film coils 110 and 112, that is, a reference position 0 of the throat height TH.

As shown in FIG. 49, a structure in which side walls of the top pole 114, the write gap layer 108 and a portion of the bottom pole 107 are formed vertically in a self-aligned manner is called a trim structure. According to the trim structure, an increase in the effective track width due to expansion of the magnetic flux which occurs at the time of writing data to a narrow track can be prevented. As shown in FIG. 49, a lead layer 121 as a lead electrode layer electrically connected to the MR film 105 is provided on both sides of the MR film 105. In FIGS. 45 to 48 and FIG. 50, the lead layer 121 is omitted.

FIG. 51 shows the structure in plan view of the top pole 114. As shown in the diagram, the top pole 114 has a yoke 114A which occupies a major portion of the top pole 114 and a pole tip 114B having an almost constant width W1 as the pole width P2W. In the connecting portion between the yoke 114A and the pole tip 114B, the outer periphery of the yoke 114A forms an angle α to a plane parallel to the air bearing surface 120. In the connecting portion, the outer periphery of the pole tip 114B forms an angle β to a plane parallel to the air bearing surface 120. For example, α is about 45 degrees and β is about 90 degrees. The width of the pole tip 114B specifies the width of a recording track on a recording medium. The pole tip 114B includes a portion F on the front side (close to the air bearing surface 120 side) with respect to the position TH0 and a portion R on the rear side (on the yoke portion 114A side) with respect to the position TH0. As understood from FIG. 48, the portion F extends on the flat write gap layer 108, and the portion R and the yoke 114A extend on a coil portion which is covered with the photoresist films 109, 111 and 113 and is raised like a mountain (hereinbelow, called an apex portion).

The shape of the top pole is described in, for example, Japanese Unexamined Patent Application No. 8-249614.

Since the pole width P2W determines the track width of the recording head, accurate formation is required. Especially, in recent years, in order to realize high surface density recording, that is, to form a recording head of a narrow track structure, a microprocess of setting the width P2W of the top pole to 1.0 μm or narrower is requested.

As a method of forming the top pole is, for example, as disclosed in Japanese Unexamined Patent Application No. 7-262519, a frame plating method is used. In the case of forming the top pole 114 by using the frame plating method, first, a thin electrode film made of, for example, Permalloy is deposited on the whole apex portion by sputtering or the like. A photoresist is then applied on the electrode film and is patterned by a photolithography process to form a frame (outer frame) for plating. By using the electrode film formed before as a seed layer, the top pole 114 is formed by plating.

There is a level difference of, for example, about 7 to 10 μm between the apex portion and the other portion. A photoresist is applied on the apex portion in thickness of 3 to 4 μm. When it is assumed that at least 3 μm of thickness of the photoresist on the apex portion is necessary, since the photoresist having fluidity gathers in the lower portion, a photoresist film in thickness of about 8 to 10 μm is formed below the apex portion.

In order to form a narrow track as described above, it is necessary to form a frame pattern having a width of about 1.0 μm by a photoresist film. That is, a fine pattern having a width of 1.0 μm or narrower has to be formed by a photoresist film having a thickness of 8 to 10 μm or more. It is, however, extremely difficult to form such a thick photoresist pattern in width of the narrower pattern in a manufacturing process.

Moreover, at the time of photolithography, light for exposure is reflected by an electrode underlayer as a seed layer. By the reflection light, the peripheral area in the photoresist covered with a photomask is deformed or the like, so that a sharp and accurate photoresist pattern cannot be obtained. As a result, rounding of the side walls of a top pole or the like occurs, and the top pole cannot be formed in a desired shape. For example, when a positive photoresist is used as the photoresist and the pole width P2W is further reduced to W1A as shown in FIG. 52, it becomes more difficult to obtain the desired width W1A for the following reason. In the portion R extending over the apex portion of the pole chip 114B, the light reflected by the electrode underlayer includes not only reflection light in the vertical direction but also reflection light in the orthogonal or lateral direction from an inclined face of the apex portion. The reflection light exerts an influence on photosensitivity of the photoresist layer. As a result, the width of the photoresist pattern which defines the pole width P2W becomes wider than an expected value and the shape of the pole width P2W becomes as shown by a solid lines in FIG. 52. In the diagram, broken lines show the shape of a photomask used for patterning the photoresist.

In the pole tip 114B, the width of the front portion F with respect to the TH0 position is an extremely important factor of defining the track width on a recording medium. When the width of the portion F becomes wider than W2, a target fine track cannot be obtained.

For example, in order to improve the so-called NLTS (Non-Linear Transition Shift) characteristic, it is necessary to shorten the magnetic path length, that is, the length of a portion as a path of a magnetic flux generated by the thin film coil as much as possible. For this purpose, it is demanded to form the throat height TH sufficiently short. The NLTS expresses a deviation amount between an ideal magnetic recording position on a disk and an actual magnetic recording position in percentage. For example, as shown in FIG. 53, when the polishing amount at the time of forming the air bearing surface 120 is increased to make the throat height TH shorter than that in FIG. 52, the width W1B of the pole tip 114B in the air bearing surface becomes certainly wider than the width W1A of the pole tip 114B in FIG. 52. It is therefore difficult to obtain the target fine track width.

The above-mentioned magnetic head disclosed in Japanese Unexamined Patent Application No. 8-249914 also has a similar problem. In the magnetic head disclosed in the publication, the pole width changes gently from the TH0 position to the yoke. Consequently, reflection light in the orthogonal or lateral direction from the inclined face of the apex portion exerts a large influence on the photosensitivity of the photoresist layer, so that the width of the front portion with respect to the TH0 position cannot be accurately controlled.

As shown in FIGS. 52 and 53, since the rear portion R with respect to the TH0 position in the pole tip 114B has almost the same width as that of the front portion F with respect to the TH0 position and its cross-sectional area is small, the magnetic flux from the yoke 114A is saturated in the portion R and cannot sufficiently reach the portion F which defines the track width. As a result, the overwrite characteristic, that is, a characteristic in the case of overwriting data on a recording medium on which data has been already written becomes as low as about 10 to 20 dB. There is a problem such that a sufficient overwrite characteristic cannot be assured.

For example, as shown in FIGS. 54A and 54B, what is called a stitched pole type thin film magnetic head has been also proposed. In the stitched pole type thin film magnetic head, another pole tip 118A which is narrower than the pole tip 114B as a portion of the top pole 114 is formed under the pole tip 114B and the pole tips 118A and 114A are magnetically coupled to each other. In the diagram, the first thin film coil 110 is disposed on a thick insulating layer 116 formed on the write gap layer 108. In the rearward of the insulating layer 116, a magnetic layer 118B formed in the same process as the pole tip 118A is disposed. According to the thin film magnetic head, the pole tip 118A is formed on the flat write gap layer 108. It is therefore relatively easy to form the narrow pole tip 118A for defining the track width on a recording medium and the recording track width in the recording medium can be reduced. In the thin film magnetic head of this kind, however, there is a case such that the photoresist pattern in the portion, which is related to the formation of the pole tip 118A, is widened due to an influence of reflection light from the underlayer at the time of exposure. As a result, it is difficult to evenly and sufficiently reduce the width of the pole tip 118A.

The invention has been achieved in consideration of the problems and its object is to provide a method of manufacturing a thin film magnetic head capable of obtaining a sufficient overwrite characteristic by accurately controlling the pole width even when the pole width is reduced.

According to the invention, there is provided a method of manufacturing a thin film magnetic head comprising: at least two magnetic layers which are magnetically coupled to each other and include two magnetic poles which partially face each other via a gap layer on the recording medium facing side; and a thin film coil portion disposed between the at least two magnetic layers via an insulating layer, at least one of the two magnetic layers having: a first magnetic portion which extends from the recording medium facing surface to either an edge portion on the side close to the recording medium in the insulating layer or a portion near the edge portion and which defines a width of a recording track on the recording medium; and a second magnetic portion which is wider than the first magnetic portion, magnetically coupled to the first magnetic portion in or near the edge portion of the insulating layer, and extends so as to be apart from the recording medium facing surface, a step face in the width direction being formed in the coupling position of the first and second magnetic portions, a first corner being formed in an intersecting portion of a side face of the first magnetic portion and the step face, and a second corner being formed in an intersecting portion of a side face of the second magnetic portion and the step face, the method comprising: a step of forming a photoresist pattern in a predetermined-shaped portion by performing a photolithography process with a light shield mask whose basic shape corresponds to a shape of each of the first and second magnetic portions; and a step of selectively forming the at least one of the magnetic layers by using the formed photoresist pattern, wherein the light shield mask includes a predetermined-shaped portion by which a projection can be formed in a portion in the photoresist pattern, the portion corresponding to the first corner in the at least one of the magnetic layers.

SUMMARY OF THE INVENTION

In the method of manufacturing a thin film magnetic head according to the invention, a photoresist pattern in a predetermined-shaped portion is formed by performing a photolithography process with a light shield mask. Since the light shield mask has a predetermined-shaped portion by which a projection can be formed in a portion corresponding to the first corner in the at least one of the magnetic layers, because of the existence of the pattern, the exposure amount in the portion is adjusted and properly set. As a result, the photoresist pattern having the projection in the portion corresponding to the first corner in the at least one of the magnetic layers is formed. A wedge-shaped recess is formed in the first corner in the at least one of the magnetic layers obtained by using the photoresist pattern.

In the method of manufacturing a thin film magnetic head according to the invention, the predetermined-shaped portion of the light shield mask includes at least an acute angle portion.

In the method of manufacturing a thin film magnetic head according to the invention, a positive photoresist in which an area unexposed in the photolithography process remains is used as the photoresist. In this case, as the predetermined-shaped portion in the light shield mask, a projection shape which can suppress exposure in the first corner is preferable.

In the method of manufacturing a thin film magnetic head according to the invention, when a positive photoresist in which an area unexposed in the photolithography process remains is used as the photoresist, the light shield mask has a recess which can promote exposure in the second corner.

In the method of manufacturing a thin film magnetic head according to the invention, a negative photoresist in which an area exposed in the photolithography process remains may be used as the photoresist. In this case, as the predetermined-shaped portion in the light shield mask, a recess which can promote exposure in the first corner is preferable.

In the method of manufacturing a thin film magnetic head according to the invention, when a negative photoresist in which an area exposed in the photolithography process remains is used as the photoresist, further, the light shield mask has a projection shape which can suppress exposure in the second corner.

In the method of manufacturing a thin film magnetic head according to the invention, a pattern portion corresponding to the first magnetic portion in the light shield mask has a constant width.

In the method of manufacturing a thin film magnetic head according to the invention, when at least one of the magnetic layers includes a third magnetic portion which is magnetically coupled to the second magnetic portion and is wider and larger than the second magnetic portion, the first to third magnetic portions may be integrally formed by using a light shield mask having a shape corresponding to all of the first to third magnetic portions.

In a method of manufacturing a thin film magnetic head according to the invention, when at least one of the magnetic layers includes a third magnetic portion which is magnetically coupled to the second magnetic portion and is wider and larger than the second magnetic portion, the following manner is also possible. The first and second magnetic portions are formed by using a light shield mask having a shape corresponding to the first and second magnetic portions and, after that, the third magnetic portion is separately formed by using a second light shield mask having a shape corresponding to the third magnetic portion.

In the method of manufacturing a thin film magnetic head according to the invention, the light shield mask has a shape by which the direction of the step face in the coupling position can perpendicularly cross a side face in the first magnetic portion.

In the method of manufacturing a thin film magnetic head according to the invention, the light shield mask is positioned so that the position of the step face of the coupling position matches with the position of the edge on the side close to a recording medium in the insulating layer, and a photolithography process is performed.

In the method of manufacturing a thin film magnetic head according to the invention, the predetermined-shaped portion may include a recess or a projection in a right-angled triangle shape. In this case, preferably, the tip of the recess or projection in the right-angled triangle shape has an acute angle, and a depth of the recess or a height of the projection is set within a range from 0.3 μm to 0.8 μm.

According to the invention, there is provided a method of manufacturing a thin film magnetic head comprising: at least two magnetic layers which are magnetically coupled to each other and include two magnetic poles which partially face each other via a gap layer on the recording medium facing side; and a thin film coil portion disposed between at least the two magnetic layers via an insulating layer, at least one of the two magnetic layers having: a first magnetic portion which extends from a recording medium facing surface to either an edge portion on the side close to the recording medium in the insulating layer or a portion near the edge portion and which has a constant width that defines a width of a recording track on the recording medium; and a second magnetic portion which is wider than the first magnetic portion, magnetically coupled to the first magnetic portion in or near the edge portion of the insulating layer, and extends so as to be apart from the recording medium facing surface, a step face in the width direction being formed in the coupling position of the first and second magnetic portions, a first corner being formed in an intersecting portion of a side face in the first magnetic portion and the step face, and a second corner being formed in an intersecting portion of a side face in the second magnetic portion and the step face, the method comprising: a step of forming a photoresist pattern in a predetermined-shaped portion by performing a photolithography process with a light shield mask whose basic shape corresponds to a shape of each of the first and second magnetic portions; and a step of selectively forming the at least one of the magnetic layers by using the formed photoresist pattern, wherein the light shield mask has a shape including an acute angle portion in a position corresponding to the first corner in at least one of the magnetic layers.

According to the invention, there is provided a thin film magnetic head comprising: at least two magnetic layers which are magnetically coupled to each other and include two magnetic poles partially facing each other via a gap layer on the recording medium facing side; and a thin film coil portion disposed between the at least two magnetic layers via an insulating layer, wherein at least one of the two magnetic layers has: a first magnetic portion which extends from a recording medium facing surface to either an edge portion on the side close to the recording medium in the insulating layer or a portion near the edge portion and which has a constant width that defines a width of a recording track on the recording medium; and a second magnetic portion which is wider than the first magnetic portion, magnetically coupled to the first magnetic portion in or near the edge portion of the insulating layer, and extends so as to be apart from the recording medium facing surface, a step face in the width direction is formed in the coupling position of the first and second magnetic portions, a first corner is formed in an intersecting portion of a side face in the first magnetic portion and the step face, a second corner is formed in an intersecting portion of a side face in the second magnetic portion and the step face and, further, a wedge-shaped recess is provided in the first corner.

Other and further objects, features and advantages of the invention will appear more fully from the following description.

BRIEF DESCRIPTION OF THE DRAWINGS

FIGS. 1A and 1B are cross sections for explaining a process in a method of manufacturing a thin film magnetic head according to a first embodiment of the invention.

FIGS. 2A and 2B are cross sections for explaining a process subsequent to FIGS. 1A and 1B.

FIGS. 3A and 3B are cross sections for explaining a process subsequent to FIGS. 2A and 2B.

FIGS. 20A to 20C are plan views showing the relation between a photomask, a photoresist pattern, and a top pole which are used in a second embodiment.

FIGS. 21A to 21C are plan views showing the relation between a photomask, a photoresist pattern, and a top pole which are used in a comparative example of the second embodiment.

FIGS. 39A and 39B are cross sections subsequent to FIGS. 38A and 38B.

FIGS. 40A and 40B are cross sections showing a modification of a thin film magnetic head manufactured by the thin film magnetic head manufacturing method according to the fifth embodiment.

FIGS. 41A and 41B are cross sections for explaining a process in a method of manufacturing a thin film magnetic head according to a sixth embodiment of the invention.

FIGS. 42A and 42B are cross sections showing a process subsequent to FIGS. 41A and 41B.

DETAILED DESCRIPTION OF THE PREFERRED EMBODIMENTS

Figures 4A, 4B:
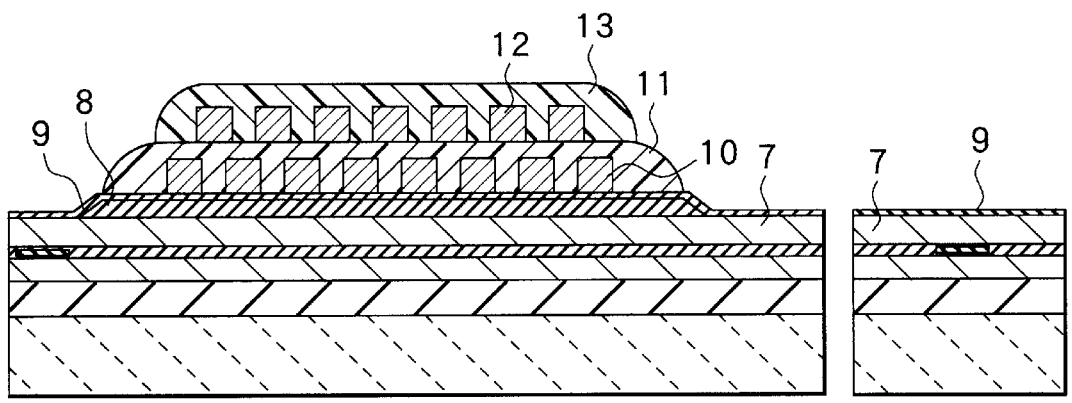
FIGS. 4A and 4B are cross sections for explaining a process subsequent to FIGS. 3A and 3B.

Embodiments of the invention will be described in detail hereinbelow by referring to the drawings.

First Embodiment

Figures 6A, 6B:
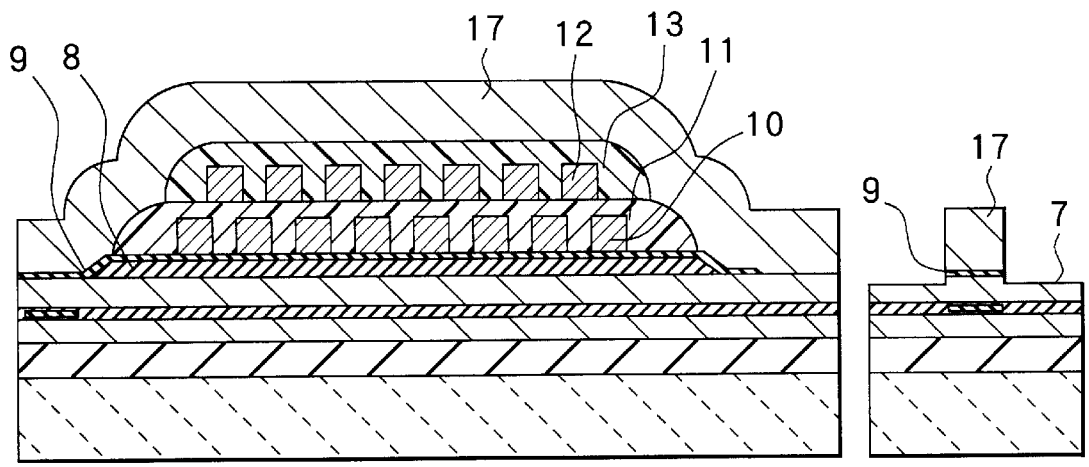
FIGS. 6A and 6B are cross sections for explaining a process subsequent to FIGS. 5A and 5B.
Figures 7A, 7B:
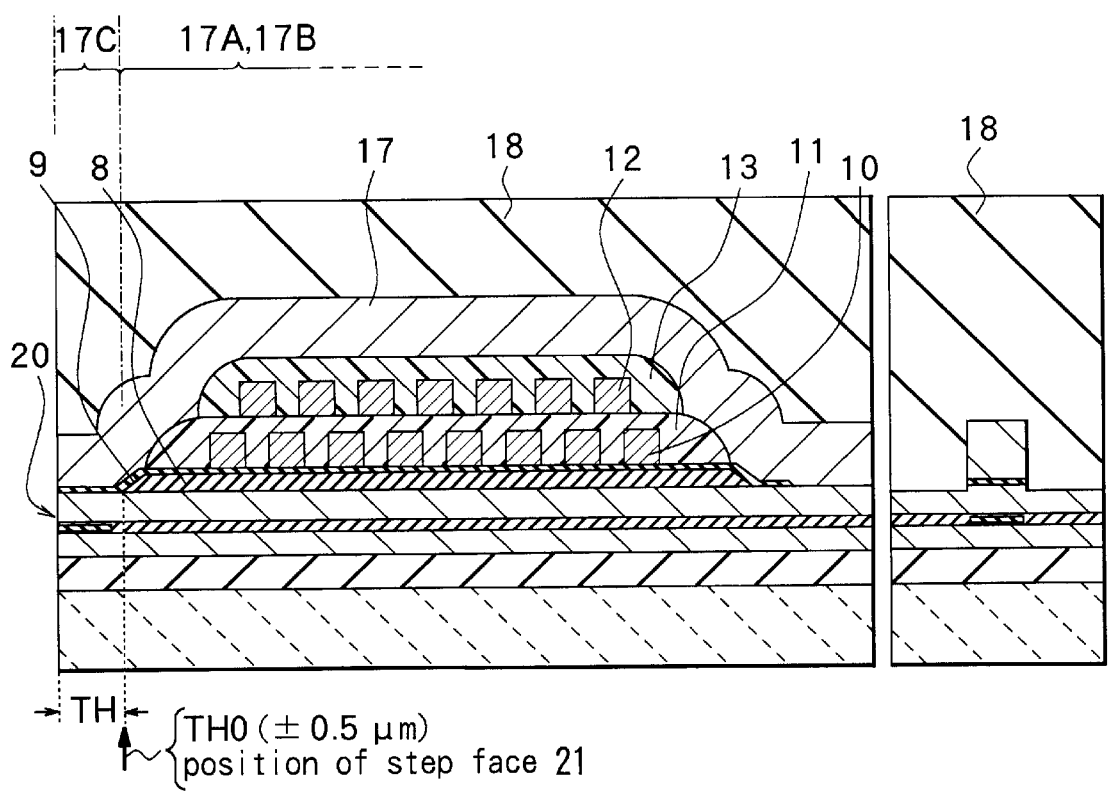
FIGS. 7A and 7B are cross sections for explaining a process subsequent to FIGS. 6A and 6B.
Figure 8:
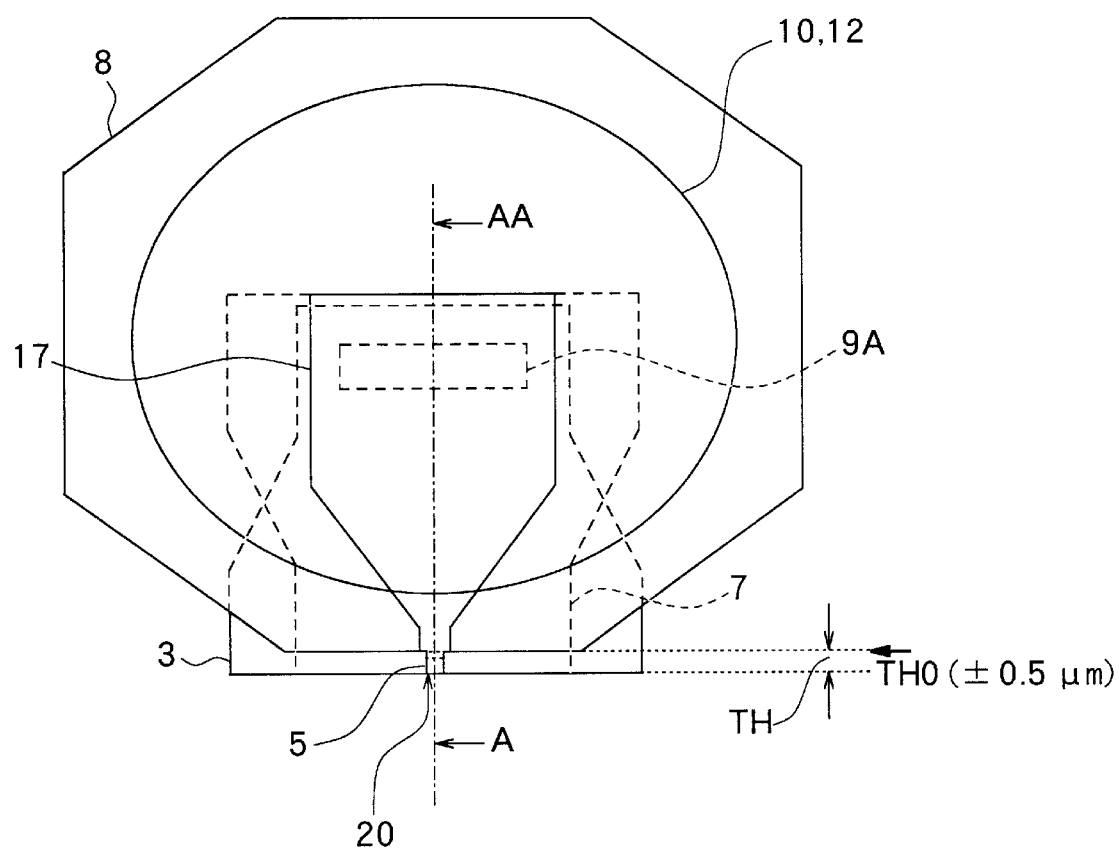
FIG. 8 is a plan view showing the structure of the completed thin film magnetic head.

Referring now to FIGS. 1A and 1B to 8A and 8B, a method of manufacturing a thin film magnetic head according to the first embodiment of the invention will be described. In the embodiment, a composite thin film magnetic head having a recording head and a reproduction head will be described as a thin film magnetic head. FIGS. 1A to 7A are cross sections perpendicular to the air bearing surface and FIGS. 1B to 7B are cross sections of the pole portion parallel to the air bearing surface. FIG. 8 shows a construction in plan view of the composite thin film magnetic head.

In the manufacturing method according to the embodiment, first, as shown in FIGS. 1A and 1B, an insulating layer 2 made of, for example, alumina ($Al_2O_3$) is deposited in thickness of about 3 to 5 $\mu$m on a substrate 1 made of, for example, altic ($Al_2O_3 \cdot TiC$). Then, a lower shield layer 3 for a reproduction head is formed by selectively depositing Permalloy (NiFe) in thickness of about 3 $\mu$m on the insulating layer 2 by using a photoresist film as a mask by plating.

Subsequently, a shield gap film 4 is formed by depositing alumina or the like in thickness of about 100 to 200 nm by sputtering on the lower shield layer 3. An MR film 5 for constructing an MR device for reproducing is formed in thickness of few tens nm on the shield gap film 4 in a desired shape by high-precision photolithography. A lead layer (not shown) as a lead electrode layer to be electrically connected to the MR film 5 is formed on both sides of the MR film 5 and, after that, a shield gap film 6 is formed on the lead layer, shield gap film 4, and MR film 5, thereby burying the MR film 5 in the shield gap films 4 and 6.

As shown in FIGS. 2A and 2B, an upper shield-cum-bottom pole (hereinbelow, referred to as bottom pole) 7 made of, for example, Permalloy is selectively deposited in thickness of about 3 to 4 $\mu$m on the shield gap film 6. The bottom pole 7 corresponds to an example of one of "at least two magnetic layers" in the invention.

On the bottom pole 7, an inorganic insulating film such as a silicon oxide film (SiO$_2$) is formed in thickness of about 1 to 2 µm. After that, the silicon oxide film is subjected to a taper etching to be selectively patterned, thereby forming an insulating layer 8 which defines the apex angle and the throat height. The insulating layer 8 is not limited to the silicon oxide film. Other inorganic insulating films such as alumina film, silicon nitride film (SiN) and the like may be also used. The film may be formed by sputtering or CVD (Chemical Vapor Deposition). On the bottom pole 7 and the insulating layer 8, a write gap layer 9 made of an insulating film such as an alumina film is formed.

As shown in FIGS. 3A and 3B, on the write gap layer 9, a first thin film coil 10 for an inductive recording head made of copper (Cu) or the like is formed in thickness of about 2 to 3 µm by, for example, electrolytic plating.

As shown in FIGS. 4A and 4B, on the write gap layer 9 and the coil 10, a photoresist layer 11 is formed in a predetermined pattern by high-precision photolithography. In order to flatten the coil 10 and insulate turns of the coil 10 from each other, a heat treatment is performed at, for example, 250° C.

On the photoresist layer 11, a second thin film coil 12 made of copper or the like is formed in thickness of 2 to 3 µm by, for example, electrolytic plating. On the photoresist layer 11 and the coil 12, a photoresist layer 13 is formed in a predetermined pattern by high-precision photolithography. In order to flatten the coil 12 and insulate turns of the coil 12 from each other, a heat treatment is performed at, for example, 250° C.

Figures 5A, 5B:
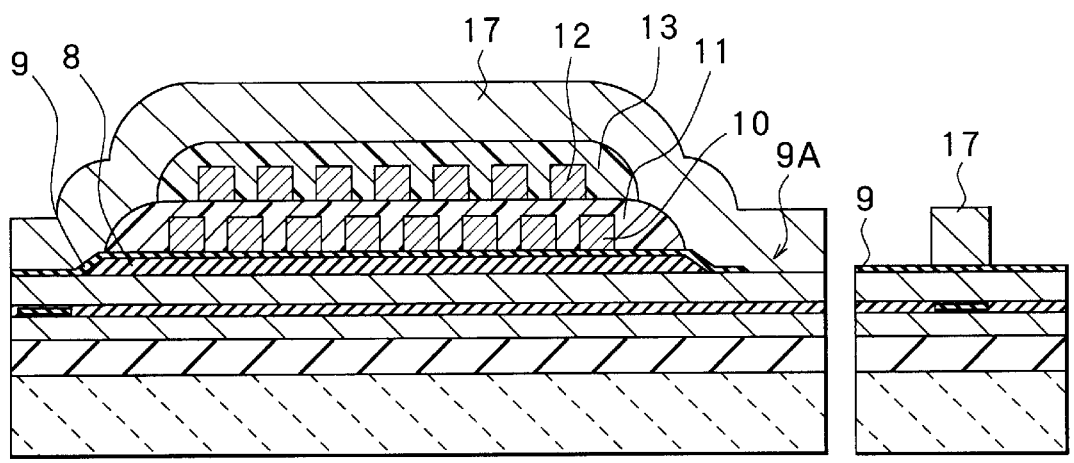
FIGS. 5A and 5B are cross sections for explaining a process subsequent to FIGS. 4A and 4B.

As shown in FIGS. 5A and 5B, in a position rearward of the coils 10 and 12 (right side in FIG. 5A), an opening 9A is formed by partially etching the write gap layer 9 in order to form a magnetic path. Before forming a top pole, an NiFe alloy having high saturated magnetic flux density is deposited in thickness of about 70 nm by, for example, sputtering to thereby form an electrode film (not shown) serving as a seed layer in electrolytic plating.

A photoresist is applied on the electrode film and is patterned by photolithography, thereby forming a photoresist pattern as a frame for forming the top pole by a frame plating method. More specifically, for example, as shown in FIG. 11A, a photoresist is selectively exposed to light by using a photomask 81 having a projection 81F including sharp angle portions at corners 81E corresponding to corners 17E in the coupling position of an intermediate portion 17B and a tip portion 17C in a top pole 17. By the operation, as shown in FIG. 11B, a photoresist pattern 82 having projections 82F corresponding to the projections 81F of the photomask 81 is formed. As the photomask 81, a metal film made of chrome (Cr) or the like is used. In the embodiment, as the photoresist pattern 82, a positive photoresist in which portions which are not exposed to light remain by a developing process after exposure is used. The details of the characteristic shape of the photomask 81 and the shape of the photoresist pattern 82 obtained by using the photomask 81 will be described hereinlater. The photomask 81 corresponds to an example of "light shielding mask" in the invention and the photoresist pattern 82 corresponds to an example of "photoresist pattern" in the invention.

Figure 9:
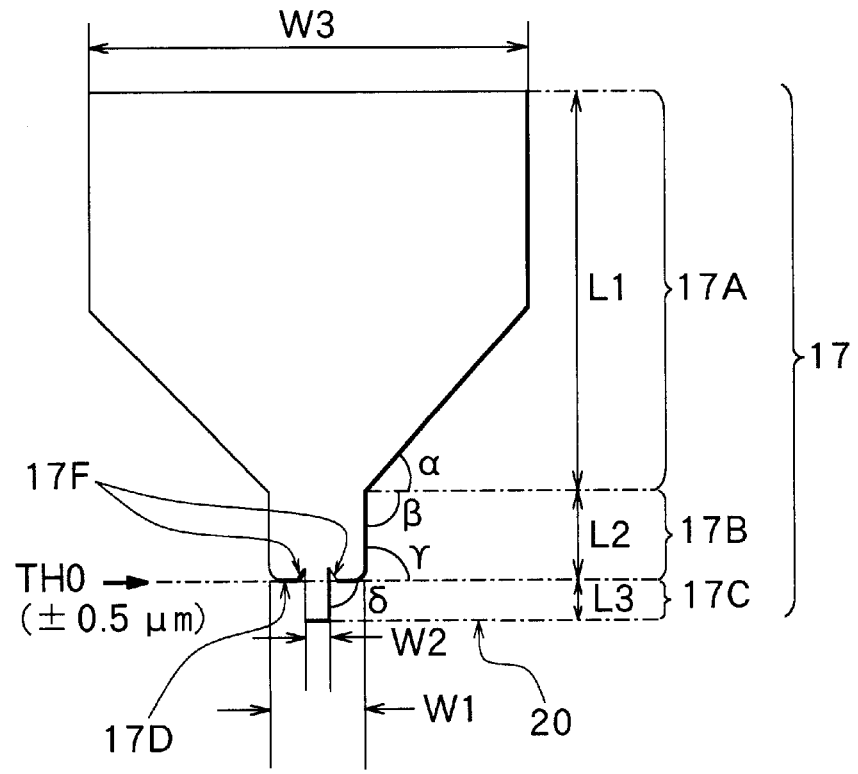
FIG. 9 is a plan view showing the structure of a top pole in the thin film magnetic head shown in FIG. 8.

The photoresist pattern 82 is used as a frame mask, a plating layer is grown by electrolytic plating using the electrode film formed before as a seed layer to form the top yoke-cum-top pole (hereinbelow, referred to as top pole) 17 in thickness of about 3 to 5 µm. After that, the photoresist pattern 82 is removed. The top pole 17 has the shape in plan view, for example, as shown in FIG. 9 or 11C and wedge-shaped recesses (or notches) 17F are provided at the corners in the coupling position between the intermediate portion 17B and the tip portion 17C of the top pole 17. The top pole 17 is in contact with and magnetically coupled to the bottom pole 7 in the opening 9A. The top pole 17 is made of, for example, Permalloy (NiFe), iron nitride (FeN) or the like as a high saturated magnetic material. The shape of the top pole 17 will be described hereinlater. The top pole 17 corresponds to an example of "at least one of two magnetic layers" in the invention.

As shown in FIG. 6A and 6B, by using the top pole 17 as a mask, the write gap layer 9 and the bottom pole 7 are etched about 0.5 µm by, for example, ion milling to thereby form a trim structure.

As shown in FIG. 7A and 7B, an overcoat layer 18 made of, for example, alumina is formed so as to cover the whole face. Finally, a slider is machined to thereby form the air bearing surface (track surface) of the recording head and the reproduction head. In such a manner, a thin film magnetic head is completed.

FIG. 8 is a plan view of a thin film magnetic head manufactured by the manufacturing method according to the embodiment (the wedge-shaped recesses 17F are not shown). In the diagram, an overcoat layer 18 is omitted. As shown in the diagram, the throat height TH is a length from the edge (TH0 position) on the pole side of the insulating layer 8 to an air bearing surface 20. Each of FIGS. 1 to 7 corresponds to a cross section taken along line A-AA of FIG. 8.

FIG. 9 shows a structure in plan view of the top pole 17. As shown in the diagram, the top pole 17 includes the yoke portion 17A which has a width W3 and occupies a majority of the top pole 17, the intermediate portion 17B having an almost constant width W1, and the tip portion 17C having an almost constant width W2 which is narrower than W1. The center in the width direction of the yoke portion 17, that of the intermediate portion 17B and that of the tip portion 17C coincide with each other. In the connecting portion between the yoke portion 17A and the intermediate portion 17B, the outer periphery of the yoke portion 17A forms an angle α to a plane parallel to the air bearing surface 20. In the connecting portion, each of the side faces of the intermediate portion 17B form an angle β to a plane parallel to the air bearing surface 20. The width of the intermediate portion 17B is almost constant and does not vary according to positions. The width of the tip portion 17C is also almost constant and does not vary according to positions. In the embodiment, α is for instance about 45 degrees and β is about 90 degrees.

The connecting portion of the intermediate portion 17B and the tip portion 17C of the top pole 17 is in the TH0 position or near the position. In this case, "near the position" denotes a range of, for example, plus or minus 0.5 µm with respect to the TH0 position. The width of the intermediate portion 17B is W1 and, on the other hand, the width of the tip portion 17C in the connecting portion is W2 which is narrower than W1. That is, in or near the TH0 position, a step in the width direction exists between the intermediate portion 17B and the tip portion 17C. An end face (hereinbelow, called step face) 17D on the intermediate portion 17B side of the step and the side face of the intermediate portion 17B form an angle γ. The step face 17D and the direction of the side face of the tip portion 17C (that is, the extending direction of the tip portion 17C) form an angle δ. In the embodiment, each of the angles γ and δ is about 90 degrees. That is, the step face 17D in the border between the tip portion 17C and the intermediate portion 17B is orthogonal to the side face of the tip portion 17C. Preferably, the angle δ lies, for example, within a range from 75 to 120 degrees. Most preferably, the angle δ is accurately set to 90 degrees.

Figure 10:
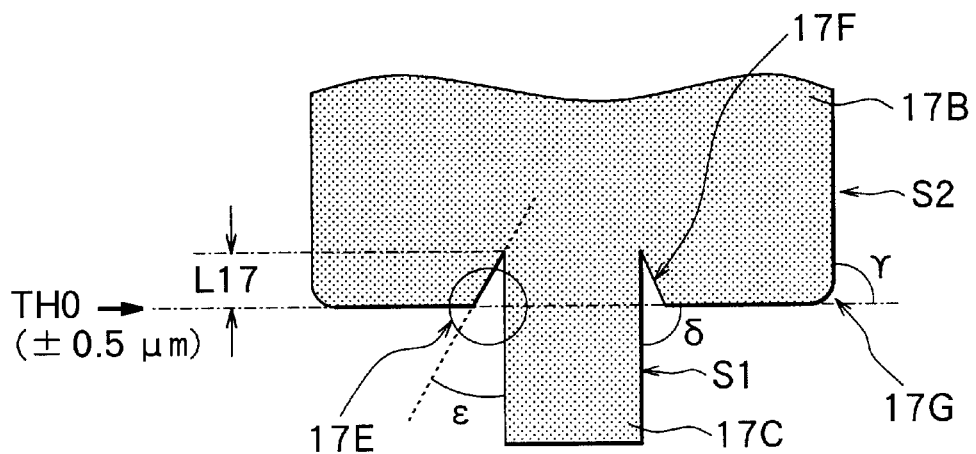
FIG. 10 is an enlarged view of the tip portion and the intermediate portion of the top pole in the thin film magnetic head shown in FIG. 9.

FIG. 10 enlargedly shows the tip portion 17C and the intermediate portion 17B in the top pole 17 of FIG. 9. Each of the step faces 17D has the corner 17E where a side face S1 of the tip portion 17C and the step face 17D cross each other. The other step face 17D has a corner 17G where a side face S2 of the intermediate portion 17B and the step face 17D cross each other. The corner 17E corresponds to an example of "first corner" in the invention. The corner 17G corresponds to an example of "second corner" in the invention.

In FIG. 10, the top pole 17 has the wedge-shaped recess 17F in the corner 17E which is formed by the photolithography and electrolytic plating. Preferably, the angle ε of the tip of the wedge-shaped recess 17F is set in a range of, for example, plus or minus 15 degrees with respect to 45 degrees. A depth L7 of the wedge-shaped recess is, for example, about 0.3 to 0.8 μm. More preferably, it is about 0.6 μm.

The tip portion 17C of the top pole 17 corresponds to an example of "first magnetic portion" in the invention. The intermediate portion 17B corresponds to an example of "second magnetic portion" in the invention. The yoke portion 17A corresponds to an example of "third magnetic portion" in the invention.

Figure 49:
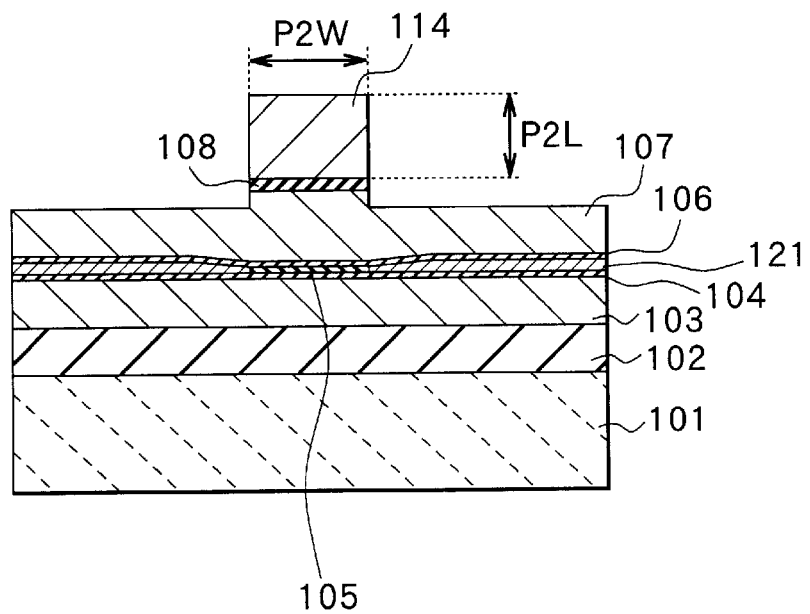
FIG. 49 is a cross section parallel to the air bearing surface of the conventional thin film magnetic head.
Figure 50:
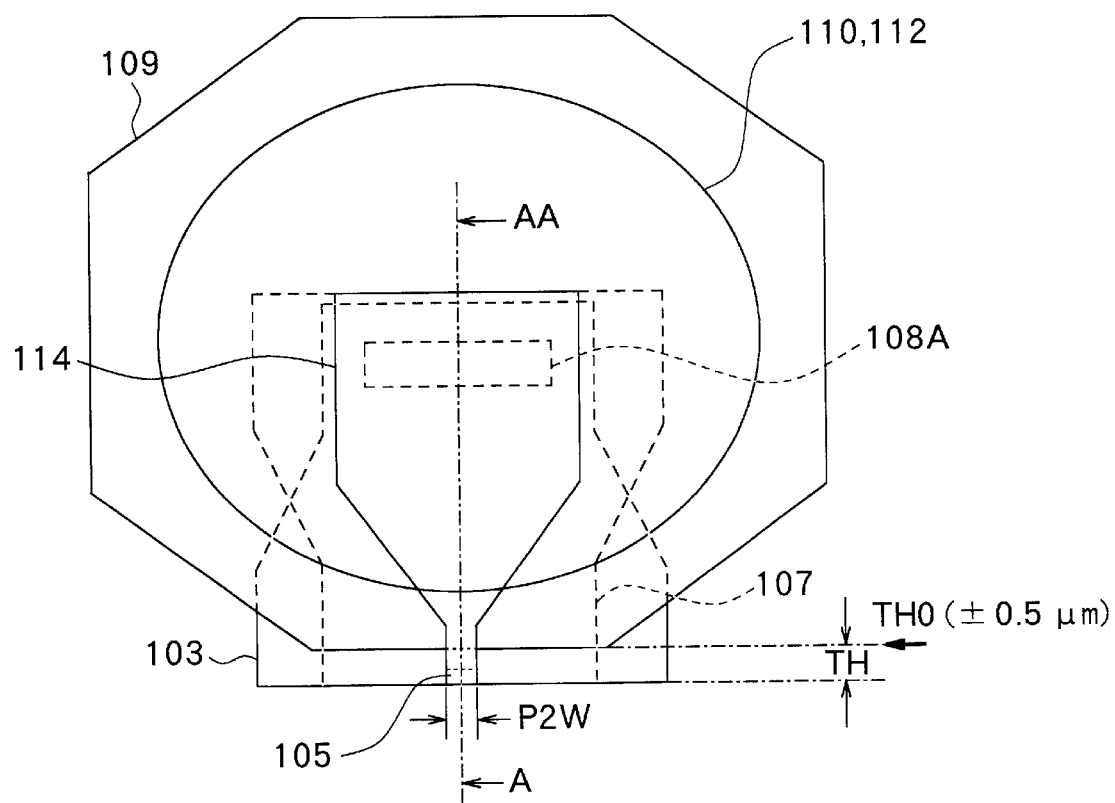
FIG. 50 is a plan view showing the structure of the conventional thin film magnetic head.

As understood from FIGS. 7A and 7B, the tip portion 17C extends on the flat write gap layer 9. The intermediate portion 17B and the yoke portion 17A extend on the apex portion which is raised in a hill shape made by the photoresist layers 11 and 13 and the like. The width W2 of the tip portion 17C corresponds to the pole width P2W (FIG. 49) and defines the width of a track on the recording medium.

Referring now to FIGS. 11A to 14, the characteristic action of the method of manufacturing the thin film magnetic head according to the embodiment will be described.

FIG. 11A shows the shape in plan view of the photomask 81 for a positive photoresist according to the embodiment. FIG. 11B shows the shape in plan view of the photoresist pattern 82 formed by performing photolithography with the photomask 81. Further, FIG. 11C shows the shape in plan view of the top pole 17 formed by electrolytic plating or the like by using the photoresist pattern 82.

As shown in FIG. 11A, the photomask 81 has, basically, an opening 81P having a pattern shape almost same as that of the top pole 17 to be obtained. The opening 81P includes a portion 81A corresponding to the yoke portion 17A of the top pole 17, a portion 81B corresponding to the intermediate portion 17B and a portion 81C corresponding to the tip portion 17C. The photomask 81 has the projections 81F at the corners 81E corresponding to the first corners 17E of the top pole 17.

A step face 81D in the width direction at the boundary position between the portions 81B and 81C corresponds to the same portion (82D) in the photoresist pattern 82 in FIG. 11B and the same portion (17D) of the top pole 17 in FIG. 11C. It is preferable to position the photomask 81 so that the step face 81D is within the range of plus or minus 0.5 μm with respect to the throat height zero position. In the embodiment, the projection 81F of the photomask 81 has a shape of, for example, a right-angled triangle. In the embodiment, a corner 81G of the photomask 81 corresponding to the second corner 17G of the top pole 17 has a shape of, for example, a sharp right-angled edge.

FIG. 12A shows the shape in plan view of a photomask 181 as a comparative example of the photomask 81 of FIG. 11A. FIG. 12B shows the shape in plan view of a photoresist pattern 182 formed by using the photomask 181. FIG. 12C shows the shape in plan view of the top pole 117 formed by the photoresist pattern 182.

In the photomask 181 as a comparative example shown in FIG. 12A, the corner 181E corresponding to the corner 81E of the photomask 81 does not have the shape corresponding to the projection 81F of the photomask 81. Consequently, even if each of the corners 181E in the photomask 181 has a sharp right-angled edge, as shown in FIG. 12B, in the photoresist pattern 182 formed by exposure, each of corners 182E corresponding to the corners 181E has a rounded shape for the following reason. Reflection light from the underlayer at the time of exposure enters under the shoulder of the step 181D in the photomask 181 and the edge portion of the photoresist pattern is exposed to the light. As a result, the shoulder is rounded. Also in the top pole 117 obtained finally, the first corner 117E is rounded and the expected sharp right-angled corner edge cannot be obtained.

On the contrary, in the embodiment, as shown in FIG. 11A, the photomask 81 has the projection 81F having the shape of, for example, a right-angled triangle in the corner 81E in the photomask 81, which corresponds to the first corner 17E of the top pole 17. Due to the existence of the projection 81F, a corresponding corner 82E of the photoresist pattern 82 is not rounded. Rather, the projection 82F as shown in FIG. 11B is formed. The portions 82A, 82B and 82C in the photoresist pattern 82 correspond to the portions 81A, 81B and 81C in the photomask 81, respectively. In this case, a length L4 of the projection 81F in the photomask 81 from the step face 81D and a length L6 of the projection 82F in the photoresist pattern 82 from the step face 82D do not usually coincide with each other but L6 is shorter than L4 for the following reason. The reflection light from the underlayer at the time of exposure acts so as to enter under the shoulder of the step face 81D in the photomask 81, and the edge in the photoresist pattern is exposed to the light, thereby positioning the sharply projected portion of the shoulder backward. In this case, by adjusting the size of the projection 81F of the photomask 81 and the exposure amount, the projection 82F can be formed at the corner 81E in the photoresist pattern 82.

The corner 81G in the photomask 81, which corresponds to the second corner 17G of the top pole 17 has an almost right angle. However, the corner 82G in the photoresist pattern 82, which corresponds to the corner 81G does not have a right-angled shape due to an influence of reflection light from the underlayer at the time of exposure but is rounded. The second corner 17G of the top pole 17 is therefore also rounded. The depth L7 of the wedge-shaped recess 17F in the top pole 17 in FIG. 11C is almost equal to L6.

The photolithography process is performed by using the photomask 81 and, for example, electrolytic plating is performed by using the photoresist pattern 82 which is formed by the process, thereby forming the top pole 17 of FIG. 11C. The wedge-shaped recesses 17F are formed in the corners 17E of the top pole 17. In this case, the position of the step face 82D of the photoresist pattern 82 after exposure matches with the position of the step face 81D of the photomask 81 and also matches with the step face 17D of the top pole 17. The step face 81D in the photomask 81 is orthogonal to the side face of the portion 81C. The straight line in the step face 82D in the photoresist pattern 82 is orthogonal to the side face in the portion corresponding to the portion 81C of the photomask 81. The straight line in the step face 17D in the top pole 17 is orthogonal to the side face of the tip portion 17C.

Figure 13:
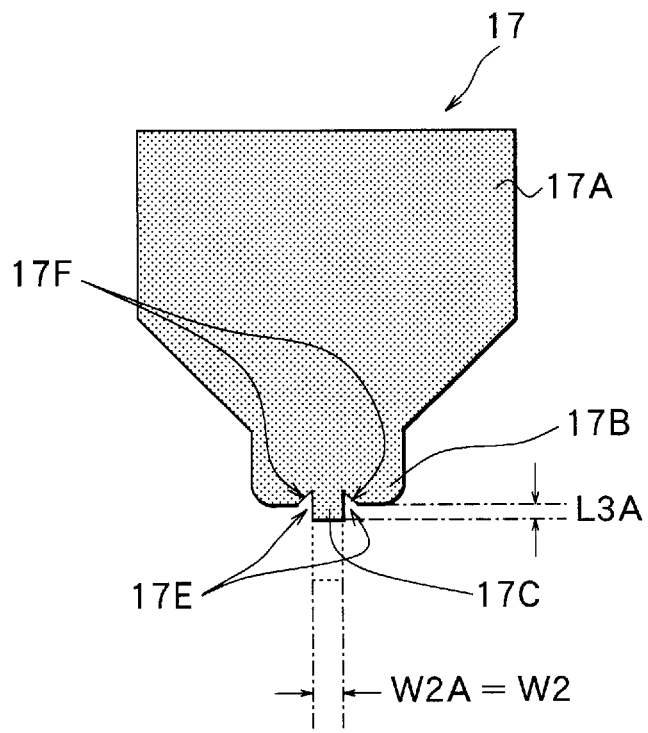
FIG. 13 is a plan view of a top pole formed by a method of manufacturing a thin film magnetic head according to the first embodiment.
Figure 14:
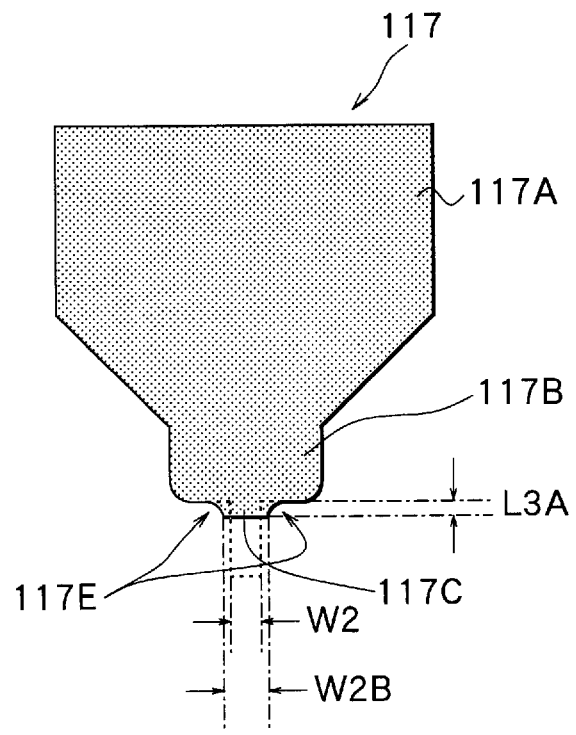
FIG. 14 is a plan view of a top pole formed by a method of manufacturing a thin film magnetic head according to the comparative example.

FIGS. 13 and 14 show a thin film magnetic head obtained by the method of manufacturing the thin film magnetic head according to the embodiment and a thin film magnetic head obtained by the method of manufacturing the thin film magnetic head according to the comparative example for comparison. More specifically, FIG. 13 shows the final shape in plan view of the top pole 17 obtained by using the photomask 81 shown in FIG. 11A and FIG. 14 shows the final shape in plan view of the top pole 117 obtained by using the photomask 181 shown in FIG. 12A.

As described in the related art, in order to improve the NLTS characteristic, it is necessary to make the throat height TH sufficiently short. For example, as shown in FIG. 14, when the polishing amount of the air bearing surface is set to be larger than that of the case of FIG. 12C shown as the comparative example and the throat height TH is set to a sufficiently small value L3A (for example, about 0.4 $\mu$m), the width W2B (pole width) of the tip portion 117 which defines the recording track width becomes wider than the expected width W2 (the width of the portion 181C in the photomask 181) due to the influence of the corners 117E rounded. It is therefore difficult to reduce the recording track width. When the throat height TH is changed, due to the influence of the rounded corners, the pole width obtained is also changed. A stable recording track width cannot be therefore obtained.

In contract with the above, in the embodiment, as shown in FIG. 13, since the first corners 17E have the wedge-shaped recesses 17F and are not rounded, even when the throat height TH is set to the sufficiently small value L3A, the width (pole width) of the tip portion 17C which defines the recording track width is almost equal to the expected width W2 (width of the portion 81C in the photomask 81) and is almost constant irrespective of a position in the extending direction of the tip portion 17C. Consequently, the recording track width can be set to be a small value. Even when the throat height TH is changed, the recording track width is not changed. Thus, the stable recording track width can be obtained.

Figure 15:
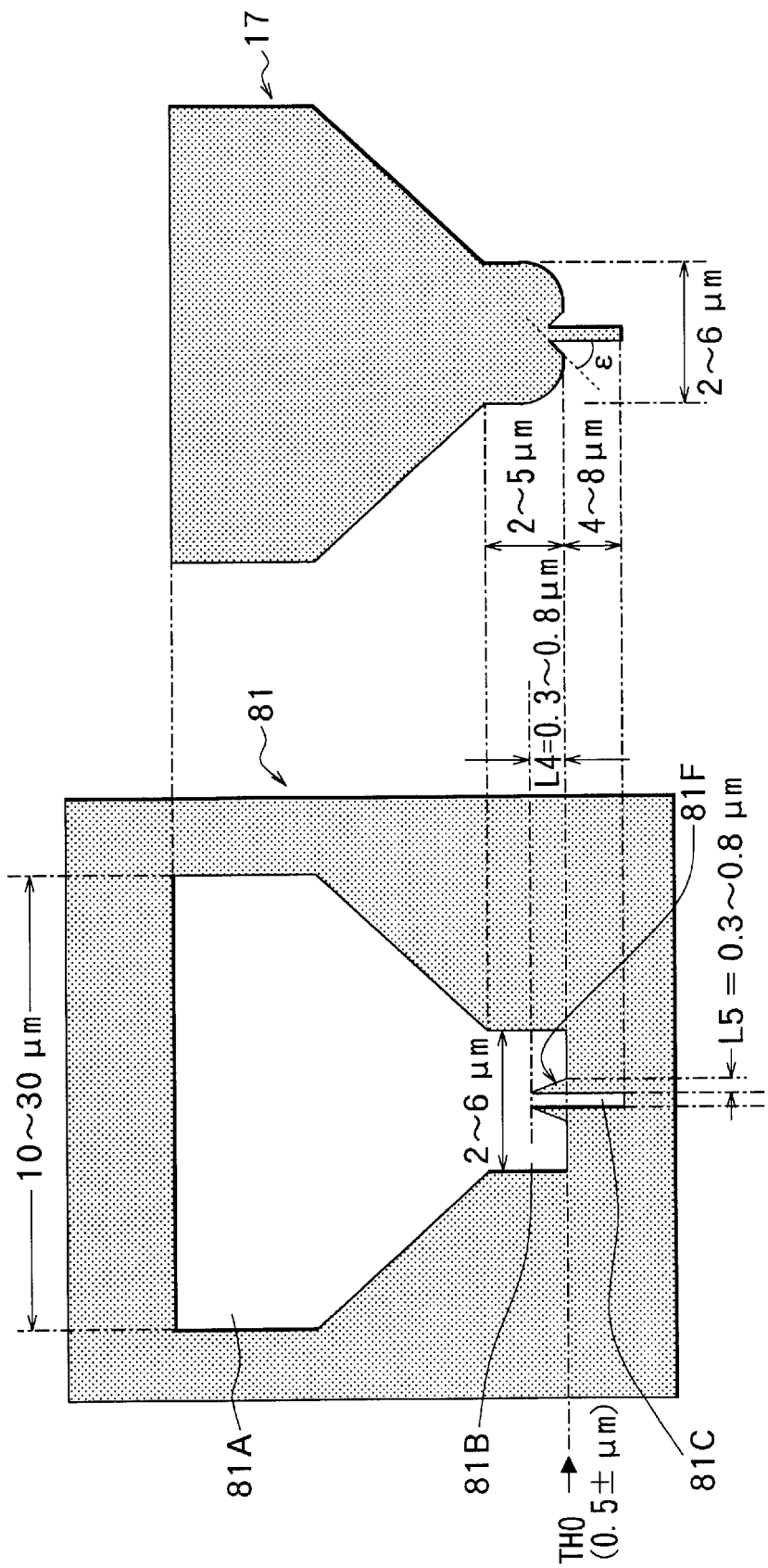
FIGS. 15A and 15B are plan views showing an example of preferable dimensions of a photomask used in the thin film magnetic head manufacturing method according to the first embodiment.

FIG. 15A shows an example of dimensions of the photomask 81 (FIG. 11A) used in the embodiment. FIG. 15B shows the top pole 17 obtained by using the photomask 81. In the example shown in FIG. 15A, the projection 81F has the right-angled triangle shape and the tip of the projection 81F has a sharp angle. The angle of the tip can be set to a value smaller than 90 degrees. More preferably, it is in a range from 40 to 60 degrees. In the projection 81F, preferably, each of a length L4 from the throat height zero position to the tip and a width L5 from the intersecting point between the projection 81F and the throat height zero position line to the edge of the portion 81C is 0.3 to 0.8 $\mu$m. The lengthwise direction denotes the extending direction (direction orthogonal to the air bearing surface) of the portion 81C corresponding to the tip portion 17C. The width direction denotes the direction (direction parallel to the air bearing surface) which is orthogonal to the extending direction of the tip portion 17C.

The portion 81C corresponding to the tip portion 17C has a width of about 0.3 to 1.0 $\mu$m and a length of about 4.0 to 8.0 $\mu$m. The portion 81B corresponding to the intermediate portion 17B has a width of about 2.0 to 6.0 $\mu$m and a length of about 2.0 to 5.0 $\mu$m. The width of the portion 81A corresponding to the yoke portion 17A is about 20.0 to 40.0 $\mu$m.

Figure 51:
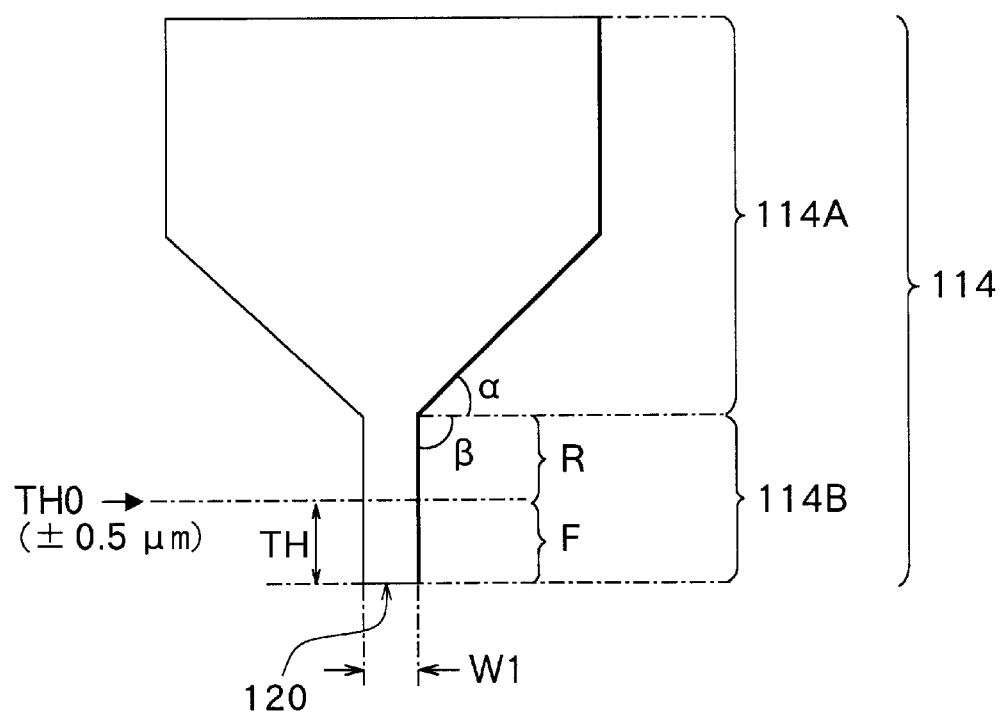
FIG. 51 is a plan view showing the structure of a top pole in the conventional thin film magnetic head.
Figure 52:
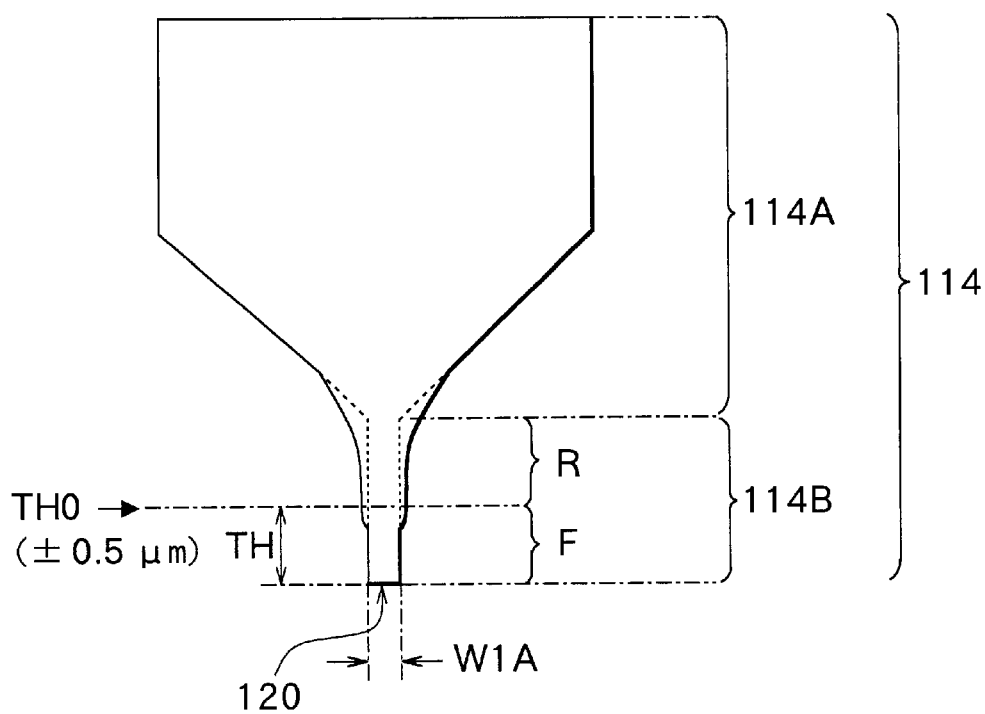
FIG. 52 is a plan view of the top pole for explaining problems in the case of making the top pole in the conventional thin film magnetic head finer.
Figure 53:
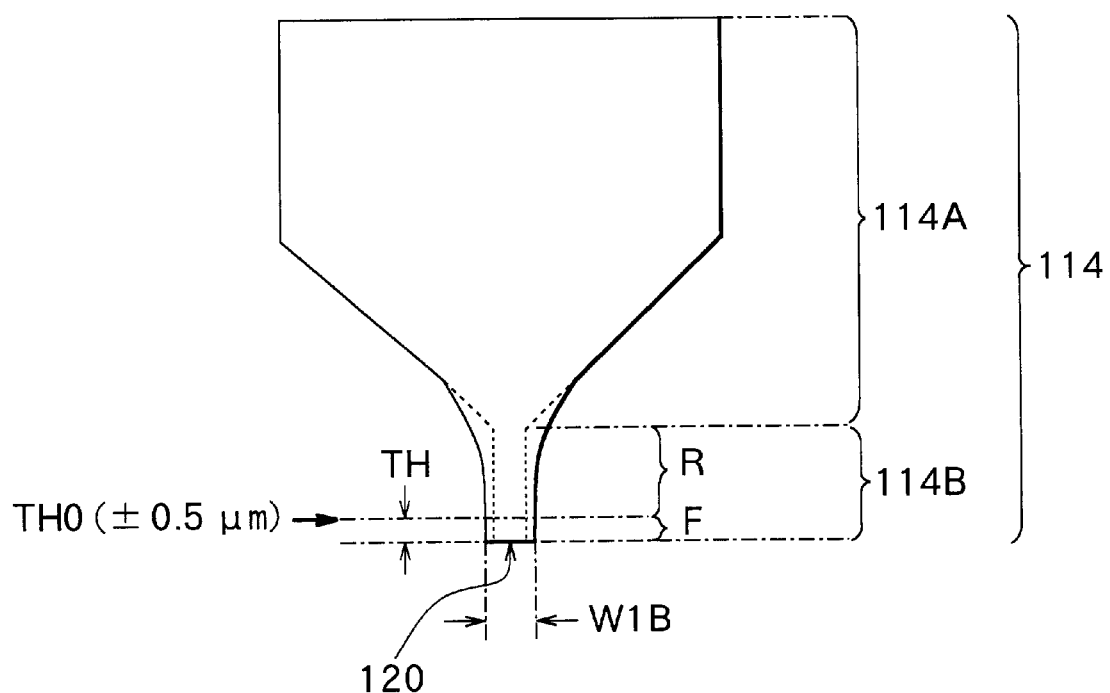
FIG. 53 is a plan view of the top pole for explaining problems in the case of making the top pole in the conventional thin film magnetic head finer.
Figures 54A, 54B:
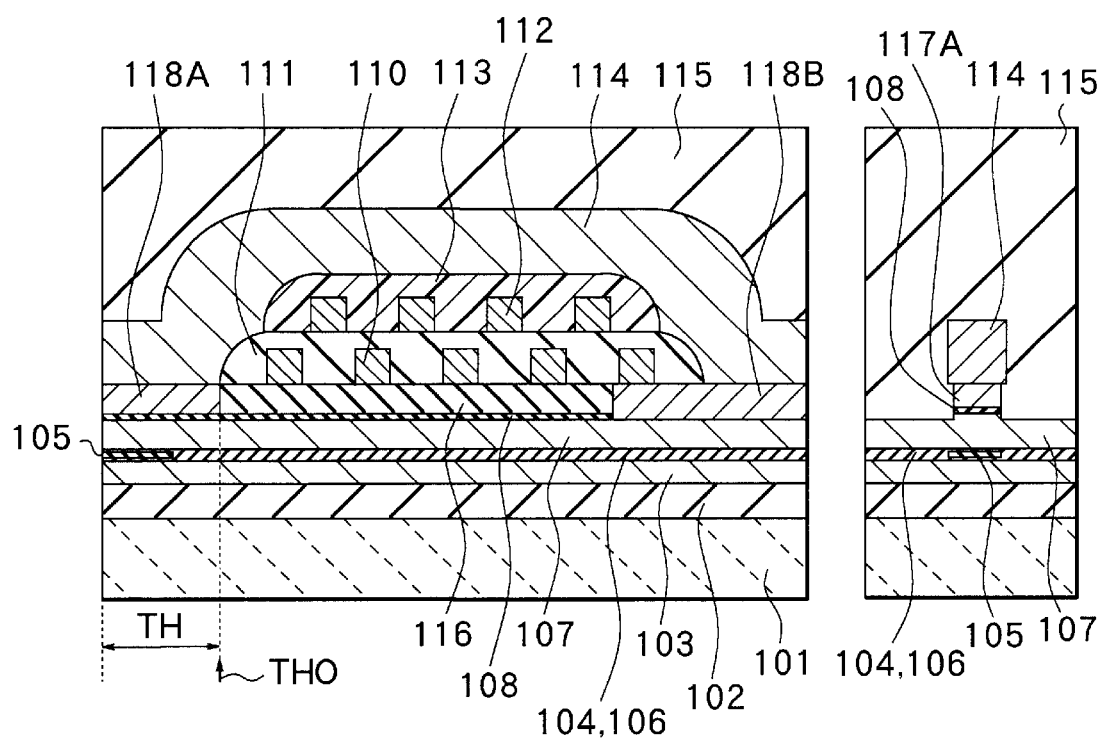
FIG. 54A and 54B are plan views showing the structure of a top pole in another thin film magnetic head manufactured by the conventional thin film magnetic head manufacturing method.

The thin film magnetic head having the top pole 17 of such a shape exhibits high performances in the overwrite characteristic. Specifically, in the top pole 17, as shown in FIG. 9, the intermediate portion 17 coupled to the tip portion 17C at the TH0 position has the width W1 much wider than the width W2 of the tip portion 17C which defines the width of a track on a recording medium. The volume of the intermediate portion 17B is larger than that of the portion R in the conventional case (FIG. 51). The magnetic flux generated in the yoke portion 17A by the thin film coils 10 and 12 is not saturated in the intermediate portion 17B but sufficiently reaches the tip portion 17C. Even when the tip portion 17C corresponds to the narrow recording track width of, for example, submicrons, a sufficient magnitude of the magnetic flux for overwriting can be obtained. That is, the sufficient overwrite characteristic can be assured while realizing the reduction in recording track width.

Figure 16:
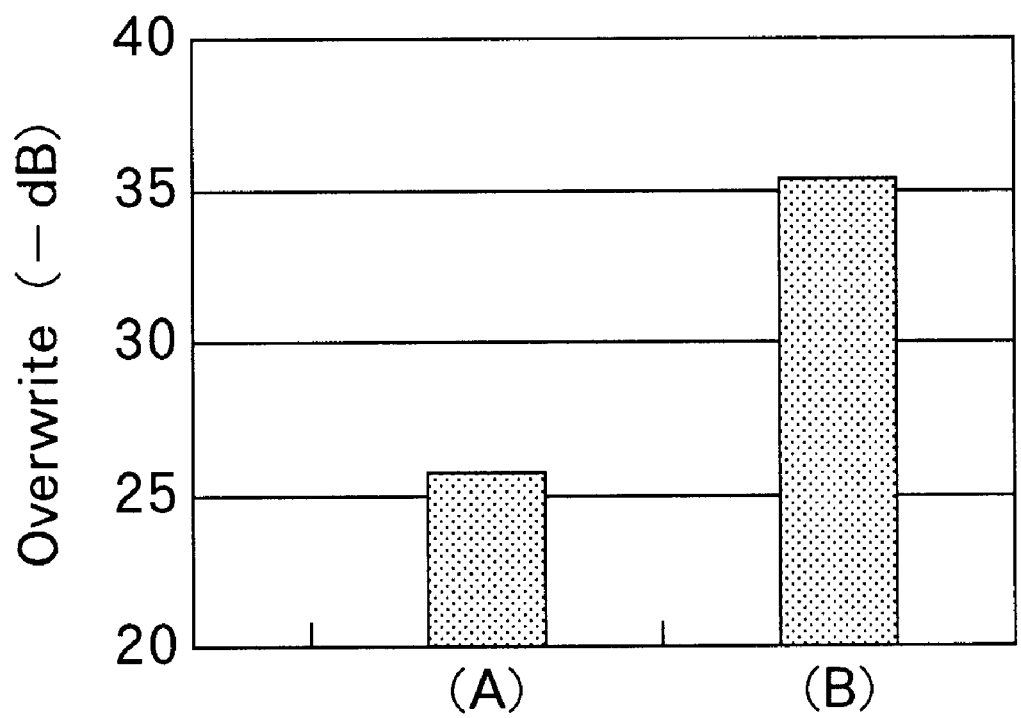
FIG. 16 is a diagram showing an overwrite characteristic of the thin film magnetic head obtained by the thin film magnetic head manufacturing method according to the first embodiment and that of the thin film magnetic head obtained by the conventional thin film magnetic head manufacturing method for comparison.

FIG. 16 shows the overwrite characteristic of the thin film magnetic head manufactured by the conventional manufacturing method and the overwrite characteristic of the thin film magnetic head manufactured by the manufacturing method of the embodiment for comparison. Reference character (A) in the diagram expresses the overwrite characteristic of the conventional thin film magnetic head having the top pole 114 of a shape shown in FIG. 51. Reference character (B) in the diagram expresses the overwrite characteristic of the thin film magnetic head having the top pole 17 of a shape as shown in FIG. 9. As shown in the diagram, the thin film magnetic head manufactured by the manufacturing method of the embodiment attains a value as high as 35.5 dB in contrast to 26.0 dB of the thin film magnetic head manufactured by the conventional manufacturing method. Consequently, the overwrite characteristic has been improved.

In the method of manufacturing the thin film magnetic head according to the embodiment, the photoresist pattern functioning as a mask used to form the top pole 17 is formed by using a positive photoresist. At the time of forming the photoresist pattern, the projections 81F are provided in the corners 81E of the photomask 81, which correspond to the first corners 17E in the top pole 17. The step face 82D of the photoresist pattern 82 formed by using the photomask 81 and the side face corresponding to the portion 81C form the right angle, and the projections 82F are formed in the corners 82E. In the top pole 17 formed with the photoresist pattern 82 by plating, the step face 17D and the side face of the tip portion 17C form the right angle and the wedge-shaped recesses 17F are formed in the first corners 17E. Consequently, even when the throat height TH is changed, the recording track width is not changed, so that the stable recording track width can be obtained and the recording track width can be prevented from being widened. The occurrence of the side write phenomenon can be therefore effectively prevented.

According to the embodiment, since the thin film magnetic head is formed so that the intermediate portion 17B is sufficiently wider than the tip portion 17C, the magnetic volume in the portion just behind the coupling position can be sufficiently assured. Therefore, the magnetic flux generated in the yoke portion 17A is prevented from being saturated before reaching the tip portion 17C, and the sufficient overwrite characteristic can be assured.

In the embodiment, the insulating layer 8 which defines the throat height TH is made by an inorganic insulating film, positional fluctuations of the edge of the insulating layer 8, i.e. pattern shift, and deterioration in profile are not caused by the heat treatment at about 250° C. for forming the coils 10 and 12. The accurate control of the throat height can be accordingly made. Further, the MR height and the apex angle θ can be also accurately controlled.

In the embodiment, the inorganic insulating film is used as the insulating layer 8 which defines the throat height, so that the positional fluctuation of the insulating layer 8 at the time of etching the write gap layer 9 and the bottom pole 7 to form the trim structure does not occur. It also makes the accurate control of the throat height possible.

According to the embodiment, not only the thin write gap layer 9 but also the thick insulating layer 8 are formed between the bottom pole (upper shield) 7 and the thin film coils 10 and 12. Consequently, the large dielectric withstand voltage can be obtained between the bottom pole (upper shield) 7 and the thin film coils 10 and 12 and the leakage of the magnetic flux from the thin film coils 10 and 12 can be reduced.

Although the top pole 17 is made of, for example, NiFe or iron nitride (FeN) in the embodiment, a material having high saturated magnetic flux density such as amorphous Fe—Co—Zr may be also used. Two or more kinds of the materials may be also used. The bottom pole 7 may be also made of a magnetic material obtained by stacking NiFe with the material having high saturated magnetic flux density.

Figure 11:
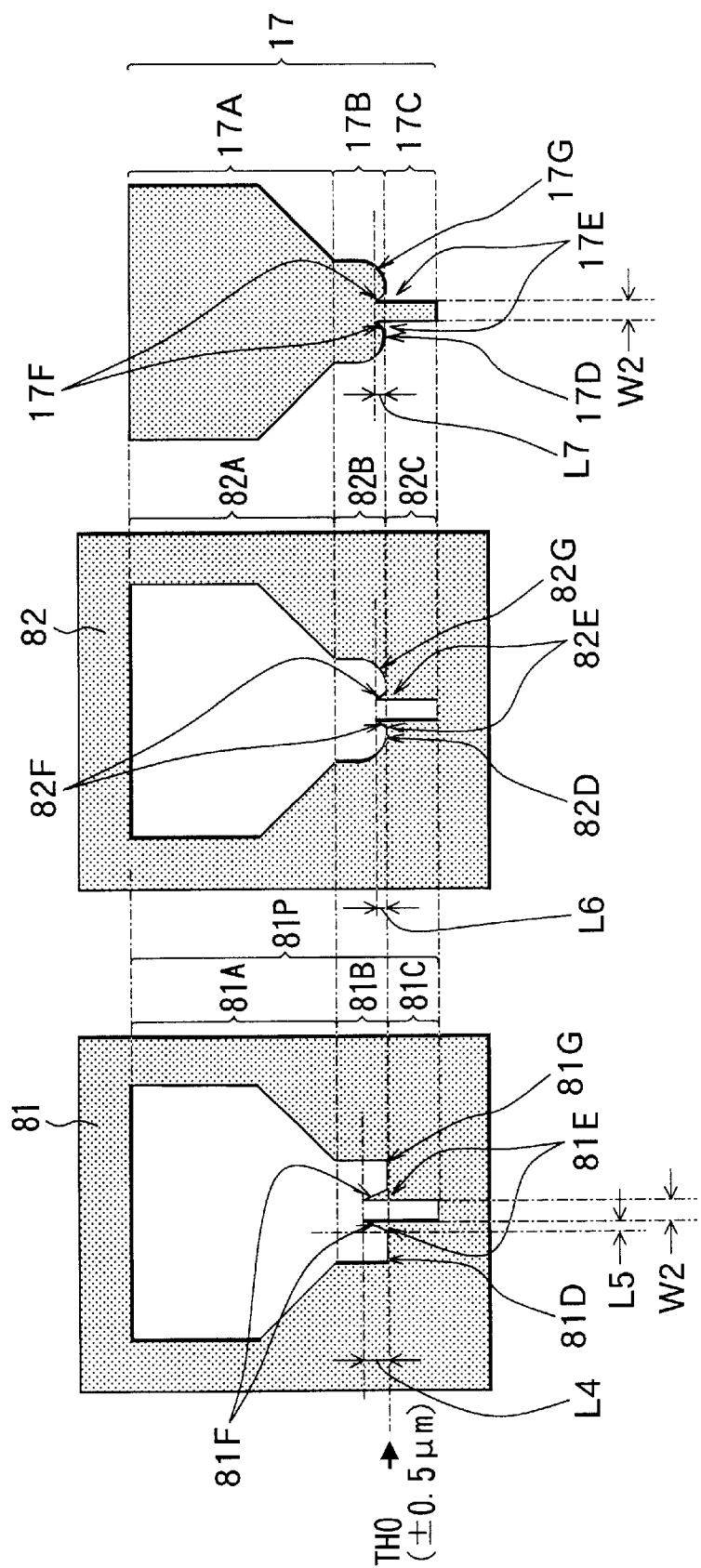
FIGS. 11A to 11C are plan views showing the relation between shapes in plan view of a photomask, a photoresist pattern, and a top pole used in the first embodiment.
Figure 12:
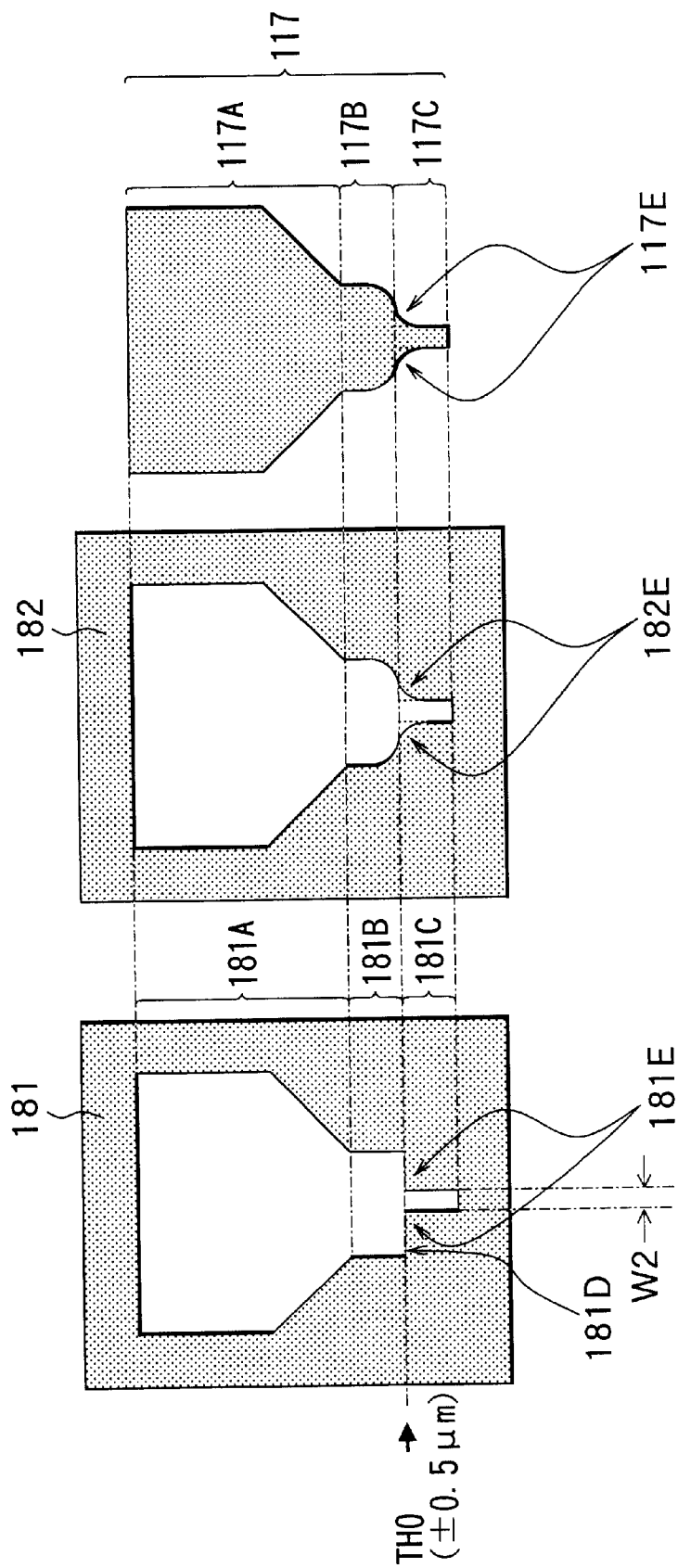
FIGS. 12A to 12C are plan views showing the relation between shapes in plan view of a photomask, a photoresist pattern, and a top pole used in the comparative example for the first embodiment.
Figure 17:
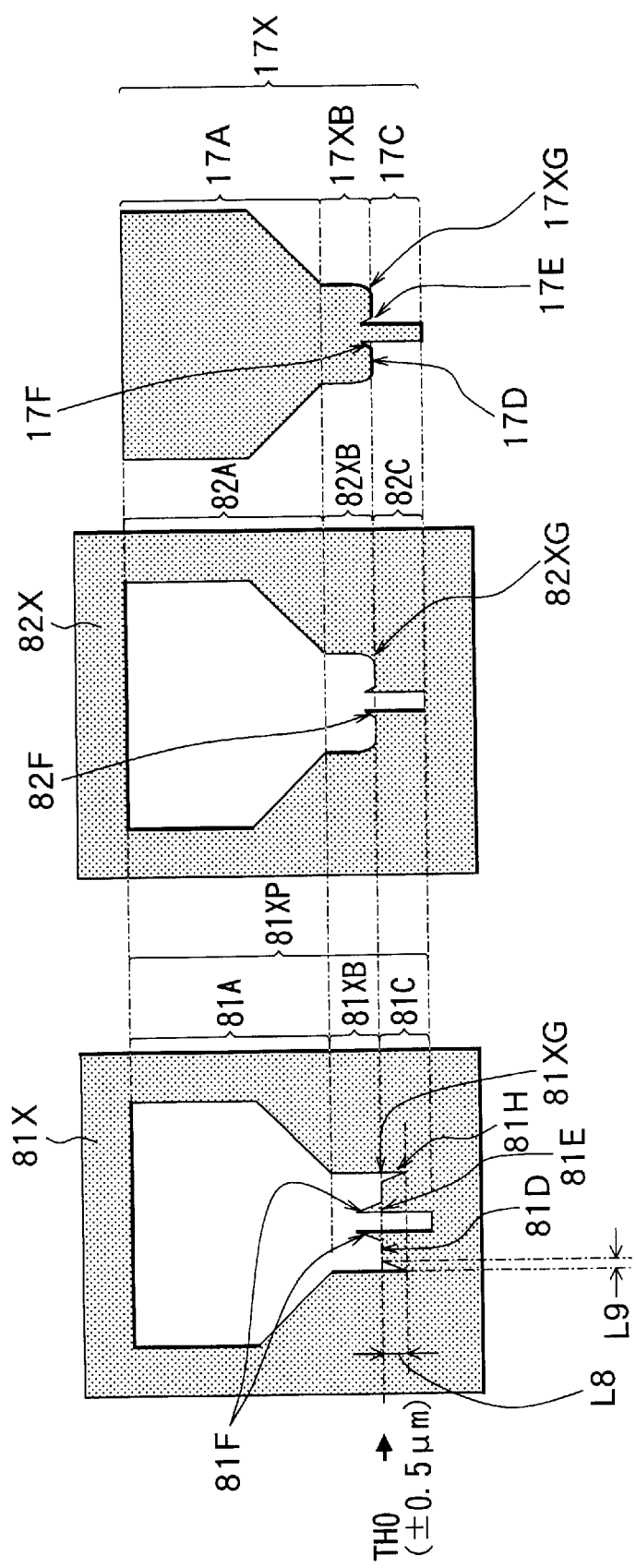
FIGS. 17A to 17C are plan views of a photomask, a photoresist pattern, and a top pole according to a modification of the first embodiment.
Figure 18:
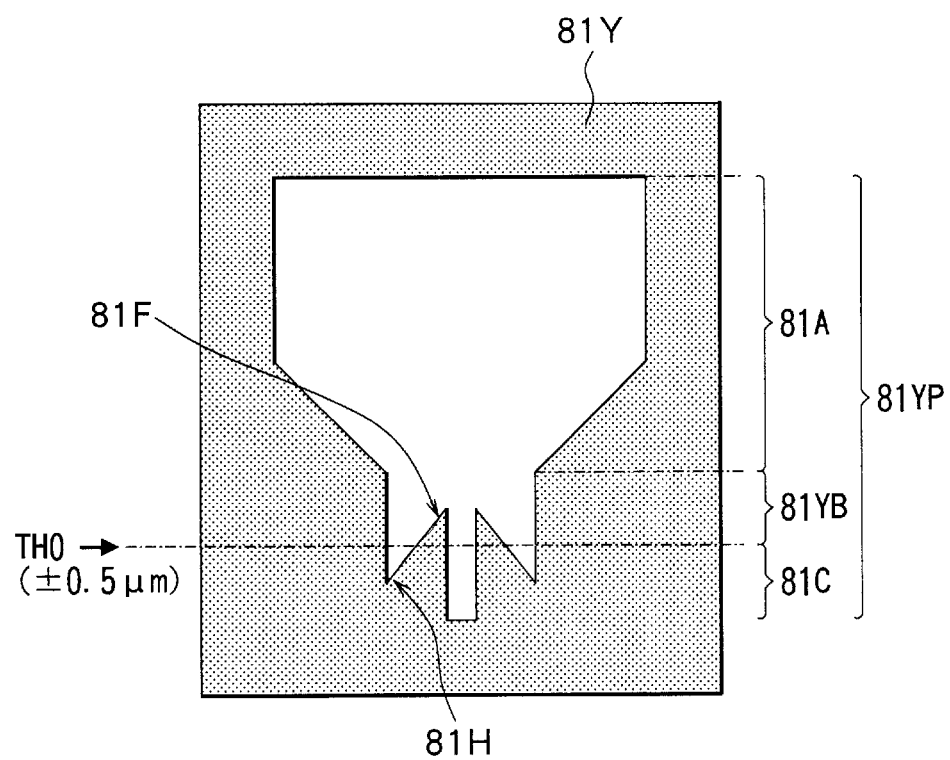
FIG. 18 is a plan view of a photomask according to another modification of the first embodiment.
Figure 19:
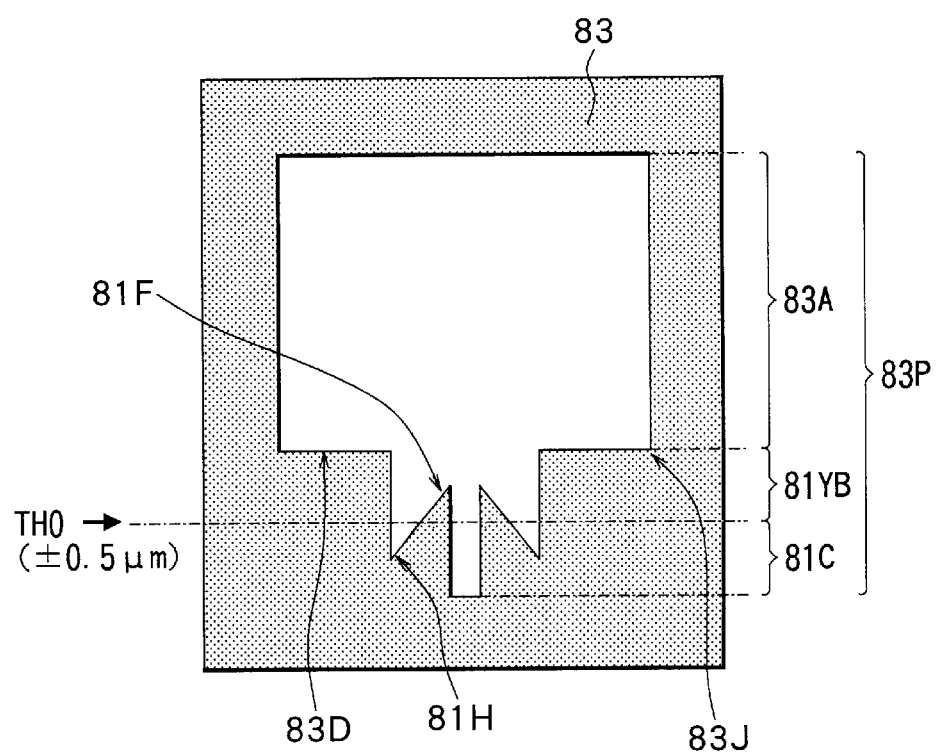
FIG. 19 is a plan view of a photomask according to further another modification of the first embodiment.

The shape of the photomask 81 is not limited to the shape shown in FIG. 11A. For example, shapes shown in FIGS. 17 to 19 may be also used. In the diagrams, the same explanation which has been made with respect to the photomask 81, photoresist pattern 82 and top pole 17 in FIG. 11 is omitted here. In FIGS. 17A to 17C, the same components as those in FIG. 11 are designated by the same reference numerals. In FIGS. 18 and 19, the same components as those in FIGS. 17A to 17C are designated by the same reference numerals.

FIGS. 17A to 17C show a modification of the embodiment. FIG. 17A shows the shape in plan view of a photomask 81X as a modification of the photomask 81 shown in FIG. 11. FIG. 17B shows the shape in plan view of a photoresist pattern 82X formed by using the photomask 81X. Further, FIG. 17C shows the shape in plan view of the top pole 17X formed with the photoresist pattern 82X by electrolytic plating or the like. The photomask 81X includes an opening 81XP consisting of portions 81A, 81XB and 81C. In a manner similar to the photomask 81 (FIG. 11A), the photomask 81X has the projections 81F in the corners 81E corresponding to the first corners 17E of the top pole 17X.

The photomask 81X further includes a recess 81H in a corner 81XG corresponding to the second corner 17XG of the top pole 17X. The recess 81H has, for example, a right-angled triangle shape. The angle of the tip of the recess 81H can be set to a value smaller than 90 degrees. More preferably, it is in a range from 40 to 60 degrees. Preferably, each of a depth L8 from the throat height zero position to the tip of the recess 81H and a width L9 from the intersecting point between the recess 81H and the throat height zero position line to the side face of a portion 81XB is 0.3 to 0.8 μm. The depth direction denotes here the extending direction of the portion 81C corresponding to the tip portion 17C.

The projection 81F and the recess 81H in the photomask 81X exist in positions corresponding to the first and second corners 17E and 17XG in the top pole 17X, respectively. The linear step face 81D is interposed between the projection 81F and the recess 81H. It is not always necessary that the projection 81F and the recess 81H have the same shape (same dimensions) but can be freely set within the range of the angles of the tip and the dimensions.

By performing the photolithography with the photomask 81X, the photoresist pattern 82X as shown in FIG. 17B is obtained. The portions 82A, 82XB and 82C in the photoresist pattern 82X correspond to the portions 81A, 81XB and 81C in the photomask 81X, respectively. As described above, the photoresist pattern 82X has the projections 82F in the positions corresponding to the projections 81F of the photomask 81X. The corner 82XG corresponding to the corner 81XG in the photomask 81X does not have a right-angled shape but is slightly rounded by the influence of reflection light from the underlayer at the time of exposure in the photolithography process. When the shape of the corner 82XG in the photoresist pattern 82X in FIG. 17B and that of the corresponding corner 82G in the photoresist pattern 82 in FIG. 11B are compared with each other, the shape of the former corner 82XG is less rounded and is more like the right-angled shape. This is because the recess 81H of the photomask 81X acts so as to suppress the rounding of the corner 82XG in the photoresist pattern 82X in the process of forming the photoresist pattern 82X (at the time of exposure). In the top pole 17X formed by plating or the like with the photoresist pattern 82X as well, the second corner 17XG has a shape more like a right-angled shape as compared with the corner 17G of the top pole 17 in FIG. 11C.

It is preferable to set the size of the recess 81H and the exposure amount so that the corners 82XG in the photoresist pattern 82X corresponding to the second corners 17XG in the top pole 17 do not project forward from the throat height zero position line (air bearing surface side). The other characteristic shapes of the photoresist pattern 82X and the top pole 17X are similar to those of the photoresist pattern 82 (FIG. 11B) and the top pole 17 (FIG. 11C).

FIG. 18 shows the shape in plan view of a photomask 81Y as another modification of the embodiment. The photomask 81Y includes an opening 81YP consisting of portions 81A, 81YB and 81C. The photomask 81Y has the projections 81F and the recesses 81H similar to those in the photomask 81X (FIG. 17A) in the corresponding positions. In the photomask 81Y of the modification, however, the projection 81F and the recess 81H are coupled to each other at the throat height zero position. It is not always necessary that the projection 81F and the recess 81H have the same shape (same dimensions) but can be freely set within the range of the angles of the tip and the dimensions. The other characteristic shape of the photomask 81Y is similar to that of the photomask 81X (FIG. 17A). By using the photomask 81Y, products of almost the same shapes as those of the photoresist pattern 82X and the top pole 17X can be obtained.

FIG. 19 is a plan view of the photomask 83 as further another modification of the embodiment. The photomask 83 includes an opening 83P consisting of portions 83A, 81YB and 81C. In the photomask 83, a corner 83J at which the side face of the portion 83A and the step face 83d in the coupling position of the portions 83A and 83BY has almost the right angle. The other characteristic shape of the photomask 83 is similar to that of the photomask 81Y. By using the photomask 83, products of substantially the same shapes as the photoresist pattern 82X and the top pole 17X can be obtained.

Second Embodiment

A second embodiment of the invention will now be described.

A method of manufacturing a thin film magnetic head according to the embodiment is, different from the first embodiment, applied to the case of forming a photoresist pattern by using a negative photoresist, that is, a photoresist in which only exposed areas remain after development. In the following, from the photolithography process using a photomask to the top pole forming process will be described. Since the other processes, actions and effects are similar to those of the first embodiment, their description is omitted here.

FIG. 20A shows the shape in plan view of a photomask 84 for a negative photoresist according to the embodiment. FIG. 20B shows the shape in plan view of a photoresist pattern 85 formed by performing a photolithography process with the photomask 84. Further, FIG. 20C shows the shape in plan view of a top pole 217 formed by, for example, electrolytic plating with the photoresist pattern 85.

As shown in FIG. 20A, the photomask 84 has basically a pattern shape which is substantially the same as that of the top pole 217 to be obtained and includes a portion 84A corresponding to a yoke portion 217A in the top pole 217, a portion 84B corresponding to an intermediate portion 217B, and a portion 84C corresponding to a tip portion 217C. The photomask 84 has a recess 84K in a corner 84E corresponding to a first corner 217E in the top pole 217.

A step face 84D in the width direction in the boundary position between the portions 84B and 84C corresponds to both the same portion (85D) in the photoresist pattern 85 in FIG. 20B and the same portion (217D) of the top pole 217 in FIG. 20C. It is preferable to position the photomask 84 so that the step face 84D is within the range of plus or minus 0.5 µm with respect to the throat height zero position. In the embodiment, the recess 84K in the photomask 84 has, for example, a right-angled triangle shape. A corner 84G in the photomask 84 corresponding to a second corner 217G in the top pole 217 has, for example, a sharp right-angled edge shape.

FIG. 21A shows the shape in plan view of a photomask 184 as a comparative example of the photomask 84 of FIG. 20A. FIG. 21B shows the shape in plan view of a photoresist pattern 185 formed by using the photomask 184. FIG. 21C shows the shape in plan view of a top pole 317 formed by the photoresist pattern 185.

In the photomask 184 as a comparative example shown in FIG. 21A, a corner 184E corresponding to the corner 84E in the photomask 84 does not have a portion corresponding to the shape of the recess 84K in the photomask 84. Consequently, even when the corner 184E in the photomask 184 has a sharp right-angled edge, as shown in FIG. 21B, in the photoresist pattern 185 formed by exposure, a corner 185E corresponding to the corner 184E has a rounded shape for the following reason. Reflection light from the underlayer at the time of exposure enters below the shoulder of the step face 184D in the photomask 184 and the edge portion in the photoresist pattern is exposed to the light and, as a result, the shoulder is rounded. Also in the top pole 317 obtained finally, therefore, a first corner 317E is rounded and an expected sharp right-angled corner edge cannot be obtained.

On the contrary, in the embodiment, as shown in FIG. 20A, the photomask 84 includes the recess 84K having, for example, a right-angled triangle shape in the corner 84E corresponding to the first corner 217E in the top pole 217. Because of the existence of the recess 84K, the corresponding corner 85E in the photoresist pattern 85 is not rounded but, rather, a projection 85F is formed as shown in FIG. 20B.

The portions 85A, 85B and 85C in the photoresist pattern 85 correspond to the portions 84A, 84B and 84C in the photomask 84, respectively. A depth L10 from the step face 84D of the recess 84K in the photomask 84 and a length L12 from the step face 85D of the projection 85F in the photoresist pattern 85 do not usually coincide with each other but the length L12 is smaller than the depth L10. This is because that reflection light from the underlayer at the time of exposure enters under the shoulder portion of the step face 84D in the photomask 84 to expose the edge portion in the photoresist pattern to light and acts so that the portion projected at an acute angle retreats. In this case, by adjusting the size of the recess 84K in the photomask 84 and the exposure amount, the projection 85F can be formed in the corner 85E in the photoresist pattern 85.

Although the corner 84G in the photomask 84 corresponding to the second corner 217G in the top pole 217 has almost the right angle, the corner 85G corresponding to the corner 84G in the photoresist pattern 85 does not have a right-angled shape but is rounded due to the influence of the reflection light from the underlayer at the time of exposure. Consequently, the second corner 217G in the top pole 217 is also rounded. A depth L13 of a wedge-shaped recess 217F in the top pole 217 in FIG. 20C is almost equal to L12.

By performing photolithography with the photomask 84 and, for example, electrolytic plating by using the obtained photoresist pattern 85, the top pole 217 of FIG. 20C is formed. The wedge-shaped recess 217F is formed in the first corner 217E in the top pole 217. In this case, the position of the step face 85D in the photoresist pattern 85 after exposure matches with the position of the step face 84D in the photomask 84 and also the step face 217D in the top pole 217. The step face 84D in the photomask 84 is orthogonal to the side face of the portion 84C. The linear portion in the step face 85D in the photoresist pattern 85 is orthogonal to the side face of the portion corresponding to the portion 84C. The linear portion in the step face 217D in the top pole 217 is orthogonal to the side face of the tip portion 217C.

In the photomask 84, the recess 84K has, for example, a right-angled triangle. The angle of the tip of the recess 84K can be set to a value smaller than 90 degrees. More preferably, it is in a range from 40 to 60 degrees. Preferably, each of a depth L10 from the throat height zero position to the tip of the recess 84K and a width L11 from the intersecting point between the recess 84K and the throat height zero position line to the side face of the portion 84C is 0.3 to 0.8 µm.

An example of dimensions of the photomask 84 is as follows. The portion 84C corresponding to the tip portion 217C has a width of about 0.3 to 1.0 µm and a length of about 4.0 to 8.0 µm. The portion 84B corresponding to the intermediate portion 217B has a width of about 2.0 to 6.0 µm and a length of about 2.0 to 5.0 µm. The width of the portion 84A corresponding to the yoke portion 217A is about 20.0 to 40.0 µm.

As described above, in the method of manufacturing the thin film magnetic head according to the embodiment, the photoresist pattern functioning as a mask used to form the top pole 217 is formed by using a negative photoresist. In the case of forming the photoresist pattern, the recess 84K is provided in the corner 84E in the photomask 84, which corresponds to the first corner 217E in the top pole 217. Consequently, the step face 85D in the photoresist pattern 85 formed by using the photomask 84 and the side face corresponding to the portion 84C form the right angle and the projection 85F is formed in the corner 85E. In the top pole 217 formed by the plating with the photoresist pattern 85, therefore, the step face 217D and the side face of the tip portion 217C form the right angle and the wedge-shaped recess 217F is formed in the first corner 217E. Consequently, even when the throat height TH is changed, the recording track width is not changed, so that the stable recording track width can be obtained and the recording track width can be prevented from being widened. Thus, the occurrence of the side write phenomenon can be effectively prevented.

Figures 22A, 22B, 22C:
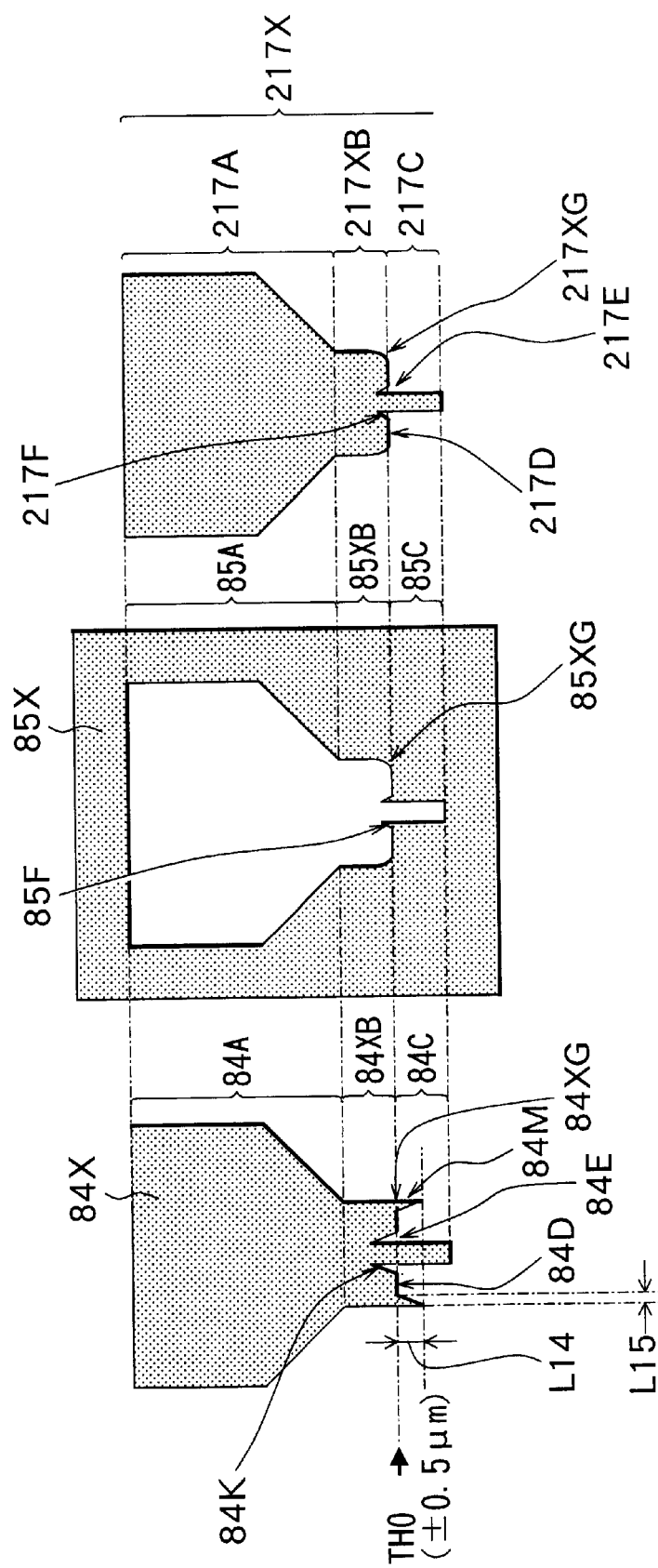
FIGS. 22A to 22C are plan views of a photomask, a photoresist pattern, and a top pole according to a modification of the second embodiment.
Figure 23:
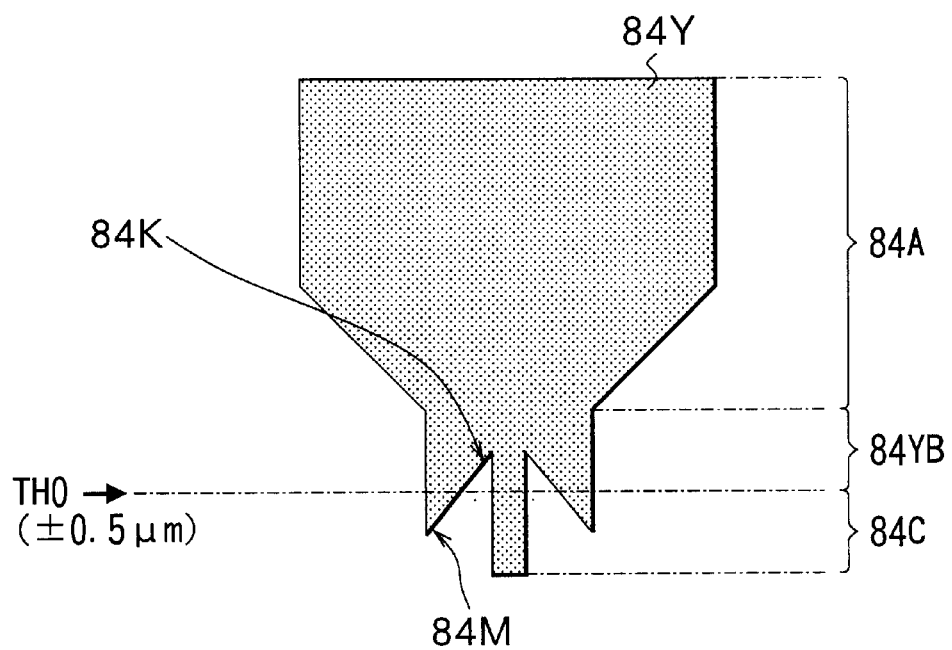
FIG. 23 is a plan view of a photomask according to another modification of the second embodiment.
Figure 24:
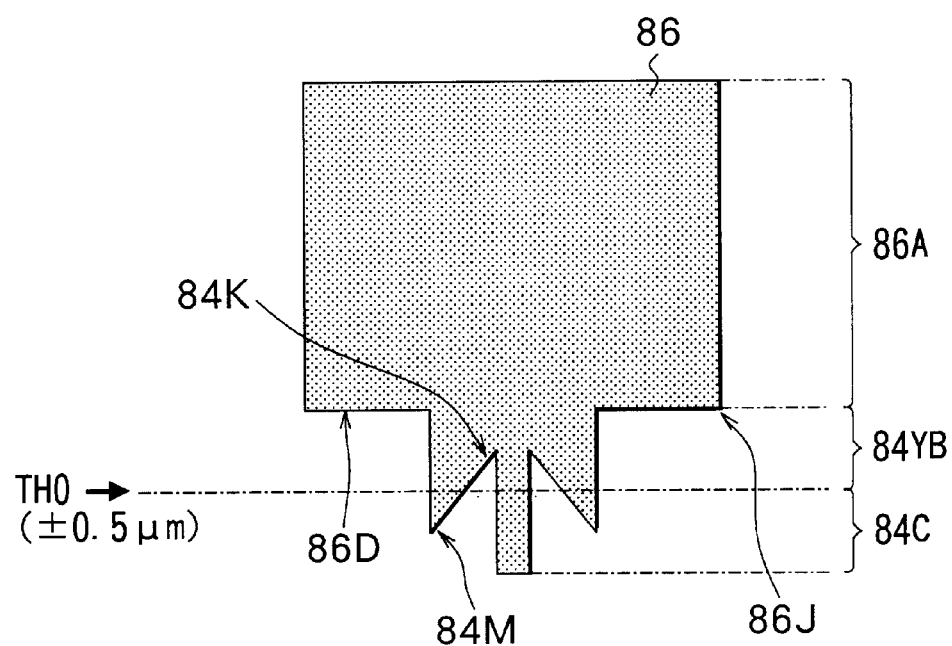
FIG. 24 is a plan view of a photomask according to further another modification of the second embodiment.

The shape of the photomask 84 is not limited to the shape shown in FIG. 20A. For example, shapes shown in FIGS. 22 to 24 may be also used. In the diagrams, the same explanation which has been made with respect to the photomask 84, photoresist pattern 85 and top pole 217 in FIG. 20A to 20C is properly omitted here. In FIGS. 22A to 22C, the same components as those in FIG. 20A to 20C are designated by the same reference numerals. In FIGS. 23 and 24, the same components as those in FIGS. 22A to 22C are designated by the same reference numerals.

FIGS. 22A to 22C show a modification of the embodiment. FIG. 22A shows a photomask 84X as a modification of the photomask 84 shown in FIG. 20A to 20C. FIG. 22B shows the shape in plan view of a photoresist pattern 85X formed by using the photomask 84X. Further, FIG. 22C shows a top pole 217X formed with the photoresist pattern 85X by electrolytic plating or the like. In a manner similar to the photomask 84 (FIG. 20A), the photomask 84X has the recess 84K in the corner 84E corresponding to the first corner 217E in the top pole 217X.

The photomask 84X further includes the projection 84M in a corner 84XG corresponding to the second corner 217XG in the top pole 217X. The projection 84M has, for example, a right-angled triangle shape. The angle of the tip of the projection 84M can be set to a value smaller than 90 degrees. More preferably, it is set in a range from 40 to 60 degrees. Preferably, each of a length L14 from the throat height zero position to the tip of the projection 84M and a width L15 from the intersecting point between the projection 84M and the throat height zero position line to the side face of the portion 84XB is 0.3 to 0.8 μm.

The recess 84K and the projection 84M in the photomask 84X exist in positions corresponding to first and second corners 217E and 217XG in the top pole 217X, respectively. The linear step face 84D is interposed between the recess 84K and the projection 84M. It is not always necessary that the recess 84K and the projection 84M have the same shape (same dimensions) but can be freely set within the range of the angles of the tip and the dimensions.

By performing the photolithography with the photomask 84X, the photoresist pattern 85X as shown in FIG. 22B is obtained. The portions 85A, 85XB and 85C in the photoresist pattern 85X correspond to the portions 84A, 84XB and 84C in the photomask 84X, respectively. As described above, the photoresist pattern 85X has the projection 85F in the position corresponding to the recess 84K in the photomask 84X. The corner 85XG corresponding to the corner 84XG in the photomask 84X does not have a right-angled shape but is slightly rounded by the influence of reflection light from the underlayer at the time of exposure in the photolithography process. When the shape of the corner 85XG in the photoresist pattern 85X in FIG. 22B and that of the corresponding corner 85G in the photoresist pattern 85 in FIG. 20B are compared with each other, the shape of the former corner 85XG is less rounded and is more like the right-angled shape. This is because the projection 84M in the photomask 84X acts so as to suppress the rounding of the corner 85XG in the photoresist pattern 85X. In the top pole 217X formed by plating or the like with the photoresist pattern 85X as well, the second corner 217XG has a shape more like a right-angled shape as compared with the corner 217G in the top pole 217 in FIG. 20C.

It is preferable to set the size of the projection 84M and the exposure amount so that the corner 85XG in the photoresist pattern 85X corresponding to the second corner 217XG in the top pole 217X does not project forward from the throat height zero position line (air bearing surface side). The other characteristic shapes of the photoresist pattern 85X and the top pole 217X are similar to those of the photoresist pattern 85 (FIG. 20B) and the top pole 217 (FIG. 20C).

FIG. 23 shows the shape in plan view of the photomask 84Y as another modification of the embodiment. The photomask 84Y has a pattern shape consisting of the portions 84A, 84YB and 84C. The photomask 84Y has the recess 84K and the projection 84M similar to those in the photomask 84X (FIG. 22A) in the corresponding positions. In the photomask 84Y in the modification, however, the recess 84K and the projection 84M meet to each other in the throat height zero position. It is not always necessary that the recess 84K and the projection 84M have the same shape (same dimensions) but can be freely set within the range of the angles of the tip and the dimensions. The other characteristic shape of the photomask 84Y is similar to that of the photomask 84X (FIG. 22A). By using the photomask 84Y, products of almost the same shapes as those of the photoresist pattern 84X and the top pole 217X can be obtained.

FIG. 24 is a plan view of a photomask 86 as further another modification of the embodiment. The photomask 86 has a pattern shape consisting of portions 86A, 84YB and 84C. In the photomask 86, a corner 86j at which the side face of the portion 86A and the step face 86d in the coupling position between the yoke portion 86A and the portion 84BY cross each other has the almost right angle. The other characteristic shape of the photomask 86 is similar to that of the photomask 84Y.

Third Embodiment

Figures 28A, 28B:
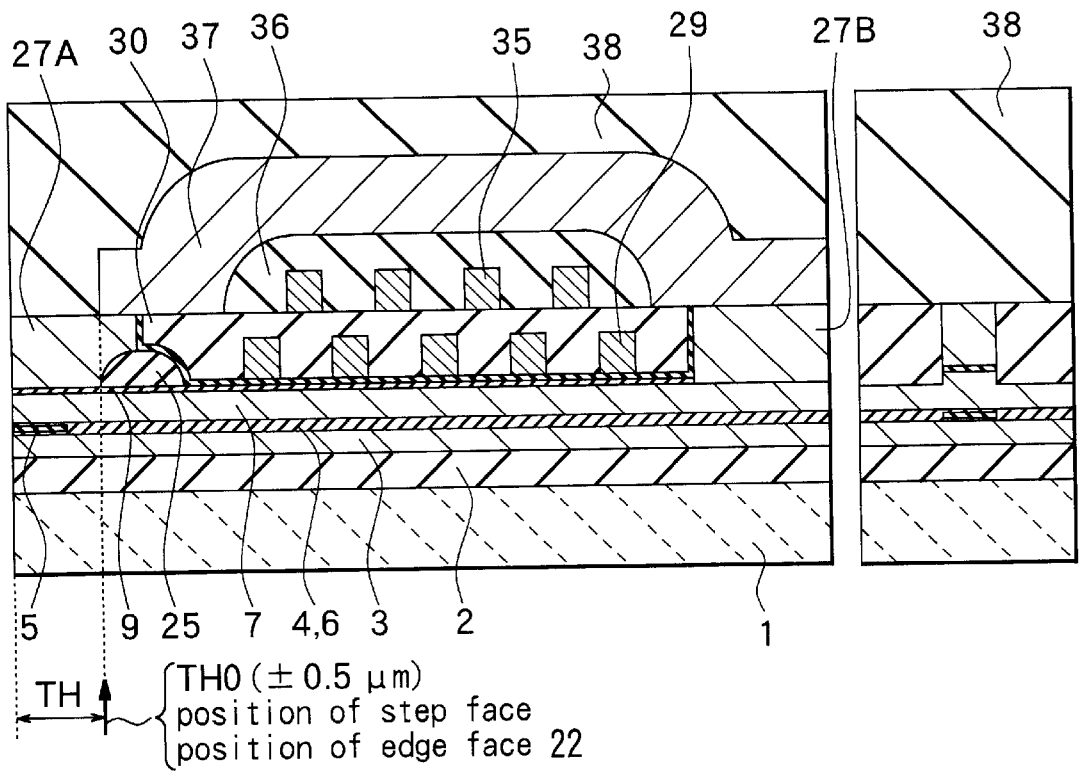
FIGS. 28A and 28B are cross sections showing a modification of a thin film magnetic head manufactured by the thin film magnetic head manufacturing method according to the third embodiment.
Figure 29:
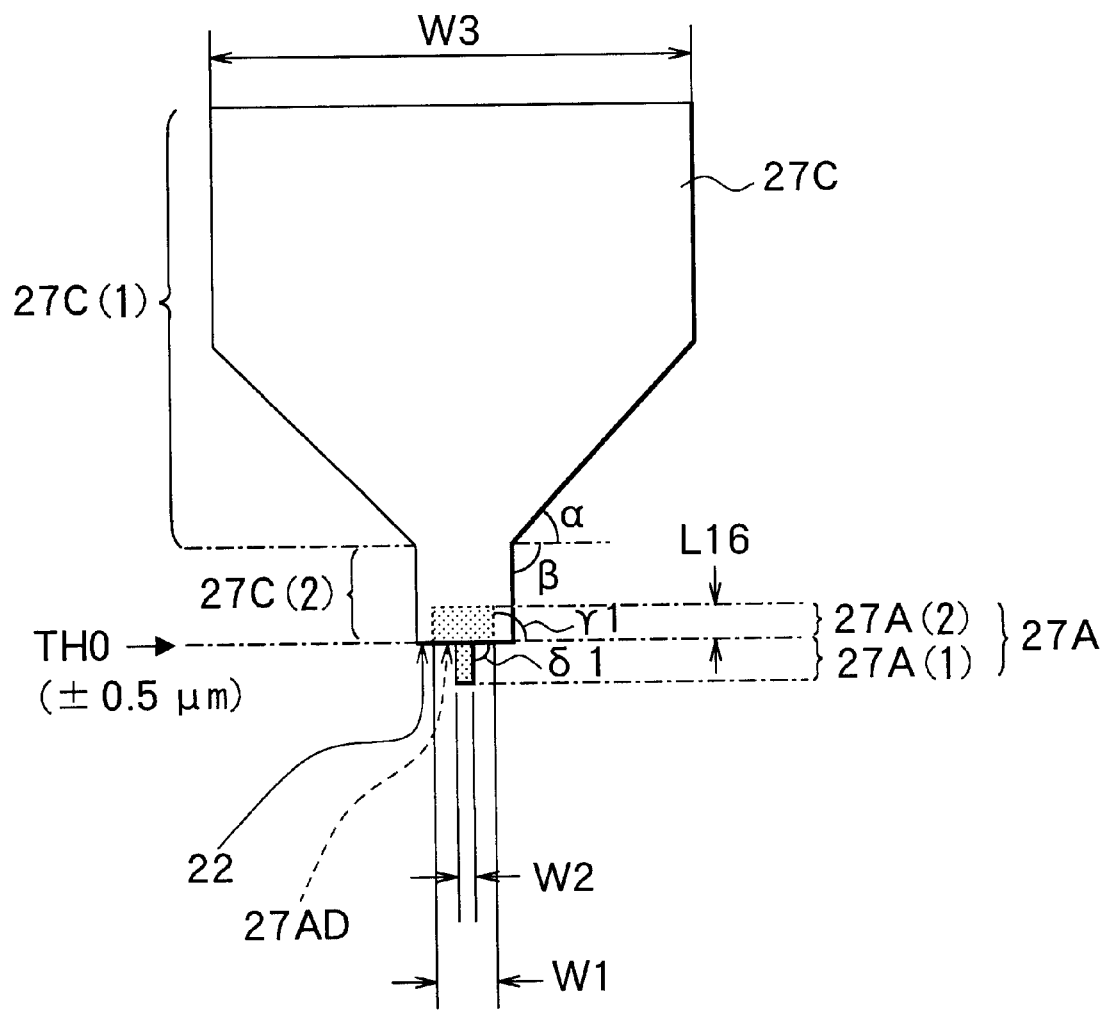
FIG. 29 is a plan view of the top pole and a top pole tip of a thin film magnetic head manufactured by the thin film magnetic head manufacturing method according to the third embodiment.
Figure 30:
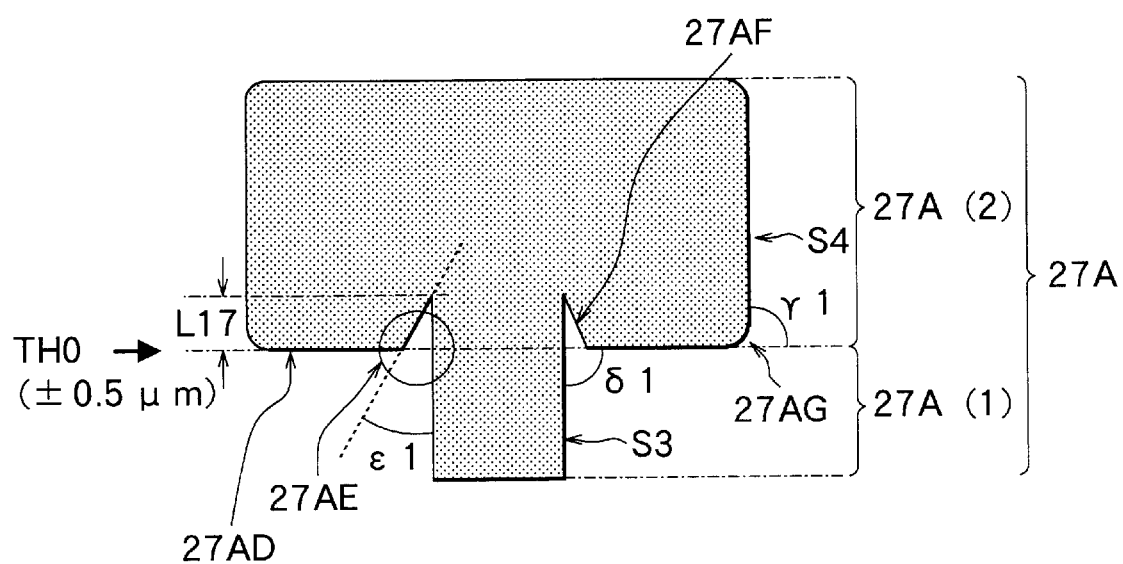
FIG. 30 is an enlarged view of a top pole tip of a thin film magnetic head manufactured by the thin film magnetic head manufacturing method according to the third embodiment.

Referring now to FIGS. 25 to 31, a method of manufacturing a thin film magnetic head according to a third embodiment of the invention will be described. FIGS. 25 to 29 are cross sections showing manufacturing processes of the thin film magnetic head according to the embodiment. FIG. 30 enlargedly show the shape in plan view of a top pole tip 27A formed by the manufacturing processes. FIGS. 31A to 31D are plan views of components, illustrating the processes to form the top pole tip 27A by using a photomask.

In the embodiment, since processes until the formation of the top pole 17 is started to be formed are similar to those of the first embodiment, their description is omitted here.

Figures 25A, 25B:
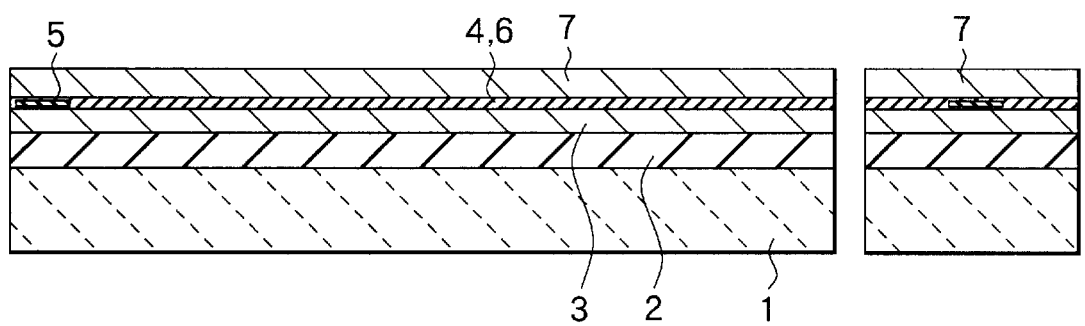
FIGS. 25A and 25B are cross sections for explaining a process in a method of manufacturing a thin film magnetic head according to a third embodiment of the invention.
Figures 26A, 26B:
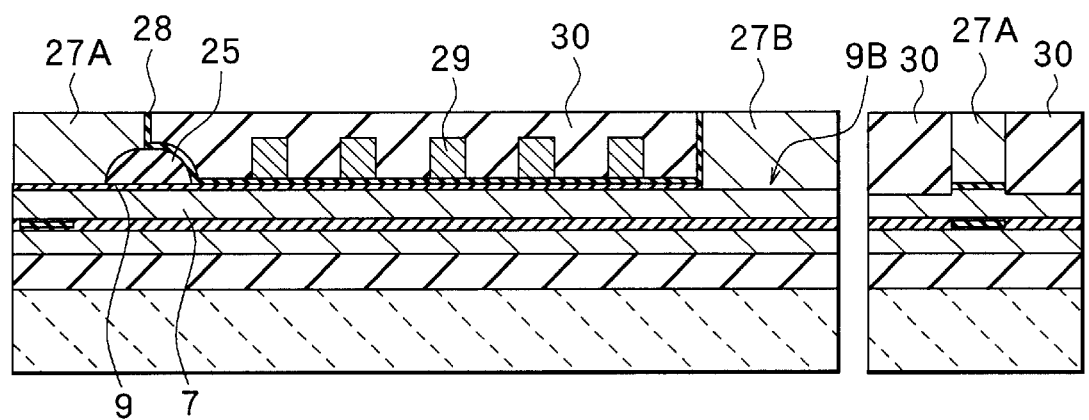
FIGS. 26A and 26B are cross sections for explaining a process subsequent to FIGS. 25A and 25B.

In the embodiment, when the formation of the bottom pole 7 is finished as shown in FIGS. 25A and 25B, the write gap layer 9 is formed and an insulating film pattern 25 for defining the throat height TH is formed on the write gap layer 9 as shown in FIGS. 26A and 26B. Subsequently, in a position rearward (right side in FIG. 26A) of the region where a thin film coil 29 will be formed in a post process, the write gap layer 9 is partially etched to form an opening 9B for forming a magnetic path. In a region from the insulating film pattern 25 to the track facing surface (air bearing surface), the top pole tip 27A as a portion of the top pole is selectively formed by, for example, electrolytic plating. At the same time, a magnetic path forming pattern 27B is formed also in the opening 9B. The top pole tip 27A and the magnetic path forming pattern 27B are made of a Permalloy (NiFe) alloy, an iron nitride (FeN) alloy, or the like as a material having a high saturated magnetic flux density.

The top pole tip 27A and the magnetic path forming pattern 27B are formed, for example, in the following manner. First, an NiFe alloy as a material having high saturated magnetic flux density is deposited in thickness of about 70 nm by, for example, sputtering to thereby form an electrode film (not shown) serving as a seed layer in electrolytic plating. Then a photoresist is applied on the electrode film and patterned by a photolithography process and a photoresist pattern (not shown) is formed by a frame plating method. Subsequently, by using the photoresist pattern as a mask and using the electrode film formed before as a seed layer, the top pole tip 27A and the magnetic path forming pattern 27B are formed in thickness of about 3 to 5 μm by electrolytic plating. After that, the photoresist pattern is removed. The top pole tip 27A has, for example, the shape in plan view as shown in FIG. 30. The shape of the top pole tip 27A will be described hereinlater.

The write gap layer 9 and the bottom pole 7 are etched about 0.3 to 0.5 μm by, for example, ion milling by using the top pole tip 27A as a mask to thereby form a trim structure for suppressing widening of the effective track width at the time of writing.

An insulating film 28, for example, an alumina film is formed on the whole surface in thickness of about 0.5 to 1.5 μm. After that, a thin film coil 29 for an inductive recording head made of copper (Cu) or the like is formed in thickness of about 2 to 3 μm by electrolytic plating. An insulating film 30 such as an alumina film is formed on the whole surface in thickness of about 3 to 4 μm. The whole surface is polished by, for example, CMP (Chemical Mechanical Polishing) so as to be flattened and a top face of the top pole tip 27A and that of the magnetic path forming pattern 27B are exposed.

Figures 27A, 27B:
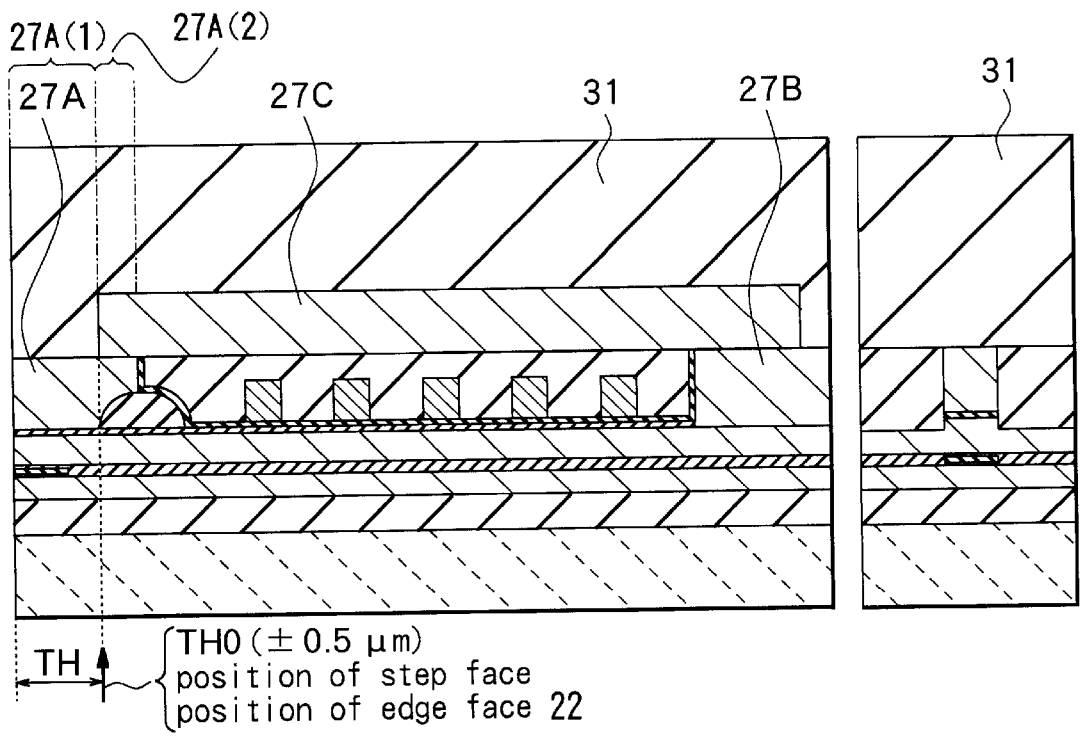
FIGS. 27A and 27B are cross sections for explaining a process subsequent to FIGS. 26A and 26B.

As shown in FIGS. 27A and 27B, by electrolytic plating similar to that in the case of the top pole tip 27A and the magnetic path forming pattern 27B, an upper yoke-cum-top pole (hereinbelow, called a top pole) 27C is formed in thickness of about 3 to 5 μm. The top pole 27C has a shape, for example, as shown in FIG. 29. The top pole 27C is in contact with and magnetically coupled to both the bottom pole 7 in the opening 9A and the top pole tip 27A. The top pole 17 is made of Permalloy (NiFe), ion nitride (FeN), or the like as a high saturated magnetic material. The top pole 27C corresponds to an example of "third magnetic portion" in the invention.

As shown in FIGS. 27A and 27B, an overcoat layer 31 made of alumina or the like is formed so as to cover the whole surface. Finally, by machining a slider, the air bearing surface (track surface) of the recording head and the reproduction head is formed. In such a manner, a thin film magnetic head is completed.

Although the first thin film coil 29 alone is formed in this case, as shown in FIGS. 28A and 28B, it is also possible to form a second thin film coil 35 on the insulating layer 30 which covers the thin film coil 29, cover the second thin film coil 35 with a photoresist layer 36 and, after that, selectively form a top pole 37 on the photoresist layer 36.

FIG. 29 shows the structure in plan view of the top pole 27C and the top pole tip 27A. As shown in the diagram, the top pole 27C has a width W3 and includes a yoke portion 27C(1) which occupies a major portion of the top pole 27C and a coupling position 27C(2) which is connected by being partially overlapped with the top pole tip 27A. The shape of the yoke portion 27C(1) is similar to that of the yoke portion 17A in the top pole 17 in the first embodiment. The coupling position 27C(2) is wider than the intermediate portion 17B in the top pole 17 in the first embodiment. The center in the width direction of the yoke portion 17A and that of the coupling position 27C(2) coincide with each other.

As shown in FIGS. 29 and 30, the top pole tip 27A has a tip portion 27A(1) which defines a recording track width on a recording medium and an intermediate portion 27A(2) connected to a coupling position 27C(2) of the top pole 27C. The intermediate portion 27A(2) has the same width W1 as the intermediate portion 17B in the top pole 17 in the first embodiment and has a length L16. The tip portion 27A(1) has the same width W2 as the tip portion 17C in the first embodiment. The connecting portion between the front end portion 27A(1) and the intermediate portion 27A(2) almost matches with the TH0 position and simultaneously matches with an edge face 22 of the front side (air bearing surface side) in the connecting portion 27C(2) in the top pole 27C. In the connecting portion (that is, in almost the TH0 position), the width of the intermediate portion 27A(2) is W1 and the width of the tip portion 27A(1) is W2 which is smaller than W1. That is, a step in the width direction exists between the intermediate portion 27A(2) and the tip portion 27A(1) in or near the TH0 position. A step face 27AD on the intermediate portion 27A(2) side in the step portion and a side face S4 in the intermediate portion 27A(2) form an angle γ1. The step face 27AD and a side face S3 of the tip portion 27A(1) form an angle δ1. In the embodiment, each of the angles γ1 and δ1 is equal to almost 90 degrees. That is, each of the intermediate portion 27A(2) and the tip portion 27A(1) has an almost rectangular shape. The step face 27AD is substantially perpendicular to the side face S3 in the tip portion 27A(1). The tip portion 27A(1) corresponds to an example of "first magnetic portion" in the invention and the intermediate portion 27A(2) corresponds to an example of "second magnetic portion" in the invention.

As shown in FIG. 30, the top pole tip 27A has a corner 27AE in a portion where the side face S3 in the tip portion 27A(1) and the step face 27AD cross each other. The step face 27AD has a corner 27AG at the intersection of the side face S4 in the intermediate portion 27A(2) and the step face 27AD. The corner 27AE corresponds to an example of "first corner" in the invention and the corner 27AG corresponds to an example of "second corner" in the invention.

In the connecting portion between the intermediate portion 27A(2) and the tip portion 27A(1), that is, in the first corner 27AE, a wedge-shaped recess 27AF exists (not shown in FIG. 29). The top pole tip 27A having the wedge-shaped recess 27AF is formed by a photolithography process using a photomask characterized by its shape and, for example, an electrolytic plating process. The forming method will be described hereinlater.

As obviously understood from FIGS. 27A and 27B and 29, the tip portion 27A(1) extends on the flat write gap layer 9 and the intermediate portion 27A(2) is positioned on the insulating pattern 25.

An example of preferable dimensions of the portions shown in FIG. 29 is as follows.

Width W1 of the intermediate portion 27A(2)=2.0 to 5.0 μm
Length L16 of the intermediate portion 27A(2)=1.0 to 5.0 μm
Width W2 of the tip portion 27A(1)=0.4 to 1.2 μm
Width W3 of the yoke portion 17A=30 to 40 μm Length of the coupling position 27C(2)=3.0 to 5.0 µm The angle ε1 of the tip portion of the wedge-shaped recess 27AF shown in FIG. 30 is preferably set to about plus or minus 15 degree with respect to 45 degrees. The depth L17 of the wedge-shaped recess 27AF is set to, for example, 0.3 to 0.8 µm and, more preferably, about 0.6 µm.

Figure 31:
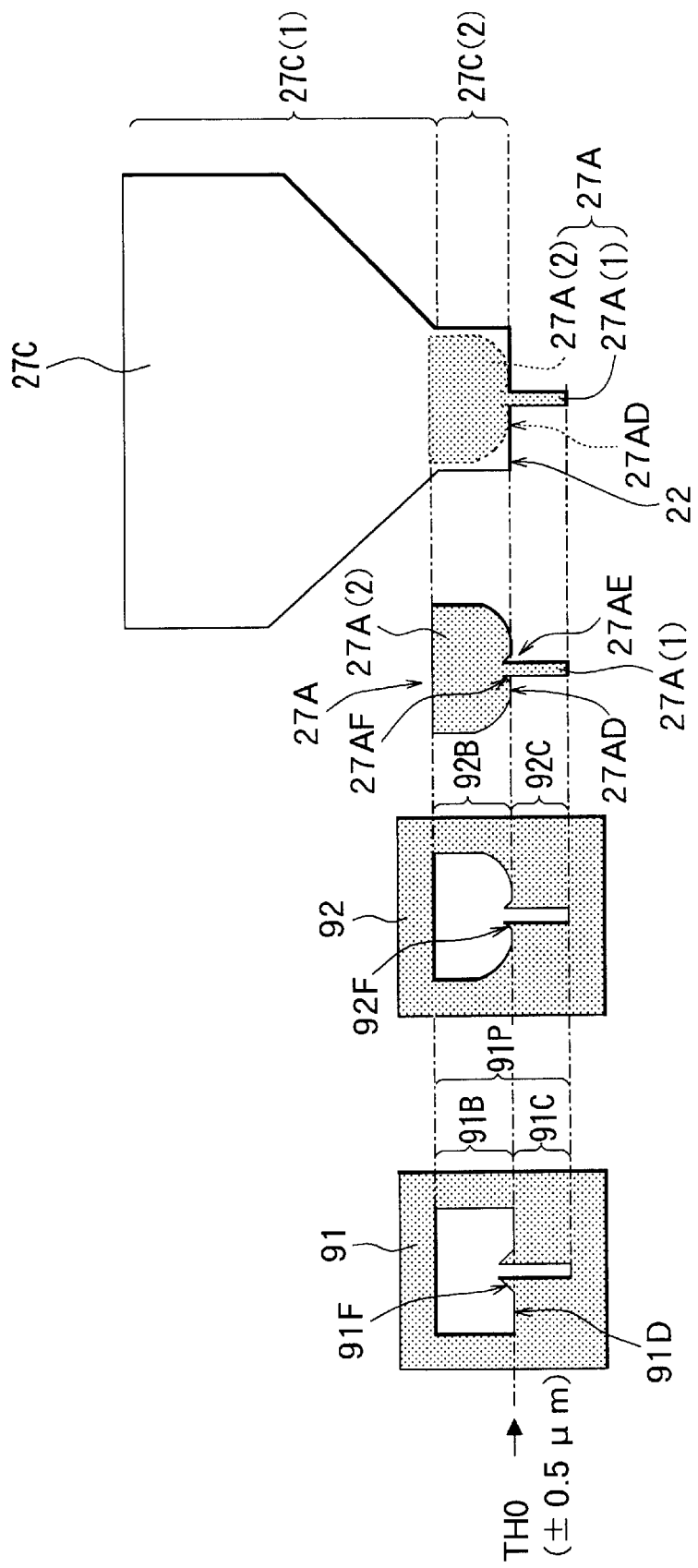
FIGS. 31A to 31D are plan views of a top pole tip of a thin film magnetic head manufactured by the method of manufacturing the thin film magnetic head according to the third embodiment, and a photomask and a photoresist pattern which are used in a photolithography process for forming the top pole tip.

Referring now to FIG. 31, a characteristic action of the method of manufacturing a thin film magnetic head according to the embodiment will be described. In the embodiment, the case of performing the photolithography process using a photomask for a positive photoresist will be explained.

FIG. 31A shows-the shape in plan view of a photomask 91 for a positive photoresist according to the embodiment. FIG. 31B shows the shape in plan view of a photoresist pattern 92 formed by performing the photolithography process by using the photomask 91. FIG. 31C shows the shape in plan view of a top pole tip 27A formed by using the photoresist pattern 92 by electrolytic plating or the like. FIG. 31D shows a state where a portion of the top pole 27C extends so as to overlap with the intermediate portion 27A(2) in the top pole tip 27A.

As shown in FIG. 31A, the photomask 91 basically includes an opening 91P having a pattern shape which is almost the same as that of the top pole tip 27A to be obtained. The opening 91P includes a portion 91B corresponding to the intermediate portion 27A(2) in the top pole tip 27A and a portion 91C corresponding to the tip portion 27A(1). The photomask 91 has a step face 91D in the connecting portion of the portions 91B and 91C. The step face 91D has a projection 91F. The shape of the projection 91F is the same as the projection 81F in the photomask 81 (FIG. 11A) in the first embodiment. That is, the pattern shape around the connecting portion of the portions 91B and 91C in the photomask 91 is similar to that around the connecting portion of the portions 81B and 81C in the photomask 81. The step face 91D in the photomask 91 corresponds to both the same portion (92D) in the photoresist pattern 92 in FIG. 31B and the same portion (27AD) in the top pole tip 27A in FIG. 31C. Preferably, the photomask 91 is positioned so that the step face 91D is plus or minus 0.5 µm with respect to the throat height zero position.

By performing the photolithography process by using the photomask 91 having such a shape, from a reason similar to that of the first embodiment, as shown in FIG. 31B, the photoresist pattern 92 having the projection 92F in the position corresponding to the projection 91F of the photomask 91 is formed. The portions 92B and 92C in the photoresist pattern 92 correspond to the portions 91B and 91C in the photomask 91. The pattern shape around the connecting portion of the portions 92B and 92C in the photoresist pattern 92 is similar to that around the connecting portion of the portions 82B and 82C in the photoresist pattern 82 shown in FIG. 11B. By performing the plating process with the photoresist pattern 92, as illustrated in FIG. 31C, the top pole tip 27A having the wedge-shaped recess 27AF in the first corner 27AE can be obtained. The shape around the connecting portion of the intermediate portion 27A(2) and the tip portion 27A(1) in the top pole tip 27A is similar to that around the connecting portion between the intermediate portion 17B and the tip portion 17C in the top pole 17 shown in FIG. 11C. For that reason, in a manner similar to the first embodiment, even when the throat height TH is changed, the recording track width is not changed, so that the stable recording track width can be obtained, the recording track width can be prevented from being widened, and the occurrence of the side write phenomenon can be effectively prevented.

In FIG. 31D, the thin film magnetic head including the top pole 27C having such a shape can assure the sufficient overwrite characteristic since the magnetic volume in the portion immediately rearward of the connecting portion is assured.

Since the top pole 27C can be formed on the flat portion polished by the CMP, the photoresist pattern can be easily formed by photolithography with high accuracy.

Since the insulating film 28 made of alumina or the like is formed between the write gap layer 9 and the thin film coil 10 in the embodiment, the dielectric withstand voltage between the thin film coil 10 and the bottom pole 7 can be increased and the leakage of the magnetic flux from the thin film coil 10 can be reduced.

The position of the edge face 22 (FIG. 29) on the front side (air bearing surface side) of the connecting portion 27C(2) of the top pole 27C does not have to always accurately coincide with that of the step face 27AD in the top pole tip 27A which matches with the TH0 position. It can be deviated to the rear side (side opposite to the air bearing surface) of the position of the step face 27AD. The position of the edge face 22 of the connecting portion 27C(2) may be deviated to the forward (toward the air bearing surface side) of the position of the step face 27AD and overlap with a portion of the tip portion 27A(1) of the top pole tip 27A. In this case, it is preferable to make the throat height zero position coincide with the position of the edge face 22 of the coupling position 27C(2). In those cases, it is preferable to set the deviation from the position of the edge face 22 of the coupling position 27C(2) to the step face 27AD to 0.1 µm or less.

Figure 32:
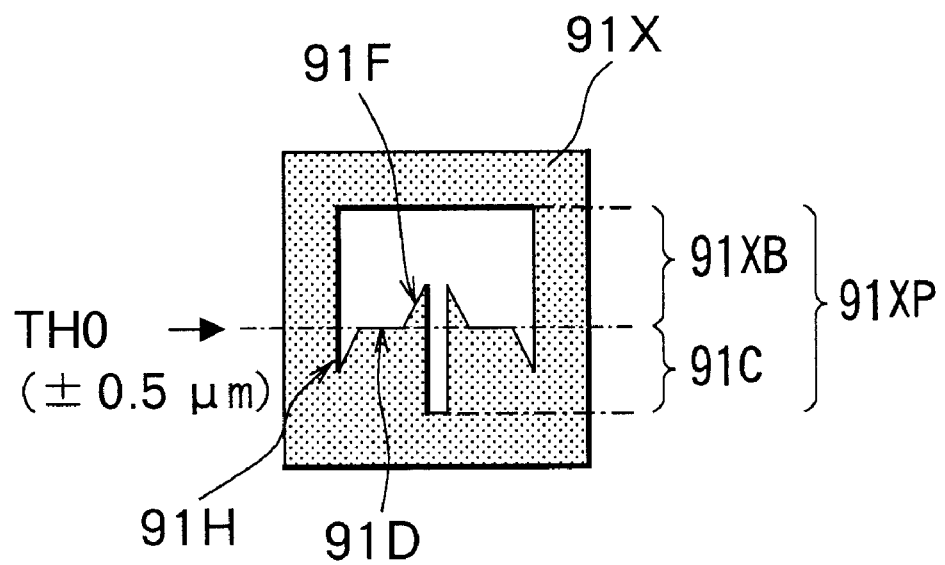
FIG. 32 is a plan view of a photomask according to another modification of the third embodiment.
Figure 33:
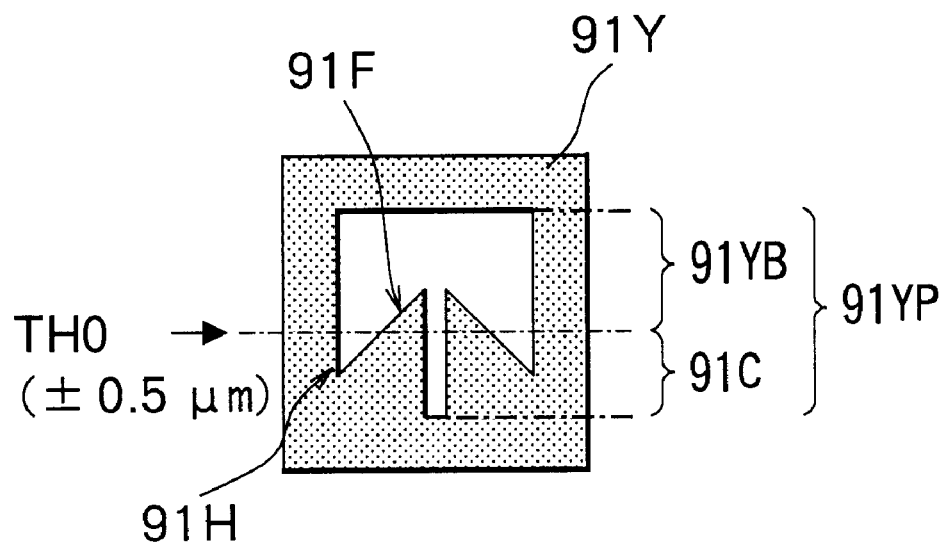
FIG. 33 is a plan view of a photomask according to further another modification of the third embodiment.

The shape of the photomask 91 is not limited to the shape shown in FIG. 31A but, for example, shapes shown in FIGS. 32 and 33 may be also used. Some modifications of the photomask of the embodiment will be described hereinbelow. In the following description, since the actions, effects and the like of the top pole tip formed by performing the series of top pole forming processes by using each of the photomasks are similar to those of the above-described case using the photomask 91, the description is properly omitted here. In FIG. 32, the same components as those in FIG. 31 are designated by the same reference numerals. In FIG. 33, the same components as those in FIG. 32 are designated by the same reference numerals.

FIG. 32 shows the shape in plan view of a photomask 91X as a modification of the embodiment. The photomask 91X has an opening 91XP consisting of portions 91XB and 91C. In the photomask 91X, the shape of the pattern around the connecting portion of the portions 91XB and 91C is similar to that of the corresponding portion in the photomask 81X in the first embodiment. By performing the photolithography process with the photomask 91X, for a reason similar to that in the case of the first embodiment, a photoresist pattern having a shape similar to that of the pattern around the connecting portion of portions 82XB and 82C in the photoresist pattern 82X shown in FIG. 17B is formed. By performing the plating or the like with the photoresist pattern, a top pole tip having a shape similar to that of the pattern around the connecting portion of the intermediate portion 17xb and the tip portion 17C in the top pole 17X shown in FIG. 17C can be obtained.

FIG. 33 shows the shape in plan view of a photomask 91Y as another modification of the embodiment. The photomask 91Y has an opening 91YP consisting of portions 91YB and 91C. In the photomask 91Y, the shape of a pattern around the connecting portion of the portions 91YB and 91C is similar to that of the corresponding portion in the photomask 81Y in the first embodiment. By performing the aforementioned series of top pole tip forming processes with the photomask 91Y, a photoresist pattern and a top pole tip each having a shape similar to that in the case using the photomask 91X can be obtained.

Fourth Embodiment

A fourth embodiment of the invention will now be described.

In a method of manufacturing a thin film magnetic head according to the embodiment, being different from the third embodiment, the top pole tip 27A is formed by using a negative photoresist. In the following, processes from a photolithography process using a photomask to a process of forming a top pole will be described. Since the other processes, actions and effects are similar to those in the first embodiment, their description is omitted here.

Figure 34:
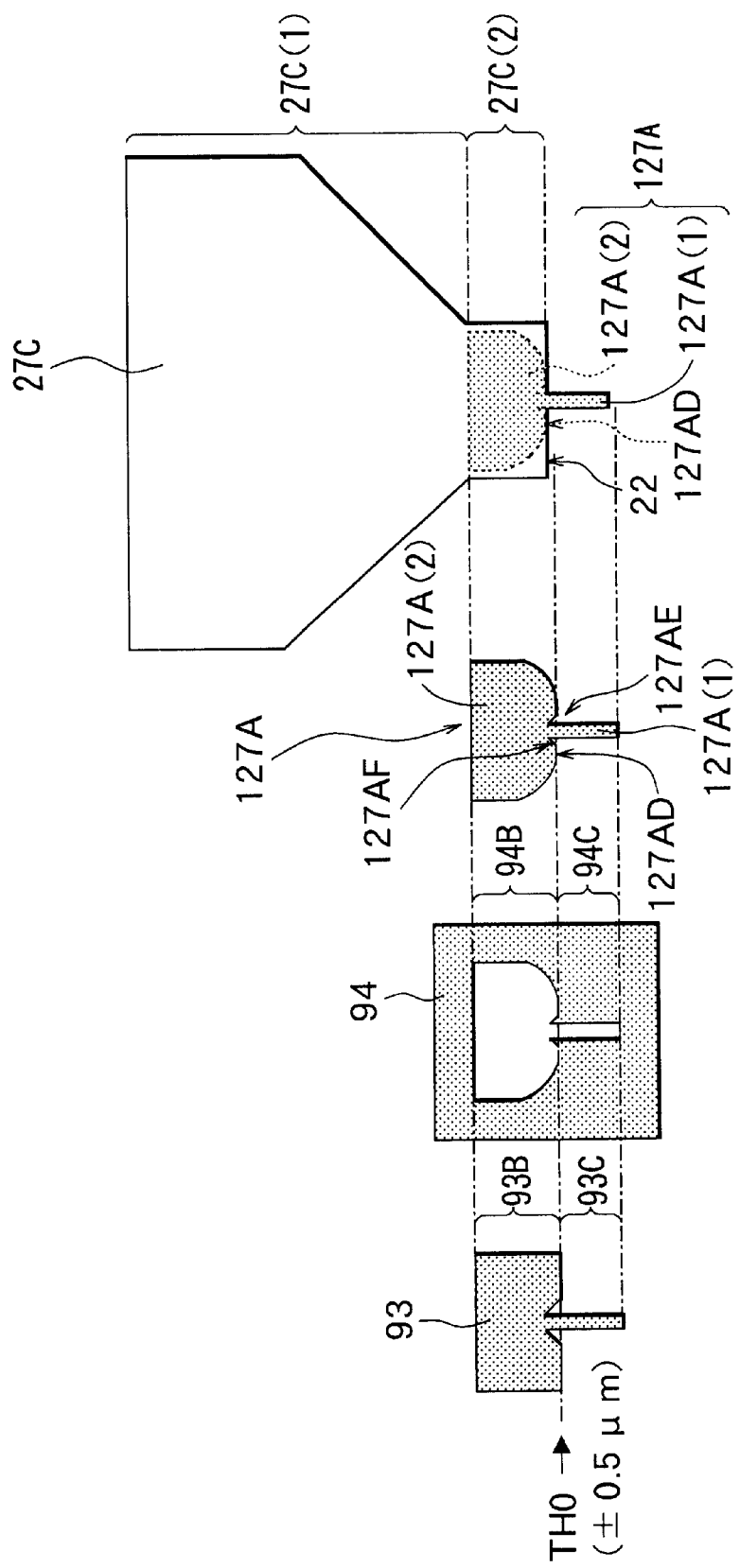
FIGS. 34A to 34D are plan views of a top pole tip of a thin film magnetic head manufactured by the method of manufacturing the thin film magnetic head according to a fourth embodiment, and a photomask and a photoresist pattern which are used in a photolithography process for forming the top pole tip.

FIG. 34A shows the shape in plan view of a photomask 93 for a negative photoresist according to the embodiment. FIG. 34B shows the shape in plan view of a photoresist pattern 94 formed by performing a photolithography process with the photomask 93. FIG. 34C shows the shape in plan view of the top pole tip 127A formed by electrolytic plating or the like by using the photoresist pattern 94. FIG. 34D shows a state where a portion of the top pole 27C overlaps with the intermediate portion 127A(2) in the top pole tip 127A.

As shown in FIG. 34A, the photomask 93 includes a portion 93B corresponding to the intermediate portion 127A(2) in the top pole tip 127A and a portion 93C corresponding to the tip portion 127A(1). The shape of a pattern around the connecting portion of the portions 93B and 93C in the photomask 93 is similar to that of a corresponding portion in the photomask 84 in the second embodiment.

By performing a photolithography process with the photomask 93 having such a shape, for a reason similar to that of the second embodiment, the photoresist pattern 94 shown in FIG. 34B is formed. Portions 94B and 94C in the photoresist pattern 94 correspond to the portions 93B and 93C in the photomask 93. The shape of a pattern around the connecting portion of the portions 94B and 94C in the photoresist pattern 94 is similar to that of a pattern around the connecting portion of the portions 85B and 85C in the photoresist pattern 85 illustrated in FIG. 20B. By performing a plating process with the photoresist pattern 94, as shown in FIG. 34C, the top pole tip 127A having a wedge-shaped recess 127AF in a first corner 127AE can be obtained. The shape of a pattern around the connecting portion of the intermediate portion 127A(2) and the tip portion 127A(1) in the top pole tip 127A is similar to that of a pattern around the connecting portion of the intermediate portion 217B and the tip portion 217C in the top pole 217 illustrated in FIG. 20C. For that reason, in a manner similar to the second embodiment, even when the throat height TH is changed, the recording track width is not changed. Consequently, a stable recording track width can be obtained, the recording track width can be prevented from being widened, and the occurrence of a side write phenomenon can be effectively prevented. The other construction, actions and effects are similar to those of the case of FIG. 31D.

Figure 35:
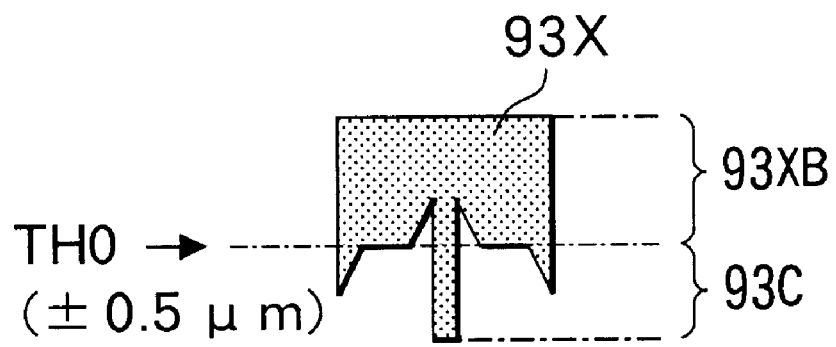
FIG. 35 is a plan view of a photomask according to another modification of the fourth embodiment.
Figure 36:
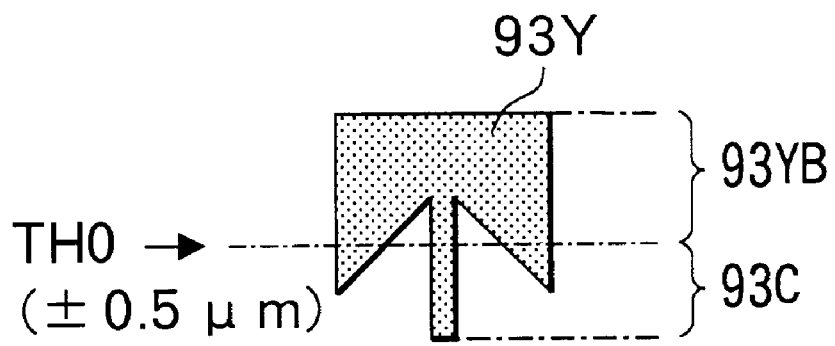
FIG. 36 is a plan view of a photomask according to further another modification of the fourth embodiment.

The shape of the photomask 93 is not limited to the shape shown in FIG. 34A but shapes, for example, as shown in FIGS. 35 and 36 may be also used. Some modifications of the photomask of the embodiment will be described hereinbelow. In the following description, since the actions, effects and the like of the top pole tip formed by performing the series of top pole forming processes by using each of the photomasks are similar to those of the above-described case using the photomask 93, the description is properly omitted here.

FIG. 35 shows the shape in plan view of a photomask 93X as a modification of the embodiment. As shown in FIG. 35, the photomask 93X has the shape of a pattern consisting of portions 93XB and 93C. The shape of the pattern around the connecting portion of the portions 93XB and 93C in the photomask 93X is similar to that of the corresponding portion in the photomask 84X (FIG. 22A) in the second embodiment. Processes up to the formation of the top pole tip by using the photomask 93X are similar to those described with reference to FIG. 34. In this case, effects produced by the characteristic shape of the portion around the connecting portion in the photomask 93X are similar to those in the second embodiment.

FIG. 36 shows the shape in plan view of a photomask 93Y as another modification of the embodiment. The photomask 93Y has the pattern shape consisting of portions 93YB and 93C. The shape of a pattern around the connecting portion of the portions 93YB and 93C in the photomask 93Y is similar to that of the corresponding portion in the photomask 84Y (FIG. 23) in the second embodiment. By performing the series of top pole tip forming processes with the photomask 93Y, a product similar to that obtained by using the photomask 93X can be created.

Fifth Embodiment

A fifth embodiment of the invention will now be described.

Figures 37A, 37B:
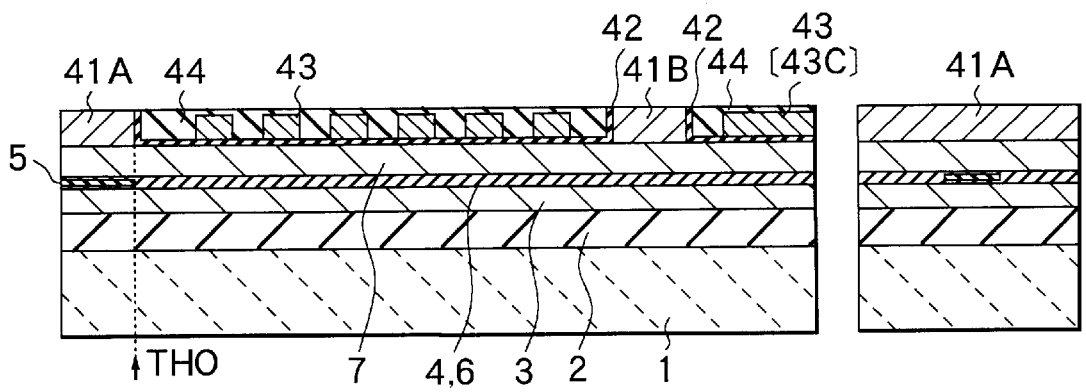
FIGS. 37A and 37B are cross sections for explaining a process in a method of manufacturing a thin film magnetic head according to a fifth embodiment of the invention.

Each of FIGS. 37A and 37B to FIGS. 39A and 39B is a cross section of a head in a main process in the methods of manufacturing the thin film magnetic head according to the third and fourth embodiments. FIGS. 37A, 38A and 39A are cross sections each perpendicular to the air bearing surface. FIGS. 37B, 38B and 39B are cross sections each in parallel to the air bearing surface of the pole portion. In the diagrams, the same components as those in the foregoing embodiments are designated by the same reference numerals.

In the method of manufacturing the thin film magnetic head according to the fifth embodiment, since processes up to the stage where the bottom pole 7 in FIGS. 37A and 37B is formed are similar to those in the first embodiment, the description is omitted here.

In the fifth embodiment, when the formation of the bottom pole 7 is finished as shown in FIGS. 37A and 37B, a bottom pole tip 41A and a bottom coupling position 41B are formed in thickness of about 2.0 to 2.5 $\mu$m on the bottom pole 7. The bottom pole tip 41A is formed so that its tip portion on the air bearing surface side is positioned near the MR (GMR) height zero position and simultaneously, the opposite side of the air bearing surface is positioned in the throat height zero position. The bottom pole tip 41A and the bottom coupling position 41B may be formed by a plating film made of NiFe or the like or a sputtered film made of FeN, FeZrNP, CoFeN, or the like.

Subsequently, on the whole surface, an insulating film 42 having a thickness of about 0.3 to 0.6 $\mu$m made of an insulating material such as alumina is deposited by, for instance, sputtering or CVD.

A first thin film coil 43 for an inductive recording head is formed by using copper (Cu) or the like in thickness of 1.5 to 2.5 $\mu$m by, for example, electrolytic plating in a recessed area formed between the bottom pole tip 41A and the bottom coupling position 41B. Simultaneously, a coil coupling position 43C for connecting the thin film coil 43 to a second thin film coil which will be described hereinlater is formed in an area rearward of the bottom coupling position 41B (right area in the diagram).

Subsequently, on the whole surface, an insulating layer 44 having a thickness of 3.0 to 4.0 μm made of an insulating material such as alumina is formed by sputtering. After that, the surface is flattened by, for example, CMP to expose the surfaces of the bottom pole tip 41A and the bottom coupling position 41B.

Figures 38A, 38B:
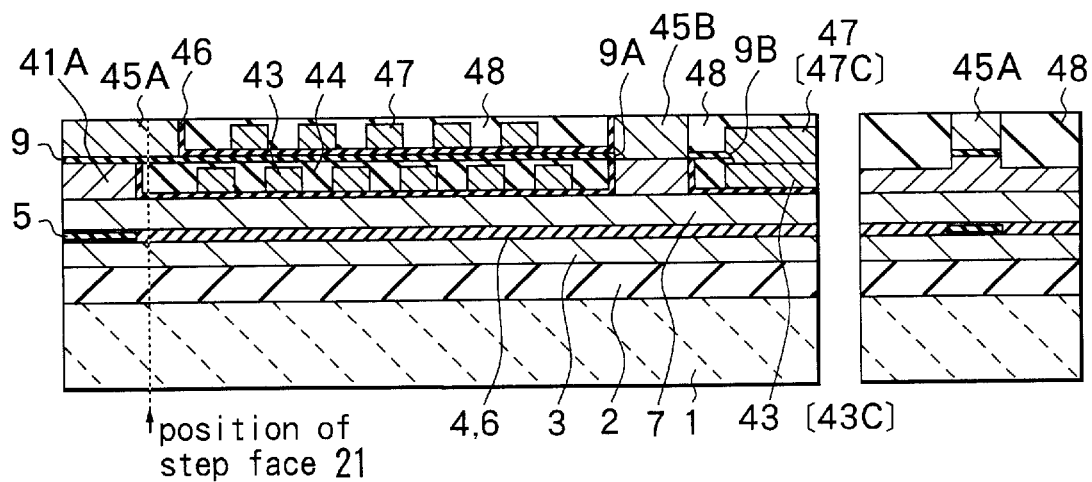
FIGS. 38A and 38B are cross sections subsequent to FIGS. 37A and 37B.

As shown in FIGS. 38A and 38B, the write gap layer 9 having a thickness of 0.2 to 0.3 μm made of an insulating material such as alumina is formed by sputtering. The write gap layer 9 may be made of another material such as aluminum nitride (AlN), silicon oxide, silicon nitride or the like. Subsequently, the write gap layer 9 is patterned by photolithography to form the opening 9A for connecting the top and bottom poles, and the write gap layer 9 and the insulating layer 44 are-patterned to open the opening 9B which reaches the coil connecting portion 43C.

Subsequently, on the write gap layer 9, a top pole tip 45A and a top coupling position 45B for magnetically connecting the top and bottom poles are formed. In this case, the top coupling position 45B is formed so as to be overlapped with and in contact with the bottom coupling position 41B. On the other hand, the top pole tip 45A is formed so as to extend rearward from the air bearing surface longer than the bottom pole tip 41A. The top pole tip 45A includes the intermediate portion 27A(2) for assuring the magnetic volume, the tip portion 27A(1) for defining the track width and the step face 21 in the connecting portion of the portions 27A(2) and 27A(1). The shape in plan view of the top pole tip 45A is similar to that of either the top pole tip 27A (FIG. 31C) in the third embodiment or the top pole tip 127A (FIG. 34C) in the fourth embodiment and is formed by using a photomask similar to either the photomask 91 (FIG. 31A) in the third embodiment or the photomask 93 (FIG. 34A) in the fourth embodiment. As a result, the top pole tip having wedge-shaped recesses in the coupling position between the tip portion and the intermediate portion is obtained. In the top pole tip 45A, the step face 21 is positioned slightly rearward of the position (that is, TH0 position) of the edge face of the rear side of the bottom pole tip 41A.

Subsequently, by using the top pole tip 45A as a mask, the write gap layer 9 and the bottom pole tip 41A around the top pole tip 45A are etched in a self-aligned manner. To be specific, by RIE using a chlorine gas ($Cl_2$, $CF_4$, $BCl_2$, $SF_6$ or the like) with the top pole tip 45A as a mask, the write gap layer 9 is selectively removed. After that, the exposed bottom pole tip 41A is etched again about 0.3 to 0.6 μm by, for example, ion milling of Ar, thereby forming a trip structure.

Then, an insulating layer 46 made of alumina or the like is formed in thickness of about 0.3 to 0.6 μm on the whole surface by, for example, sputtering or CVD. A second thin film coil 47 for an inductive recording head made of copper (Cu) or the like is formed in thickness of 1.5 to 2.5 μm on the insulating film 46 in the recess formed by the top pole tip 45A and the top coupling position 45B by, for example, electrolytic plating. Simultaneously, a coil coupling position 47C which is in contact with the coil coupling position 43C via the opening 9B is formed.

Subsequently, an insulating layer 48 made of alumina or the like is formed in thickness of about 3 to 4 μm on the whole surface by, for example, sputtering or CVD. The insulating layers 48 and the insulating film 46 may be made of another material such as silicon dioxide ($SiO_2$), silicon nitride (SiN), or the like.

The insulating layers 48 and the insulating film 46 are polished by, for example, CMP to expose the surface of the top pole tip 45A and the top coupling position 45B, so that the surfaces of the insulating layers 48 and the insulating film 45 and those of the top pole tip 45A and the top coupling position 45B are flush with each other.

As shown in FIGS. 39A and 39B, by electrolytic plating, sputtering, or the like, a top pole 49 is selectively formed in thickness of about 3 to 4 μm by using, for example, the same material as that of the top pole tip 45A. In this case, a portion of the top pole 49 overlaps with a portion of the top pole tip 45A, and the position of the edge face 22 on the front side (air bearing surface side) of the top pole 49 matches with the position of the rear side edge of the bottom pole tip 41A (that is, the TH0 position). The rear end of the top pole 49 overlapped with the top coupling position 45B. Consequently, the top pole 49 is magnetically coupled to both the top pole tip 45A and the bottom pole 7 via the top and bottom coupling positions 45B and 41B.

Finally, an overcoat layer 50 having a thickness of about 30 μm made of alumina is formed by sputtering or the like so as to cover the whole surface. After that, by machining a slider, the air bearing surface (ABS) of the recording head and the reproduction head is formed. In such a manner, the thin film magnetic head is completed.

In the embodiment as well, the occurrence of the side write phenomenon can be effectively checked by preventing the recording track width from being widened. By assuring the magnetic volume in the portion immediately rearward of the coupling position, the sufficient overwrite characteristic can be assured.

In the embodiment, since the whole top pole tip 45A is formed on the flat area, the photoresist pattern can be formed by photolithography more accurately. The top pole 49 can be also formed on the flat portion was polished by the CMP, so that high precision patterning can be realized.

Although the two thin film coils 43 and 47 are formed in the embodiment, for example, as shown in FIGS. 40A and 40B, only the thin film coil 43 may be provided. In this case, after forming the openings 9A and 9B (FIG. 38) for connection in the write gap layer 9, a top pole 51A is formed in an area extending from the write gap layer 9 to the opening 9A, and a magnetic layer 51B is formed on the coil coupling position 43C exposed in the opening 9B. Further, the overcoat layer 50 is formed so as to cover them. The subsequent processes are similar to the above.

Sixth Embodiment

Figures 43A, 43B:
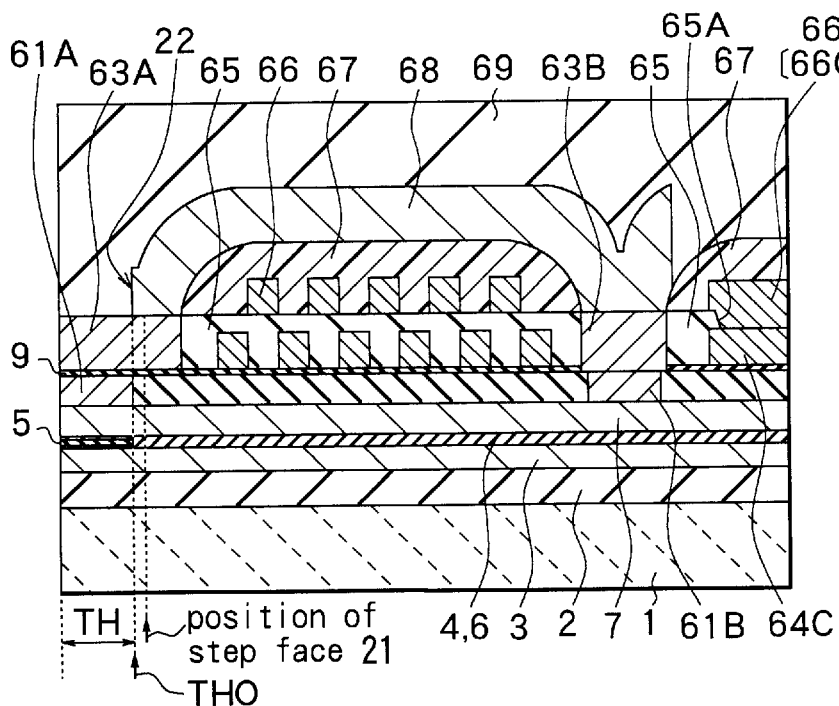
FIGS. 43A and 43B are cross sections showing a process subsequent to FIGS. 42A and 42B.

Referring now to FIGS. 41 to 43, a method of manufacturing the thin film magnetic head according to a sixth embodiment of the invention will be described. FIGS. 41A, 42A and 43A are cross sections each perpendicular to the air bearing surface and FIGS. 41B, 42B and 43B are cross sections parallel to the air bearing surface of the pole portion. In the diagrams, the same components as those in the foregoing embodiments are designated by the same reference numerals.

In the sixth embodiment, since processes up to the stage of forming the bottom pole 7 in FIGS. 41A and 41B are similar to those in the first embodiment, the description is omitted here.

In the embodiment, when the formation of the bottom pole 7 is finished as shown in FIGS. 41A and 41B, a bottom pole tip 61A and a bottom coupling position 61B are formed on the bottom pole 7. The bottom pole tip 61A is formed so that its tip on the air bearing surface side is positioned around the MR (GMR) height zero position and simultaneously the side opposite to the air bearing surface is positioned in the throat height zero position.

After forming an insulating layer 62 made of an insulating material such as alumina on the whole surface by sputtering in thickness of 3.0 to 4.0 µm, the surface is planarized by, for example, CMP to expose the surfaces of the bottom pole tip 61A and the bottom coupling position 61B.

As shown in FIGS. 42A and 42B, the write gap layer 9 having a thickness of 0.2 to 0.3 µm made of an insulating material such as alumina is formed by sputtering. The write gap layer 9 is patterned by photolithography to form the opening 9A for connecting the top and bottom poles.

On the write gap layer 9, a top pole tip 63A and a top coupling position 63B for magnetically connecting the top and bottom poles are formed. In this case, the top coupling position 63B is formed so as to be overlapped with and in contact with the bottom coupling position 61B. On the other hand, the top pole tip 63A is formed so as to extend rearward from the air bearing surface longer than the bottom pole tip 61A. The top pole tip 63A has a shape in plan view similar to that shown in FIG. 31C, that shown in FIG. 34C or the like and is formed by using, for example, a combination of the photomask 91 (FIG. 31A) in the third embodiment and a positive photoresist or a combination of the photomask 93 (FIG. 28A) in the fourth embodiment and a negative photoresist. As a result, the top pole tip having a wedge-shaped recess in the coupling position between the tip portion and the intermediate portion is obtained. The top pole tip 63A is disposed so that the step face 21 is positioned slightly rearward of the position of the rear edge face of the bottom pole tip 61A (that is, TH0 position).

Subsequently, by using the top pole tip 63A as a mask, the write gap layer 9 and the bottom pole tip 61A around it are etched in a self-aligned manner, thereby forming a trim structure.

Then, a first thin film coil 64 for an inductive recording head made of copper (Cu) or the like is formed in thickness of 1.5 to 2.5 µm on the write gap layer 9 in the recess formed between the top pole tip 63A and the top coupling position 63B by, for example, electrolytic plating. Simultaneously, a coil coupling position 64C for connecting the thin film coil 64 to a second thin film coil which will be described hereinlater is formed in an area rearward of the top coupling position 63B (area on the right side in the diagram).

As shown in FIGS. 43A and 43B, an insulating layer 65 made of an insulating material such as alumina is formed in thickness of about 3.0 to 4.0 µm on the whole surface by sputtering. After that, the surface is planarized by, for example, CMP and the surfaces of the top pole tip 63A and the top coupling position 63B are exposed. Subsequently, the insulating layer 65 is selectively etched to form an opening 65A which reaches the coil coupling position 64C.

A second thin film coil 66 for an inductive recording head made of copper (Cu) or the like is formed in thickness of 1.5 to 2.5 µm on the insulating layer 65 by, for example, electrolytic plating. Simultaneously, a coil coupling position 66C to be in contact with the coil coupling position 64C via the opening 65C is formed.

A photoresist layer 67 is formed so as to cover a thin film coil 66 and the coil coupling position 64C by high-precision photolithography. After that, a heat treatment is performed at, for example, 250° C. to planarize the surface of the photoresist layer 67 and insulate the winding portions of the thin film coil 66.

Then, by electrolytic plating or the like, a top pole 68 is selectively formed in thickness of about 3 to 4 µm by using, for example, the same material as that of the top pole tip 45A. In this case, a portion of the top pole 68 overlaps with a portion of the top pole tip 63A, and the position of the edge face 22 on the front side (air bearing surface side) of the top pole 68 matches with the position of the rear edge of the bottom pole tip 61A (that is, the TH0 position). The rear end of the top pole 68 is overlapped with the top coupling position 63B. Consequently, the top pole 68 is magnetically coupled to the top pole tip 63A and is also magnetically coupled to the bottom pole 7 via the top and bottom coupling positions 63B and 61B.

Finally, an overcoat layer 69 having a thickness of about 30 µm made of alumina is deposited by sputtering or the like so as to cover the whole surface. After that, by machining a slider, the air bearing surface (ABS) of the recording head and the reproduction head is formed. In such a manner, the thin film magnetic head is completed.

In the embodiment as well, actions and effects similar to those of the foregoing embodiments are produced. That is, the recording track width on a recording medium can be accurately controlled, so that the occurrence of the side write phenomenon can be effectively prevented and a sufficient overwrite characteristic can be assured.

Also in the embodiment, the top pole tip 63A can be formed on the flat area, so that the photoresist pattern can be formed by photolithography with high precision.

Figures 44A, 44B:
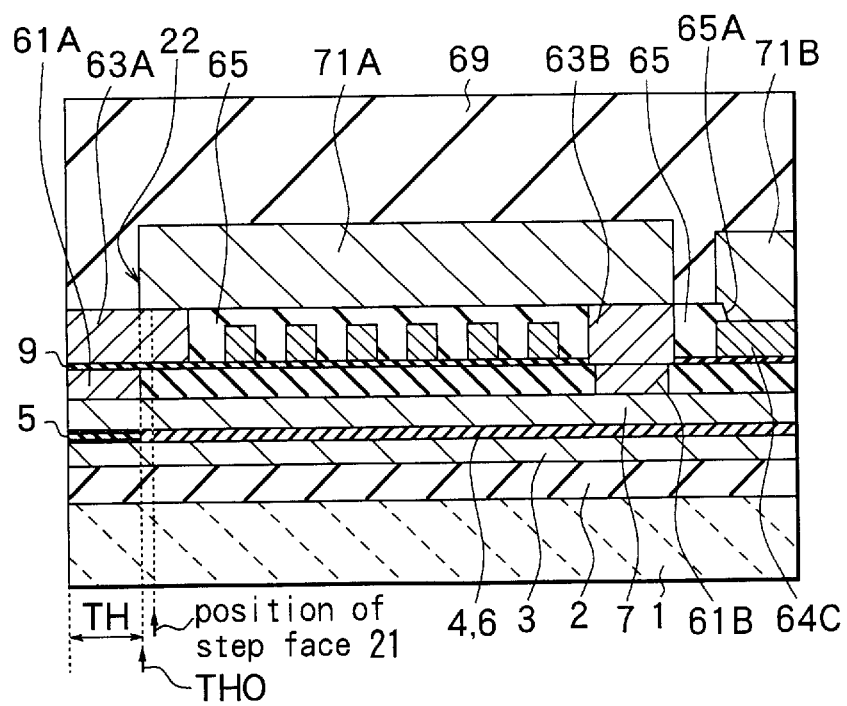
FIGS. 44A and 44B are cross sections showing a modification of a thin film magnetic head manufactured by the thin film magnetic head manufacturing method according to the sixth embodiment.
Figure 45:
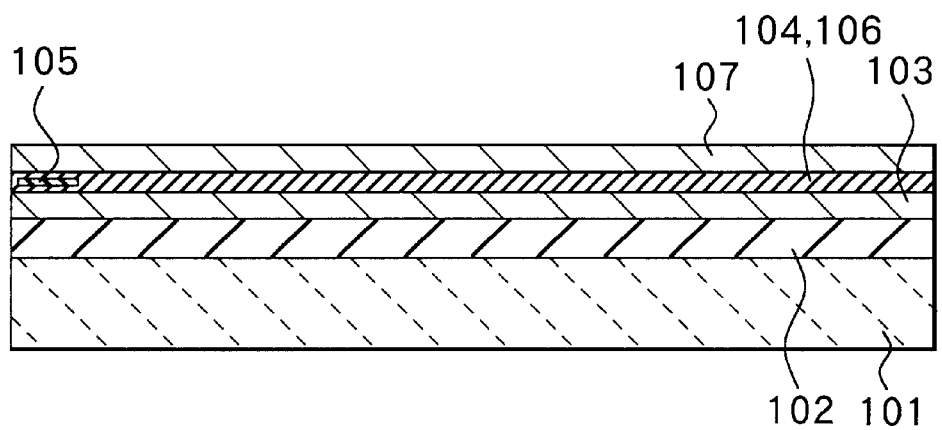
FIG. 45 is a cross section for explaining a process in a method of manufacturing a conventional thin film magnetic head.
Figure 46:
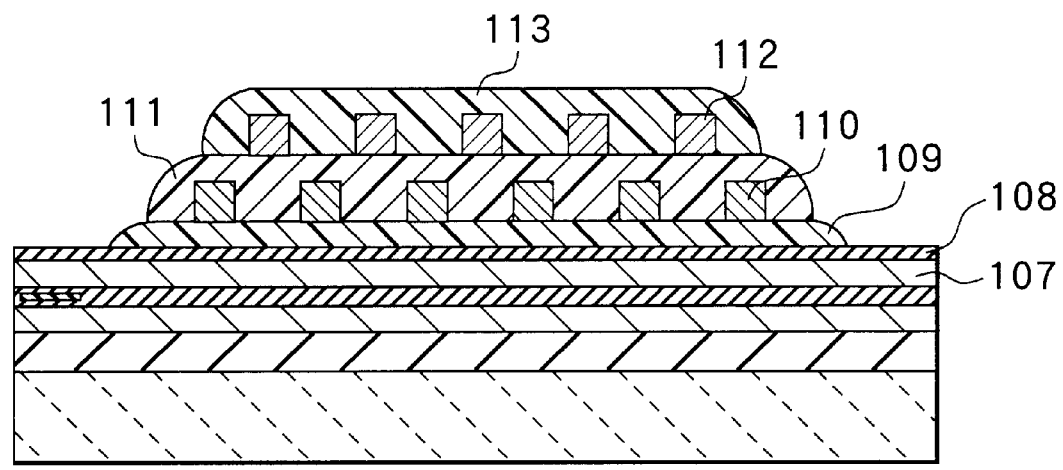
FIG. 46 is a cross section for explaining a process subsequent to FIG. 45.
Figure 47:
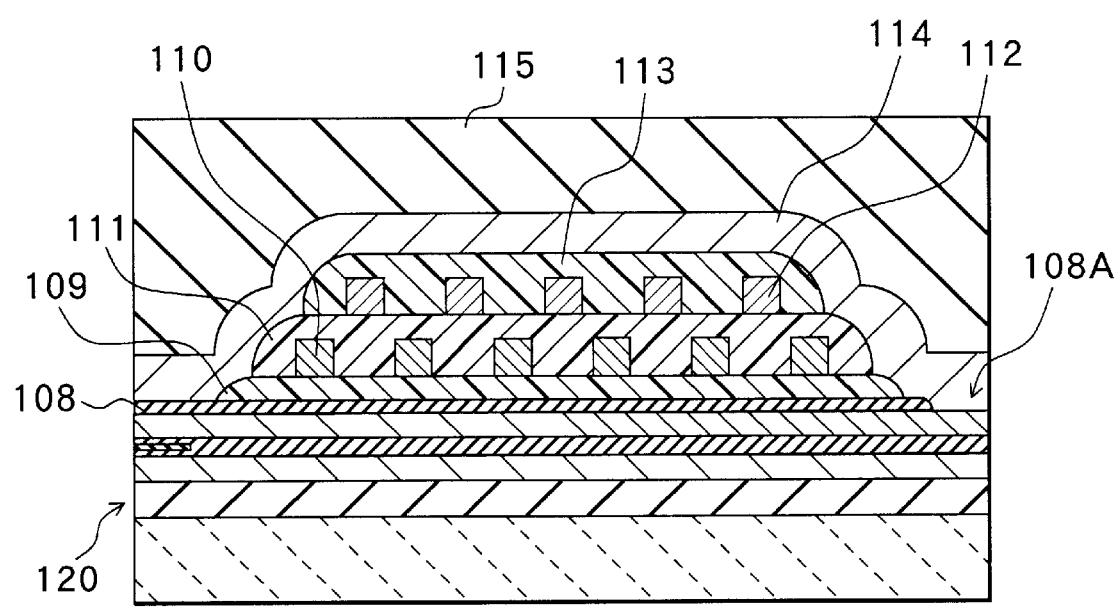
FIG. 47 is a cross section for explaining a process subsequent to FIG. 46.
Figure 48:
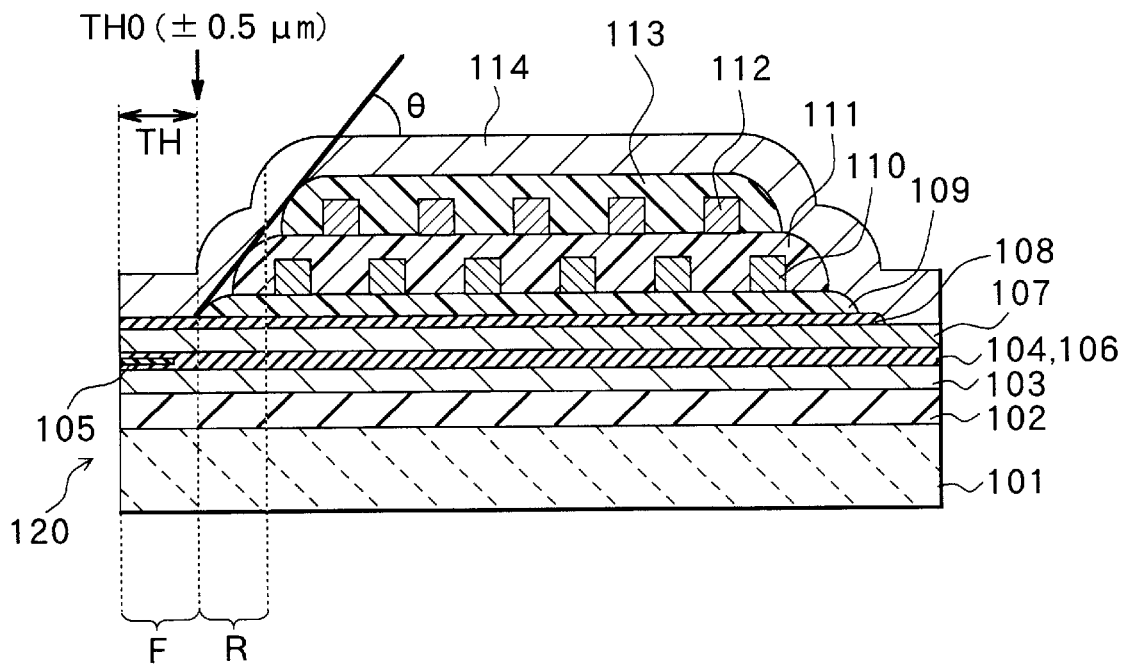
FIG. 48 is a cross section showing the structure of a conventional thin film magnetic head.

Although the two thin film coils 64 and 66 are formed in the embodiment, for example, as shown in FIGS. 44A and 44B, only the thin film coil 64 may be provided. In this case, after forming the openings 9A and 9B for connection (FIG. 42) in the write gap layer 9, a top pole 71A is formed in an area extending from the write gap layer 9 to the opening 9A, and a magnetic layer 71B is formed on the coil coupling position 64C exposed in the opening 9B. Further, the overcoat layer 69 is formed so as to cover them. The subsequent processes are similar to the above.

Although the invention has been described by the foregoing embodiments, the invention is not limited by the embodiments but can be variously modified. For example, the methods of manufacturing the composite thin film magnetic head have been described as the embodiments and modifications, the invention can be also applied to a thin film magnetic head dedicated for recording having an inductive magnetic transducer for writing and a thin film magnetic head having an inductive magnetic transducer for recording and reproduction. The invention can be also applied to a thin film magnetic head having a structure in which the stacking order of the device for writing and the device for reading is opposite to the above.

As described above, according to the method of manufacturing the thin film magnetic head, when a predetermined-shaped photoresist pattern is formed by performing the photolithography process with a light shield mask and at least one of the magnetic layers is selectively formed by using the formed photoresist pattern, the light shield mask having the predetermined-shaped portion by which a projection can be formed at the first corner in at least one of the magnetic layers in the photoresist pattern is used. Thus, a wedge-shaped recess can be formed at the first corner in at least one of the magnetic layers.

Particularly, according to the method of manufacturing the thin film magnetic head, the light shield mask in which the pattern portion corresponding to the first magnetic portion is formed in a constant width is used. Consequently, the width of the whole first magnetic portion becomes constant and the variations in the effective recording track width finally obtained can be suppressed.

According to the method of manufacturing the thin film magnetic head, the light shield mask is positioned so that the position of the step in the coupling position matches with the position of the edge on the side close to the recording medium in the insulating layer and then the photolithography process is performed. Consequently, the recording characteristic of the thin film magnetic head obtained is improved.

According to the method of manufacturing the thin film magnetic head, when the photoresist pattern is formed by performing the photolithography process with the light shield mask and at least one of the magnetic layers is selectively formed by using the formed photoresist pattern, the light shield mask having a shape including at least an acute angle portion in the portion corresponding to the first corner in the at least one of the magnetic layers in the photoresist pattern is used. The shape of the first corner in at least one of the magnetic layers therefore becomes a shape adapted to the shape including the acute angle of the light shield mask.

According to the thin film magnetic head, at least one of the two magnetic layers includes the first and second magnetic portions, a step face in the width direction is formed in the coupling position of the first and second magnetic portions, a first corner is formed in an intersecting portion of a side face in the first magnetic portion and the step face, a second corner is formed in an intersecting portion of a side face in the second magnetic portion and the step face, and a wedge-shaped recess is provided in the first corner. Consequently, the first corner can be prevented from being rounded and the substantial increase in width in the first magnetic portion can be avoided. For example, when the width of the first magnetic portion defines the track width, therefore, the increase in the recording track width can be prevented. Due to the existence of the second magnetic layer of a large magnetic volume, the magnetic flux flowing in the first magnetic layer can be prevented from being saturated. Thus, the overwrite characteristic can be improved.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head, the thin film magnetic head including:
   at least two magnetic layers, magnetically coupled to each other, and having two magnetic poles which face each other with a gap layer in between a portion on the side of a recording-medium-facing surface facing a recording medium; and
   a thin film coil portion disposed between the two magnetic layers sandwiching an insulating layer,
   at least one of the two magnetic layers including: first magnetic portion extending from the recording-medium-facing surface to either an edge or adjacent thereto on the side close to the recording-medium-facing surface of the insulating layer, and having a constant width which defines a width of a recording track on the recording medium; and a second magnetic portion, wider than the first magnetic portion, being magnetically coupled to the first magnetic portion at or adjacent to the edge of the insulating layer, and extending so as to be apart from the recording-medium-facing surface,
   the first magnetic portion and the second magnetic portion having: a step face extending in the width direction at a coupling position where the fist magnetic portion and the second magnetic portion are coupled to each other; a first corner where a side face of the first magnetic portion and the step face intersect each other, and a second corner where a side face of the second magnetic portion and the step face intersect each other,
   the method comprising the steps of:
      forming a photoresist pattern by a photolithography process with a light shield mask whose basic shape includes a shape corresponding to a shape of at least the first and second magnetic portions and at least one acute angle that is positioned at a location corresponding to the first corner; and
      selectively forming at least one of the magnetic layers by using the photoresist pattern, wherein the photoresist pattern has a projection that is positioned at a location corresponding to the first corner.

2. A method of manufacturing a thin film magnetic head according to claim 1,
   wherein a positive photoresist whose area unexposed in the photolithography process remains is used as the photoresist.

3. A method of manufacturing a thin film magnetic head according to claim 2,
   wherein the light shield mask has a projection shape which can suppress exposure at the first corner.

4. A method of manufacturing a thin film magnetic bead according to claim 3,
   wherein the light shield mask has a recess which can promote exposure at the second corner.

5. A method of manufacturing a thin film magnetic head according to claim 1,
   wherein a negative photoresist whose area exposed in the photolithography process remains is used as the photoresist.

6. A method of manufacturing a thin film magnetic head according to claim 5,
   wherein the the light shield mask has a recessed shape which can promote exposure at the first corner.

7. A method of manufacturing a thin film magnetic head according to claim 6,
   wherein the light shield mask includes a projection which can suppress exposure at the second corner.

8. A method of manufacturing a thin film magnetic head according to claim 1,
   wherein a patterned portion corresponding to the first magnetic portion in the light shield mask has a constant width.

9. A method of manufacturing a thin film magnetic head according to claim 1,
   wherein when the one of the magnetic layers includes a third magnetic portion which is magnetically coupled to the second magnetic portion and is wider and larger than the second magnetic portion,
   the light shield mask has a shape corresponding to the first, second, and third magnetic portions, and
   the first, second, and third magnetic portions are formed all together by using the light shield.

10. A method of manufacturing a thin film magnetic head according to claim 1, wherein when the one of the magnetic layers includes a third magnetic portion which is magnetically coupled to the second magnetic portion and is wider and larger than the second magnetic portion, the first and second magnetic portions are formed all together by using the light shield mask having a shape corresponding to the first and second magnetic portions and, after that, the third magnetic portion is separately formed by using another light shield mask having a shape corresponding to the third magnetic portion.

11. A method of manufacturing a thin film magnetic head according to claim 1, wherein the light shield mask has a shape allowing the step face at the coupling position to perpendicularly cross a side face of the first magnetic portion.

12. A method of manufacturing a thin film magnetic head according to claim 1, wherein the photolithography process is performed with the light shield mask positioned so that the position of the step face of the coupling position matches with the position of the edge on the side close to the recording-medium-facing surface of the insulating layer.

13. A method of manufacturing a thin film magnetic head according to claim 1, wherein the light shield mask has a recess or a projection with a right-angled triangle shape.

14. A method of manufacturing a thin film magnetic head according to claim 13, wherein the tip of the recess or projection with the right-angled triangle shape has the acute angle, and a depth of the recess or a height of the projection is set within a range from 0.3 $\mu$m to 0.8 $\mu$m.

15. A method of manufacturing a thin film magnetic head including:

at least two magnetic layers, magnetically coupled to each other, and having two magnetic poles which face each other with a gap layer in between in portion on the side of a recording-medium-facing surface facing a recording medium; and a thin film coil portion disposed between the two magnetic layers sandwiching an insulating layer, at least one of the two magnetic layers including: a first magnetic portion extending from the recording-medium-facing surface to either an edge or its neighborhood on the side close to the recording-medium-facing surface of the insulating layer, and having a constant width which defines a width of a recording track on the recording medium; and a second magnetic portion, wider than the first magnetic portion, being magnetically coupled to the first magnetic portion at the edge or its neighborhood of the insulating layer, and extending so as to be apart from the recording-medium-facing surface, the first magnetic portion and the second magnetic portion having: a step face extending in the width direction at a coupling position where the first magnetic portion and the second magnetic portion are coupled each other; a first corner where a side face of the first magnetic portion and the step face intersect each other; and a second corner where a side face of the second magnetic portion and the step face intersect each other, the method comprising steps of:

forming a photoresist pattern by a photolithography process with a light shield mask whose basic shape includes a shape corresponding to a shape of at least the first and second magnetic portions; and selectively forming at least one of the magnetic layers by using the photoresist pattern, wherein the light shield mask has a portion whose shape includes an acute angle, at a position corresponding to the first corner.

* * * * *